United States Patent [19]
Homeier

[11] Patent Number: 5,963,739
[45] Date of Patent: Oct. 5, 1999

[54] METHOD FOR VERIFYING THE TOTAL CORRECTNESS OF A PROGRAM WITH MUTUALLY RECURSIVE PROCEDURES

[75] Inventor: Peter Vincent Homeier, Philadelphia, Pa.

[73] Assignee: Peter V. Homeier, Columbia, Md.

[21] Appl. No.: 08/846,144

[22] Filed: Apr. 25, 1997

Related U.S. Application Data

[60] Provisional application No. 60/016,357, Apr. 26, 1996.

[51] Int. Cl.[6] ........................................................ G06F 9/44
[52] U.S. Cl. .......................... 395/704; 395/701; 395/707; 395/708
[58] Field of Search ..................................... 395/701, 702, 395/704, 705, 707, 708

[56] References Cited

U.S. PATENT DOCUMENTS

| | | | |
|---|---|---|---|
| 4,860,203 | 8/1989 | Corrigan et al. ......................... | 364/300 |
| 5,481,717 | 1/1996 | Gaboury .................................. | 395/700 |

OTHER PUBLICATIONS

"Task dependence and Termination in Ada", Dillon ACM Trans. on Soft. Engg. and Methodology, vol. 6, No.1, pp. 80–110, Jan. 1997.
Kurshan, "The Complexity of Verification", STOC '94 Proc. of the twenty–sixth annual ACM Symp. on Theory of Computer, pp. 365–371, May 1994.
Rosenblum, "Towards a Method of Programming with Assertions",ICSE '92, pp. 92–104, 1992.
Hungar, "Complexity bounds of Hoare–style Proof Systems", LICS '91, IEEE, pp. 120–126, Jul. 1991.
Mills, "Certifying the Correctness of Software", IEEE, pp. 373–381, Jan. 1992.
Lindsay et al. "Using CARE to Constant Verified Software", Proc. First IEEE Int'l Conf. on Format Engg. Methods, pp. 122–131, Apr. 1997.
"Proof of a Program: FIND", C. A. R. Hoare, *Communications of the ACM*, vol. 14, No. 1, Jan. 1971, pp. 39–45.
"Proof of a recursive program: Quicksort," M. Foley et al., *The Computer Journal*, vol. 14, No. 4, Jan. 1971, pp. 391–395.
"A Pedagogical Verification Condition Generator", D. Gray, *The Computer Journal*, vol. 30, No. 3, Jun. 1987, pp. 239–248.
"Automatic Program Verification I: A Logical Basis and Its Implementation", Shigeru Igarashi et al.,*Acta Informatica* 4, 1975, pp. 145–182.
"Experience with embedding hardware description languages in HOL", Richard Boulton et al., *Theorem Provers in Circuit Design*, edited by V. Stavridou et all., Elsevier Science Publishes B V. (North Holland), 1992, 129–156.

(List continued on next page.)

*Primary Examiner*—Tariq R. Hafiz
*Assistant Examiner*—Kakali Chaki
*Attorney, Agent, or Firm*—Merchant, Gould, Smith, Edell, Welter & Schmidt

[57] ABSTRACT

A computer-implemented method, apparatus, and article of manufacture for verifying the total correctness of a computer program with mutually recursive procedures. A computer program is received into the computer as a series of source statements, wherein the source statements include annotations indicating the intended behavior of the source statements. The source statements are translated into an abstract syntax tree and a call graph of the program in the computer, wherein the call graph includes nodes representing procedures and directed arcs between the nodes representing procedure calls. The abstract syntax tree and call graph are analyzed for correctness by invoking a Verification Condition Generator in the computer to generate a set of verification conditions from the abstract syntax tree and call graph. The set of verification conditions are outputted as conditions to be proven to complete a proof of total correctness of the program. The set of verification conditions are verified in the computer and a theorem is outputted showing that the program is totally proven to be totally correct with respect to its specification based on the set of verification conditions.

20 Claims, 13 Drawing Sheets

OTHER PUBLICATIONS

"Total Correctness for Procedures", Stefan Sokolowski, *Proceedings of 6th Symposium on Mathematical Foundations of Computer Science*, Tatranska Lomnica, Sep. 5–9, 1977, pub. in Lecture Notes in Computer Science 53, edited by G. Goos et al., 1977, pp. 475–483.

"Ten years of Hoare's Logic: A Survey—Part I", K. R. Apt, *ACM Transactions on Programming Languages and Systems*, vol. 3, No. 4, Oct. 1981, pp. 431–483.

"Proving Total Correctness of Recursive Procedures", P. America et al., *Information and Computation*, vol. 84, No. 2, Feb. 1990, pp. 129–162.

"A Structure–directed Total Correctness Proof Rule for Recursive Procedure Calls", P. Pandya et al., *The Computer Journal*, vol. 29, No. 6, 1986, pp. 531–537.

"A Mechanically Verified Verification Condition Generator", P. Homeier et al., *The Computer Journal*, vol. 38, No. 2, 1995, pp. 1–11.

"Mechanical Verification of Mutually Recursive Procedures", P. Homeier et al., Proceedings of the 13th International Conference on Automated Deduction (CADE–13), eds. M.A. McRobbie et al., Rutgers University, New Brunswick, NJ, USA, Jul. 30–Aug. 3, 1996, Lecture Notes in Artificial Intelligence vol. 1104, Springer–Verlag, pp. 201–215.

"Automated Verification Condition Generation using Intermittent Assertions", D. Smallberg, M.S. thesis, Department of Computer Science, University of California at Los Angeles, 1978.

Winskel, Glynn, *The Formal Semantics of Programming Languages, An Introduction*, MIT Press, Cambridge, Massachusetts, 1993, 361 pages ISBN 0–262–23169–7.

Apt, Krzysztof R. and Olderog, Ernst–Rudiger, *Verification of Sequential and Concurrent Programs*, Second Edition, Springer–Verlag, New York, 1997. 364 pages, ISBN 0–387–94896–1.

Gordon, M.J.C., and Melham, T.F., *Introduction to HOL, A Theorem Proving Environment for Higher Order Logic*, Cambridge University Press, 1993, 472 pages, ISBN 0–521–44189–7.

Procedure Call Graph for Odd/Even Example

Procedure Call Tree for Odd/Even Example

Procedure Call Tree for Recursion for Odd/Even Example

Procedure Call Tree for Single Recursion for Odd/Even Example

Diverted and Undiverted Verification Conditions for Odd/Even

METHOD FOR VERIFYING THE TOTAL CORRECTNESS OF A PROGRAM WITH MUTUALLY RECURSIVE PROCEDURES

CROSS-REFERENCE TO RELATED APPLICATION AND PUBLICATION

This application claims the right of priority under 35 U.S.C. § 119(e) to co-pending U.S. provisional application No. 60/016,357, filed Apr. 26, 1996, by Peter Vincent Homeier, entitled "METHOD FOR VERIFYING THE TOTAL CORRECTNESS OF A PROGRAM WITH MUTUALLY RECURSIVE PROCEDURES", which application is incorporated by reference herein in its entirety.

This application is based on a Ph.D. dissertation entitled "TRUSTWORTHY TOOLS FOR TRUSTWORTHY PROGRAMS: A MECHANICALLY VERIFIED VERIFICATION CONDITION GENERATOR FOR THE TOTAL CORRECTNESS OF PROCEDURES", by inventor Peter Vincent Homeier, published by the University of California, Los Angeles, in June, 1995, which dissertation is incorporated by reference herein in its entirety. The Ph.D. dissertation was filed as the provisional application cited above. A copy of the Ph.D. dissertation can be found on the Internet at "http://www.cs.ucla.edu/~homeier/phd.html".

BACKGROUND OF THE APPLICATION

1. Field of the Application

The application relates in general to computer assisted software engineering (CASE) systems, and more particularly, to a method of verifying the total correctness of a computer program with mutually recursive procedures.

2. Description of Related Art

Good software is very difficult to produce. This contradicts expectations, for building software requires no large factories or furnaces, ore or acres. It consumes no rare, irreplaceable materials, and generates no irreducible waste. It requires no physical agility or grace, and can be made in any locale.

What good software does require, it demands of the intelligence and character of the person who makes it. These demands include patience, perseverance, care, craftsmanship, attention to detail, and a streak of the detective, for hunting down errors. Perhaps most central is an ability to solve problems logically, to resolve incomplete specifications to consistent, effective designs, to translate nebulous descriptions of a program's purpose to definite detailed algorithms. Finally, software remains lifeless and mundane without a well-crafted dose of the artistic and creative.

Large software systems often have many levels of abstraction. Such depth of hierarchical structure implies an enormous burden of understanding. In fact, even the most senior programmers of large software systems cannot possibly know all the details of every part, but rely on others to understand each particular small area.

Given that creating software is a human activity, errors occur. What is surprising is how difficult these errors often are to even detect, let alone isolate, identify, and correct. Software systems typically pass through hundreds of tests of their performance without flaw, only to fail unexpectedly in the field given some unfortunate combination of circumstances. Even the most diligent and faithful applications of rigorous disciplines of testing only mitigate this problem. The core remains, as expressed by Dijkstra: "Program testing can be used to show the presence of bugs, but never to show their absence!" [Dij72]. It is a fact that virtually every major software system that is released or sold is, not merely suspected, but in fact guaranteed to contain errors.

This degree of unsoundness would be considered unacceptable in most other fields. It is tolerated in software because there is no apparent alternative. The resulting erroneous software is justified as being "good enough," giving correct answers "most of the time," and the occasional collapses of the system are shrugged off as inevitable lapses that must be endured. Virtually every piece of software that is sold for a personal computer contains a disclaimer of any particular performance at all. For example, the following is typical, not extraordinary:

"X" CORPORATION PROVIDES THIS SOFTWARE "AS IS" WITHOUT ANY WARRANTEE OF ANY KIND, EITHER EXPRESS OR IMPLIED, INCLUDING BUT NOT LIMITED TO THE IMPLIED WARRANTIES OR CONDITIONS OF MERCHANTABILITY OR FITNESS FOR A PARTICULAR PURPOSE. IN NO EVENT SHALL "X" CORPORATION BE LIABLE FOR ANY LOSS OF PROFITS, LOSS OF BUSINESS, LOSS OF USE OR DATA, INTERRUPTION OF BUSINESS, OR FOR INDIRECT, SPECIAL, INCIDENTAL, OR CONSEQUENTIAL DAMAGES OF ANY KIND, EVEN IF "X" CORPORATION HAS BEEN ADVISED OF THE POSSIBILITY OF SUCH DAMAGES ARISING FROM ANY DEFECT OR ERROR IN THIS SOFTWARE.

The limit to which many companies stand behind their software is to promise to reimburse the customer the price of a floppy disk, if the physical medium is faulty. This means that the customer must hope and pray that the software performs as advertised, for he has no firm assurance at all. This lack of responsibility is not tolerated in most other fields of science or business. It is tolerated here because it is, for all practical purposes, impossible to actually create perfect software of the size and complexity desired, using the current technology of testing to detect errors.

There is a reason why testing is inadequate. Fundamentally, testing examines a piece of software as a "black box," subjecting it to various external stimuli, and observing its responses. These responses are then compared to what the tester expected, and any variation is investigated. Testing depends solely on what is externally visible. This approach treats the piece of software as a mysterious locked chest, impenetrable and opaque to any deeper vision or understanding of its internal behavior. A good tester does examine the software and study its structure in order to design his test cases, so as to test internal paths, and check circumstances around boundary cases. But even with some knowledge of the internal structure, it is very difficult in many cases to list a sufficient set of cases that will exhaustively test all paths through the software, or all combinations of circumstances in which the software will be expected to function.

In truth, though, this behavioral approach is foreign to most real systems in physics. Nearly all physical systems may be understood and analyzed in terms of their component parts. It is far more natural to examine systems in detail, by investigating their internal structure and organization, to watch their internal processes and interrelationships, and to derive from that observation a deep understanding of the "heart" of the system. Here each component may be studied to some degree as an entity unto itself, existing within an environment which is the rest of the system. This is essentially the "divide and conquer" strategy applied to understanding systems, and it has the advantage that the part is usually simpler than the whole. If a particular component is still too complex to permit immediate understanding, it may be itself analyzed as being made up of other smaller pieces, and the process recurses in a natural way.

This concept was recognized by Floyd, Hoare, Dijkstra, and others, beginning about 1969, and an alternative technique to testing is currently in the process of being fashioned by the computing community. This approach is called "program correctness" or "software verification." It is concerned with analyzing a program down to the smallest element, and then synthesizing an understanding of the entire program by composing the behaviors of the individual elements and sub-systems. This attention to detail costs a good deal of effort, but it pays off in that the programmer gains a much deeper perception of the program and its behavior, in a way that is complete while being tractable. This deeper examination allows for stronger conclusions to be reached about the software's quality.

As opposed to testing, verification can trace every path through a system, and consider every possible combination of circumstances, and be certain that nothing has been left out. This is possible because the method relies on mathematical methods of proof to assure the completeness and correctness of every step. What is actually achieved by verification is a mathematical proof that the program being studied satisfies its specification. If the specification is complete and correct, then the program is guaranteed to perform correctly as well.

However, the claims of the benefits of program verification need to be tempered with the realization that substantially what is accomplished may be considered an exercise in redundancy. The proof shows that the specification and the program, two forms of representing the same system, are consistent with each other. But deriving a complete and correct formal specification for a problem from the vague and nuanced words of an English description is a difficult and uncertain process itself. If the formal specification arrived at is not what was truly intended, then the entire proof activity does not accomplish anything of worth. In fact, it may have the negative effect of giving a false sense of certainty to the user's expectations of how the program will perform. It is important, therefore, to remember that what program verification accomplishes is limited in its scope, to proving the consistency of a program with its specification.

But within that scope, program verification becomes more than redundancy when the specification is an abstract, less detailed statement than the program. Usually the specification as given describes only the external behavior of the program. In one sense, the proof maps the external specification down through the structure of the program to the elements that must combine to support each requirement. In another sense, the proof is good engineering, like installing steel reinforcement within a largely concrete structure. The proof spins a single thread through every line of code-but this single thread is far stronger than steel; it has the infinite strength of logical truth. Clearly this greatly increases one's confidence in the finished product. A system is far stronger if it has internal integrity, rather than simply satisfaction of an external behavioral criterion. The heart of the system must be correct, and to achieve this requires "wisdom" (truth) in the "hidden part."

The theory for creating these proofs of program correctness has been developed and applied to sample programs. It has been found that for even moderately sized programs, the proofs are often long and involved, and full of complex details. This raises the possibility of errors occurring in the proof itself, and brings into question its credibility.

This situation naturally calls for automation. Assistance may be provided by a tool which records and maintains the proof as it is constructed step by step, and ensures its soundness. This tool becomes an agent which mechanically verifies the proof's correctness. The Higher Order Logic (HOL) proof assistant is such a mechanical proof checker. It is an interactive theorem-proving environment for higher order logic, built originally at Edinburgh in the 1970's, based on an approach to mechanical theorem proving developed by Robin Milner. It has been used for general theorem proving, hardware verification, and software verification and refinement for a variety of languages. HOL has the central quality that only true theorems may be proved, and is thus secure. It performs only sound logical inferences. A proof is then a properly composed set of instructions on what inferences to make. Each step is thus logically consistent with what was known to be true before. The result of a successful proof is accredited with the status of "theorem," and there is no other way to produce a theorem. The derivation is driven by the human user, who makes use of the facilities of HOL to search and find the proof.

Even greater assistance for program verification may be provided by a tool which writes the proof automatically, either in part or in whole. One kind of mechanical tool that has been built is a Verification Condition Generator. Such a tool analyzes a program and its specification, and based on the structure of the program, constructs a proof of its correctness, modulo a set of lemmas called verification conditions which are left to the programmer to prove. This is a great aid, as it twice reduces the programmer's burden, lessening both the volume of proof and the level of proof. Many details and complexities can be automatically handled by the Verification Condition Generator, and only the essentials left to the programmer. In addition, the verification conditions that remain for him to prove contain no references to programming language phrases, such as assignment statements, loops, or procedures. The verification conditions only describe relationships among the underlying datatypes of the programming language, such as integers, booleans, and lists. All parts of the proof that deal directly with programming language constructs are handled automatically by the Verification Condition Generator. This does not mean that there cannot be depth and difficulty in proving the verification conditions; but the program proving task has been significantly reduced.

Several example Verification Condition Generators have been written by various researchers over the past twenty years. Unfortunately, they have not been enough to encourage a widespread use of program verification techniques. One problem area is the reliability of the Verification Condition Generator itself. The Verification Condition Generator is a program, and just as any other program, it is subject to errors. This is critical, however, because the Verification Condition Generator is the foundation on which all later proof efforts rest. If the Verification Condition Generator is not sound, then even after proving all of the verification conditions it produces, the programmer has no firm assurance that in fact he has proven his original program correct. Just stating a set of rules for proving each construct in a programming language is not enough; there is enough subtlety in the semantics of programming languages to possibly invalidate rules which were arrived at simply by intuition, and this has happened for actual rules that have been proposed in the literature. There is a need for these rules, and the Verification Condition Generators that incorporate them, to be rigorously proven themselves.

This invention presents a verified Verification Condition Generator, which for any input program and specification, produces a list of verification conditions whose truth in fact implies the correctness of the original program with respect to its specification. This verification of the Verification Condition Generator is proven as a theorem, and the proof has been mechanically checked in every detail within HOL, and thus contains no logical errors. The reliability of this Verification Condition Generator is therefore complete. But the key innovation of this invention is a novel method for proving the termination of programs with mutually recursive procedures. There are two kinds of correctness which may be proven about programs, called partial correctness and total correctness. These will be defined later, but for now it suffices to say that total correctness is stronger, that it includes partial correctness but also guarrantees that the program in question in fact terminates and achieves its objective. Methods suggested in the past for proving termination have been either ad hoc or rigid, unnatural, and not general. This invention presents a new method which organizes the proof of termination according to the structure of the procedure call graph, in a way that is regular while remaining natural, which is simple yet covers a substantial portion of the entire proof effort, and which is more general than prior proposals yet is also readily mechanizable within the structure of a VCG. This new method for proving termination is the heart of this invention.

Program verification holds the promise in theory of enabling the creation of software with qualitatively superior reliability than current techniques. There is the potential to forever eliminate entire categories of errors, protecting against the vast majority of run-time errors. However, program verification has not become widely used in practice, because it is difficult and complex, and requires special training and ability. The techniques and tools that are presented here are still far from being a usable methodology for the everyday verification of general applications. The mathematical sophistication required is high, the proof systems are complex, and the tools are only prototypes. However, the results of this invention point the direction to computer support of this difficult process that make it more effective and secure. Another approach than testing is clearly needed. If we are to build larger and deeper structures of software, we need a way to ensure the soundness of our construction, or else, inevitably, the entire edifice will collapse, buried under the weight of its internal inconsistencies and contradictions.

SUMMARY OF THE APPLICATION

To overcome the limitations in the prior art described above, and to overcome other limitations that will become apparent upon reading and understanding the present specification, the present application discloses a method, apparatus, and article of manufacture for verifying the total correctness of a computer program with mutually recursive procedures. A computer program is received into the computer as a series of source statements, wherein the source statements include annotations indicating the intended behavior of the source statements. The source statements are translated into an abstract syntax tree and a call graph of the program in the computer, wherein the call graph includes nodes representing procedures and directed arcs between the nodes representing procedure calls. The abstract syntax tree and call graph are analyzed for correctness by invoking a Verification Condition Generator in the computer to generate a set of verification conditions from the abstract syntax tree and call graph. The set of verification conditions are outputted as conditions to be proven to complete a proof of total correctness of the program. The set of verification conditions are verified in the computer and a theorem is outputted showing that the program is totally proven to be totally correct with respect to its specification.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the application may be practiced. It is to be understood that other embodiments may be utilized and structural changes may be made without departing from the scope of the present application.

1. Hardware Environment

Figure 1:
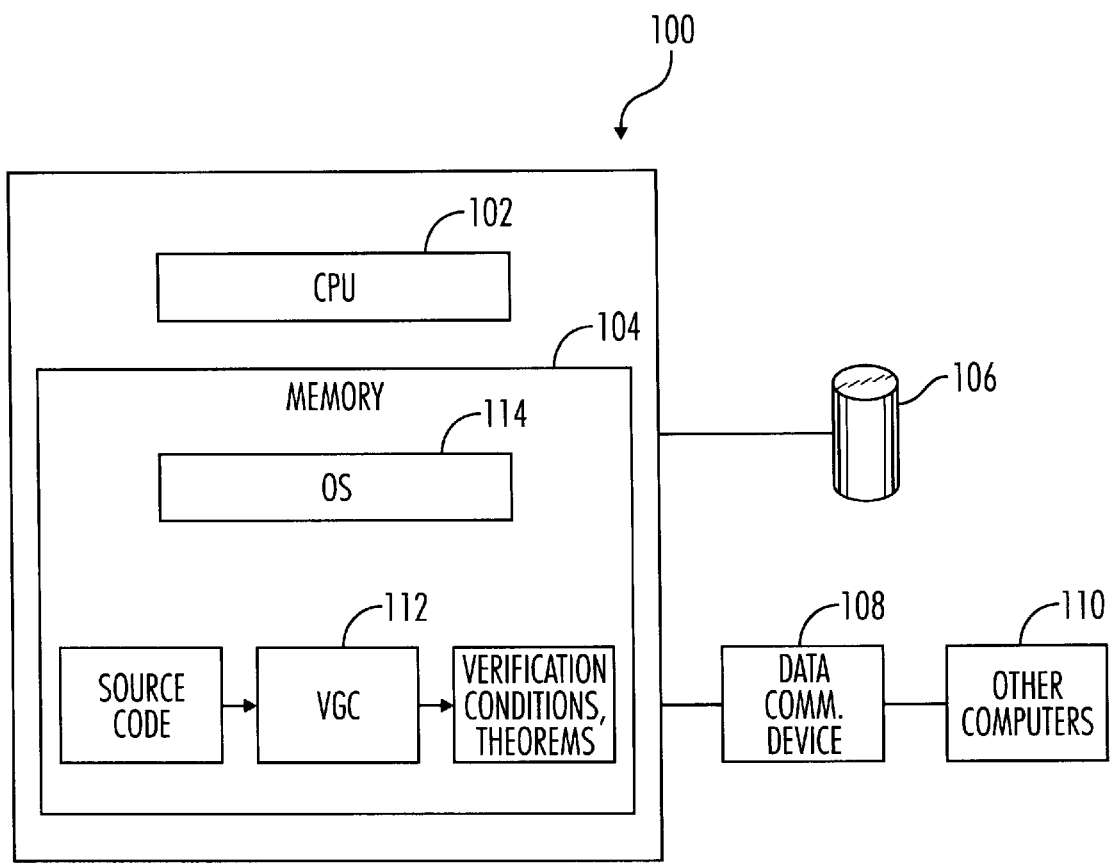
FIG. 1 is a block diagram illustrating an exemplary hardware environment used to implement the preferred embodiment of the invention.

FIG. 1 is a block diagram illustrating an exemplary hardware environment used to implement the preferred embodiment of the invention. In the exemplary hardware environment, a computer system 100 may include, inter alia, a processor 102, memory 104, data storage devices 106, data communications devices 108, and other peripheral devices. The computer system 100 may be connected locally or remotely to fixed and/or removable data storage devices 106 (and their associated media), and/or data communications devices 108. The computer system 100 also could be connected to other computer systems 110 via the data communications devices 108. Those skilled in the art will recognize that any combination of the above components, or any number of different components, peripherals, and other devices, may be used with the computer system 100.

The present invention is generally implemented using one or more computer programs 112 known as a Verification Condition Generator 112, which executes under the control of an operating system 114, such as Windows, DOS, OS/2, Macintosh Finder, AIX, UNIX, MVS, etc. The Verification Condition Generator 112 causes the computer system 100 to perform the desired functions as described herein. Thus, using the present specification, the invention may be implemented as a machine, process, or article of manufacture by using standard programming and/or engineering techniques to produce software, firmware, hardware or any combination thereof.

Generally, the Verification Condition Generator 112 and/or operating system 114 are tangibly embodied or readable from a computer-readable device or media, such as memory 104, data storage devices 106, and/or data communications devices 108, thereby making a computer program product or article of manufacture according to the invention. As such, the terms "article of manufacture" and "computer program product" as used herein are intended to encompass a computer program accessible from any computer readable device or media.

Moreover, the Verification Condition Generator 112 and operating system 114 are both comprised of instructions which, when read and executed by the computer system 100, causes the computer system 100 to perform the steps necessary to implement and/or use the present invention. Under control of the operating system 114, the Verification Condition Generator 112 may be loaded from the memory 104, data storage device 106, and/or data communications device 108 into the memory 104 of the computer system 100 for use during actual operations.

Those skilled in the art will recognize many modifications may be made to this configuration without departing from the scope of the present invention.

2. Underlying Technologies

Every building has a foundation. The foundation of this invention is the collection of technologies that underlie the work. This section will describe these technologies, and give a sense of how these elements fit together to support the goal of program verification.

To make this more concrete, this application uses as an example a small programming language, similar to a subset of Pascal with assignment statements, conditionals, and while loops. Associated with this language is a language of assertions, which describe conditions about states in the computer. For these languages, their syntax and semantics are defined, and a Hoare logic is provided as an axiomatic semantics for partial correctness. Using this logic, a Verification Condition Generator 112 is defined for this programming language. Finally, this programming language and its Verification Condition Generator 112 is embedded within Higher Order Logic. This small programming language, in its simplicity, serves as a clear illustration to discuss the fundamental technologies and ideas present in this application. It is not sophisticated enough to display the new claimed technology of termination proofs, but is a pedagogical example to show prior technology.

2.1 Syntax

Table 2.1 contains the syntax of a small programming language, defined using Backus-Naur Form as a context-free grammar. The type of commands are denoted as cmd, with typical member c. It is taken as given that there is a type of numeric expressions exp with typical member e, and a type of boolean expressions bexp with typical member b. It is further assumed that these expressions contain all of the normal variables, constants, and operators.

These constructs are mostly standard. Informally, the skip command has no effect on the state. abort causes an immediate abnormal termination of the program. x:=e evaluates the numeric expression e and assigns the value to the variable x. $c_1$; $c_2$ executes command $c_1$ first, and if it terminates, then executes $c_2$. The conditional command if b then $c_1$ else $c_2$ fi first evaluates the boolean expression b; if it is true, then $c_1$ is executed, otherwise $c_2$ is executed. Finally, the iteration command assert a while b do c od evaluates b; if it is true, then the body c is executed, followed by executing the whole iteration command again, until b evaluates to false. The 'assert a' phrase of the iteration command does not affect its execution; this is here as an annotation to aid the verification condition generator. The significance of a is to denote an invariant, a condition that is true every time control passes through the head of the loop.

Annotations are written in an assertion language that is a partner to this programming language. The assertion language is used to expresses conditions that are true at particular moments in a program's execution. Usually these conditions are attached to specific points in the control structure, signifying that whenever control passes through that point, then the attached assertion evaluates to true. For this simple example, the assertion language is taken to be the first-order predicate logic with operators for the normal numeric and boolean operations. In particular, $a_1 \Rightarrow a_2 | a_3$ is a conditional expression, which first evaluates $a_1$, and then yields the value of $a_2$ or $a_3$ depending on whether $a_1$ was true or false, respectively. This also specifically includes the universal and existential quantifiers, ranging over nonnegative integers. The types of numeric expressions and boolean expressions in the assertion language are denoted as vexp and aexp, respectively, with typical members v and a. Also p and q are used occasionally as typical members of aexp.

The same operator symbols (like "+") are used in the programming and assertion languages, overloading the operators and relying on the reader to disambiguate them by context.

2.2 Semantics

The execution of programs depends on the state of the computer's memory. In this simple programming language, all variables have nonnegative integer values. Following the notation of HOL, the type of nonnegative integers are denoted by num and the type of truth values are denoted as bool. The type of variables are taken to be var, without specifying them completely at this time. Then states can be represented as functions of type state=var→num, and the value of a variable x in a state s is referred to as s x, using simple juxtaposition to indicate the application of a function to its argument.

Numeric and boolean expressions are evaluated by the curried functions E and B, respectively. Because these expressions may contain variables, their evaluation must refer to the current state.

| | |
|---|---|
| $E \ e \ s = n$ | Numeric expression $e$:exp evaluated in state $s$ yields numeric value $n$:num. |
| $B \ b \ s = t$ | Boolean expression $b$:bexp evaluated in state $s$ yields truth value $t$:bool. |

The notation f[e/x] indicates the function f updated so that $$f[e/x] = \begin{cases} e & \text{if } y = x, \text{ and} \\ f(y) & \text{if } y \neq x \end{cases}$$

The operational semantics of the programming language is expressed by the following relation:

C c $s_1$ $s_2$ Command c executed in state $s_1$ yields resulting state $s_2$.

Table 2.2 gives the structural operational semantics of the programming language, specified by rules inductively defining the relation C.

The semantics of the assertion language is given by recursive functions V and A defined on the structure of vexp and aexp, in a directly denotational fashion. Since the expressions may contain variables, their evaluation must refer to the current state.

V v s = n   Numeric expression v:vexp evaluated in state s yields numeric value n:num.
A a s = t   Boolean expression a:aexp evaluated in state s yields truth value t:bool.

This syntax and structural operational semantics is the foundational definition for this programming language and its meaning. It is complete, in that the details of any prospective computation are known, given the initial state and the program to be executed. However, it is not the easiest form with which to reason about the correctness of programs. For that, we need to turn to a more abstract representation of the semantics such as Hoare-style program logics.

2.3 Partial and Total Correctness

When talking about the correctness of a program, exactly what is meant? In general, this describes the consistency of a program with its specification. There have developed two versions of the specific meaning of correctness, known as partial correctness and total correctness. Partial correctness signifies that every time the program is run, every answer that it gives is consistent with what is specified. However, partial correctness admits the possibility of not giving any answer at all, by permitting the possibility of the program not terminating. A program that does not terminate is still said to be partially correct. In contrast, total correctness signifies that every time the program starts, it will in fact terminate, and the answer it gives will be consistent with what is specified.

The partial and total correctness of commands may be expressed by logical formulae called Hoare triples, each containing a precondition, a command, and a postcondition. The precondition and postcondition are boolean expressions in the assertion language. Traditionally, the precondition and postcondition are written with curly braces ({ }) around them to signify partial correctness, and with square braces ([ ]) to signify total correctness. For the example programming language and its assertion language, notations for partial and total correctness are defined in Table 2.3.

As described in the table, {a} is used to denote a boolean assertion expression which is true in all states. This is the same as having all of the free variables of a universally quantified, and so this is also known as the universal closure of a. close a denotes the same universal closure, but by means of a unary operator.

With these partial and total correctness notations, it now becomes possible to express an axiomatic semantics for a programming language, as a Hoare-style logic, which is described in the next section.

In this application, a larger programming language is studied that will include procedures with parameters. Verifying these procedures will introduce several new issues. It is an obvious but nevertheless significant feature that a procedure call has a semantics which depends on more than the syntactic components of the call itself-it must refer to the declaration of the procedure, which is external and part of the global context. This is unlike all of the constructs in the small example programming language given above.

The parameters to a procedure will include both value parameters, which are passed by value, and variable parameters, which are passed by name to simulate call-by-reference. The passing of these parameters, and their interaction with global variables, has historically been a delicate issue in properly defining Hoare-style rules for the semantics of procedure call. The inclusion of parameters also raises the need to verify that no aliasing has occurred between the actual variables presented in each call and the global variables which may be accessed from the body of the procedure, as aliasing greatly complicates the semantics in an intractable fashion.

To verify total correctness, it is necessary to prove that every command terminates, including procedure calls. If the termination of all other commands is established, a procedure call will terminate unless it initiates an infinitely descending sequence of procedure calls, which continue issuing new calls deeper and deeper and never finishing them. To prove termination, this infinite recursive descent must be proven to not occur. This will constitute a substantial portion of this application, as a new method for proving the termination of procedure calls is described, which we believe to be simpler, more general, and easier to use than previous proposals.

2.4 Hoare Logics

In [Hoa69], Hoare presented a way to represent the calculations of a program by a series of manipulations of logical formulae, which were symbolic representations of sets of states. The logical formulae, known as "axioms" and "rules of inference," gave a simple and beautiful way to express and relate the sets of possible program states at different points within a program. In fact, under certain conditions it was possible to completely replace a denotational or operational definition of the semantics of a language with this "axiomatic" semantics. Instead of involving states, these "rules" now dealt with symbolic formulae representing sets of possible states. This had the benefit of more closely paralleling the reasoning needed to actually prove a program correct, without being as concerned with the details of actual operational semantics. To some, reasoning about states seemed "lower level" and more representation-dependent than reasoning about expressions denoting relationships among variables.

To illustrate these ideas, consider the Hoare logic in Table 2.4 for the simple programming language developed so far.

In the rule for Assignment, the precondition is q ◁[e/x]. ◁ denotes the operation of proper substitution; hence, this denotes the proper substitution of the expression e for the variable x throughout the assertion q. There is one small problem with this which is that the expressions e and q are really from two different, though related, languages. We will intentionally gloss over this issue now, simply using e as a member of both languages. This also applies to b where it appears in the Conditional and Iteration rules.

Given these rules, we may now compose them to prove theorems about structured commands. For example, from the Rule of Assignment, we have $$\{x0 = 0*y0 + x \wedge y0 = y\}\ r := x\ \{x0 = 0*y0 + r \wedge y0 = y\}$$

and $$\{x0 = 0*y0 + r \wedge y0 = y\}\ q := 0\ \{x0 = q*y0 + r \wedge y0 = y\}$$

From these and the Rule of Sequence, we have $$\{x0 = 0*y0 + x \wedge y0 = y\}\ r := x; q := 0\ \{x0 = q*y0 + r \wedge y0 = y\}$$

For completeness, a Hoare logic will usually contain additional rules not based on particular commands, such as precondition strengthening or postcondition weakening. The Precondition Strengthening Rule in Table 2.4 is an example.

2.5 Soundness and Completeness

An axiomatic semantics for a programming language has the benefit of better supporting proofs of program correctness, without involving the detailed and seemingly mechanical apparatus of operational semantics. However, with this benefit of abstraction comes a corresponding weakness. The very fact that the new Hoare rules are more distant from the operational details means a greater possibility that in fact they might not be logically consistent. This question of consistency has two aspects, which are called soundness and completeness. Soundness is the quality that every rule in the axiomatic semantics is true for every possible computation described by the foundational operational semantics. A rule is sound if every computation that satisfies the antecedents of the rule also satisfies its consequent. Completeness is the quality of the axiomatic semantics of being expressive and powerful enough to be able to prove within the Hoare logic theorems that represent every computation allowed by the operational semantics. One could easily come up with a sound axiomatic semantics by having only a few trivial rules; but then one would never be able to derive useful results about interesting programs. Likewise, one could come up with powerful axiomatic semantics with which many theorems about programs could be proven; but if any one rule is not sound, the entire system is useless.

Of these two qualities, this application concentrates on soundness. By this choice, we do not intend to minimize the role or importance of completeness; it is simply a question of not being able to solve every problem at once. Nevertheless, we do feel that of the two qualities, soundness is in some sense the more vital one. A system that is sound but not complete may still be useful for proving many programs correct. A system that is complete but not sound will give you the ability to prove many seemingly powerful theorems about programs which are in fact not true with respect to the operational semantics.

Also, researchers have occasionally proposed rules for axiomatic semantics which were later found to be unsound. This problem has arisen, for example, in describing the passing of parameters in procedure calls. This history shows a need for some mechanism to more carefully establish the soundness of the rules of an axiomatic semantics, thereby establishing the rules as trustworthy, since all further proof efforts in that language depend on them.

2.6 Verification Condition Generators

Given a Hoare logic for a particular programming language, it may be possible to partially automate the process of applying the rules of the logic to prove the correctness of a program. Generally this process is guided by the structure of the program, applying in each case the Hoare logic rule for the command which is the major structure of the phrase under consideration.

A Verification Condition Generator 112 takes a suitably annotated program and its specification, and traces a proof of its correctness, according to the rules of the language's axiomatic semantics. Each command has its own appropriate rule which is applied when that command is the major structure of the current proof goal. This replaces the current goal by the antecedents of the Hoare rule. These antecedents then become the subgoals to be resolved by further applications of the rules of the logic.

At certain points, the rules require that additional conditions be met; for example, in the Iteration Rule in Table 2.4, there is the antecedent a∧~b→q. This is not a partial correctness formula, and so cannot be reduced further by rules of the Hoare logic. The Verification Condition Generator 112 emits this as a verification condition to be proven by the user.

As an example, Table 2.5 presents a Verification Condition Generator 112 for the simple programming language discussed so far. It consists of two functions, the main function vcg and a helper function vcg1. The square brackets [ and ] enclose a list, for which semicolons (';') separate list elements; the phrase [] denotes an empty list. Comma (',') creates a pair, and ampersand ('&') appends two lists together.

vcg1 has type cmd→aexp→(aexp×(aexp) list). This function takes a command and a postcondition, and returns a precondition and a list of verification conditions that must be proved in order to verify that command with respect to the precondition and postcondition. This function does most of the work of calculating verification conditions.

vcg1 is called by the main verification condition generator function, vcg, with type aexp→cmd→aexp→(aexp)list. vcg takes a precondition, a command, and a postcondition, and returns a list of the verification conditions for that command.

Given such a Verification Condition Generator 112, there are two interesting things to be asked about it. First, does the truth of the verification conditions it generates in fact imply the correctness of the program? If so, then the Verification Condition Generator 112 is sound. Second, if the program is in fact correct, does the Verification Condition Generator 112 generate verification conditions sufficient to prove the program correct from the axiomatic semantics? Such a Verification Condition Generator 112 is called complete. In this application, we will only focus on the first question, that of soundness.

2.7 Higher Order Logic

Higher Order Logic (HOL) is a mechanical proof assistant that mechanizes higher order logic, and provides an environment for defining systems and proving statements about them. It is secure in that only true theorems may be proven, and this security is ensured at each point that a theorem is constructed.

HOL has been applied in many areas. The first and still most prevalent use is in the area of hardware verification, where it has been used to verify the correctness of several microprocessors. In the area of software, HOL has been applied to Lamport's Temporal Logic of Actions (TLA), Chandy and Misra's UNITY language, Hoare's CSP, and Milner's CCS and πcalculus. HOL is one of the oldest and most mature mechanical proof assistants available, roughly comparable in maturity and degree of use with the Boyer-Moore Theorem Prover [BM88]. Many other proof assistants have been introduced more recently that in some ways surpass HOL, but HOL has one of the largest user communities and history of experience. It therefore is considered ideal for this work.

HOL differs from the Boyer-Moore Theorem Prover in that HOL does not attempt to automatically prove theorems, but rather provides an environment and supporting tools to the user to enable him to prove the theorems. Thus, HOL is better described as a mechanical proof assistant, recording the proof efforts and its products along the way, and maintaining the security of the system at each point, but remaining essentially passive and directed by the user. It is, however, powerfully programmable, and thus the user is free to construct programs which automate whatever theorem-proving strategy he desires.

2.7.1 Higher Order Logic as a Logic

Higher Order Logic is a version of predicate calculus which allows quantification over predicate and function symbols of any order. It is therefore an $\omega$-order logic, or finite type theory, according to Andrews [And86]. In such a type theory, all variables are given types, and quantification is over the values of a type. Type theory differs from set theory in that functions, not sets, are taken as the most elementary objects. Some researchers have commented that type theory seems to more closely and naturally parallel the computations of a program than set theory. A formulation of type theory was presented by Church in [Chu40]. Andrews presents a modern version in [And86] which he names $Q_0$. The logic implemented in the Higher Order Logic system is very close to Andrews' $Q_0$. This logic has the power of classical logic, with an intuitionistic style. The logic has the ability to be extended by several means, including the definition of new types and type constructors, the definition of new constants (including new functions and predicates), and even the assertion of new axioms.

The HOL logic is based on eight rules of inference and five axioms. These are the core of the logical system. Each rule is sound, so one can only derive true results from applying them to true theorems. As the HOL system is built up, each new inference rule consists of calls to previously defined inference rules, ultimately devolving to sequences of these eight primitive inference rules. Therefore the HOL proof system is fundamentally sound, in that only true results can be proven.

HOL provides the ability to assert new axioms; this is done at the user's discretion, and he then bears any responsibility for possible inconsistencies which may be introduced. Since such inconsistencies may be hard to predict intuitively, we have chosen in our use of the HOL system to restrict ourselves to never using the ability to assert new axioms. This style of using HOL is called a "definitional" or "conservative extension," because it is assured of never introducing any inconsistencies. In a conservative extension, the security of HOL is not compromised, and hence the basic soundness of HOL is maintained.

The theoretical foundation of the HOL logic is not described in detail herein, referring the interested reader to [GM93], because the purpose of this application is not the study of HOL itself, but rather its application as a tool to support the verification of Verification Condition Generators 112. Hence this application concentrates on describing the useful aspects of HOL that apply to the present invention.

2.7.2 Higher Order Logic as a Mechanical Proof Assistant

The HOL system provides the user a logic that can easily be extended, by the definition of new functions, relations and types. These extensions are organized into units called theories. Each theory is similar to a traditional theory of logic, in that it contains definitions of new types and constants, and theorems which follow from the definitions. It differs from a traditional theory in that a traditional theory is considered to contain the infinite set of all possible theorems which could be proven from the definitions, whereas a theory in HOL contains only the subset which have been actually proven using the given rules of inference and other tools of the HOL system.

When the HOL system it started, it presents to the user an interactive programming environment using the programming language ML, or Meta Language of HOL. The user types expressions in ML, which are then executed by the system, performing any side effects and printing the value yielded. The language ML contains the data types term and thm, which represent terms and theorems in the HOL logic. These terms represent a second language, called the Object Language (OL) of HOL, embedded within ML. ML functions are provided to construct and deconstruct terms of the OL language. Theorems, however, may not be so freely manipulated. Of central importance is the fact that theorems, objects of type thm, can only be constructed by means of the eight standard rules of inference. Each rule is represented as a ML function. Thus the security of HOL is maintained by implementing thm as an abstract data type.

Additional rules, called derived rules of inference, can be written as new ML functions. A derived rule of inference could involve thousands of individual calls to the eight standard rules of inference. Each rule typically takes a number of theorems as arguments and produces a theorem as a result. This methodology of producing new theorems by calling functions is called forward proof.

One of the strengths of HOL is that in addition to supporting forward proof, it also supports backwards proof, where one establishes a goal to be proved, and then breaks that goal into a number of subgoals, each of which is refined further, until every subgoal is resolved, at which point the original goal is established as a theorem. At each refinement step, the operation that is applied is called in HOL a tactic, which is a function of a particular type. The effect of applying a tactic is to replace a current goal with a set of subgoals which if proven are sufficient to prove the original goal. The effect of a tactic is essentially the inversion of an inference rule. Tactics may be composed by functions called tacticals, allowing a complex tactic to be built to prove a particular theorem.

Functions in ML are provided to create new types, make new definitions, prove new theorems, and store the results into theories on disk. These may then be used to support further extensions. In this incremental way a large system may be constructed.

2.8 Embeddings

Previous researchers have constructed representations of programming languages within HOL, of which the work of Gordon [Gor89] was seminal. He introduced new constants in the HOL logic to represent each program construct, defining them as functions directly denoting the construct's semantic meaning. This is known as a "shallow" embedding of the programming language in the HOL logic, using the terminology described in [BGG+92]. This approach yielded tools which could be used to soundly verify individual programs. However, there were certain fundamental limitations to the expressiveness of this approach, and to the theorems which could be proven about all programs. This was recognized by Gordon himself [Gor89]:

P[E/V] (substitution) is a meta notation and consequently the assignment axiom can only be stated as a meta theorem. This elementary point is nevertheless quite subtle. In order to prove the assignment axiom as a theorem within higher order logic it would be necessary to have types in the logic corresponding to formulae, variables and terms. One could then prove something like:

|-∀P,E,V. Spec(Truth(Subst(P,E,V)),
Assign(V, Value E), Truth P)

It is clear that working out the details of this would be a lot of work.

This application explores the alternative approach described but not investigated by Gordon. It yields great expressiveness and control in stating and proving as theorems within HOL concepts which previously were only describable as meta-theorems outside HOL.

To achieve this expressiveness, it is necessary to create a deeper foundation than that used previously. Instead of using an extension of the HOL Object Language as the programming language, an entirely new set of datatypes are created within the Object Language to represent constructs of the programming language and the associated assertion language. This is known as a "deep" embedding, as opposed to the shallow embedding developed by Gordon. This allows a significant difference in the way that the semantics of the programming language is defined. Instead of defining a construct as its semantics meaning, the construct is defined as simply a syntactic constructor of phrases in the programming language, and then the semantics of each construct is separately defined in a structural operational semantics. This separation means that the syntactic program phrases can now be decomposed and analyzed at the HOL Object Language level. Now the semantics of purely syntactic manipulations may be reasoned about within HOL, such as substitution or verification condition generation, since they exist within the HOL logic.

This has definite advantages because syntactic manipulations, when semantically correct, are simpler and easier to calculate. They encapsulate a level of detailed semantic reasoning that then only needs to be proven once, instead of having to be repeatedly proven for every occurrence of that manipulation. This will be a recurring pattern in this application, where repeatedly a syntactic manipulation is defined, and then its semantics is described, and proved correct within HOL.

2.9 Additional Information

Additional information concerning previous research can be found in Chapter 3 (and other parts) of the co-pending U.S. provisional application Ser. No. 60/016,357, filed Apr. 26, 1996, by inventor Peter Vincent Homeier, entitled "METHOD FOR VERIFYING THE TOTAL CORRECTNESS OF A PROGRAM WITH MUTUALLY RECURSIVE PROCEDURES", which application is incorporated by reference herein. Such additional information is also available in Chapter 3 (and other parts) of the Ph.D. dissertation entitled "TRUSTWORTHY TOOLS FOR TRUSTWORTHY PROGRAMS: A MECHANICALLY VERIFIED VERIFICATION CONDITION GENERATOR FOR THE TOTAL CORRECTNESS OF PROCEDURES", by inventor Peter Vincent Homeier, published by the University of California, Los Angeles, in June, 1995, which dissertation is incorporated by reference herein.

3. Sunrise Programming Language

In this section are described the Sunrise programming language and its associated assertion language, which is the language studied in this work. This is a representative member of the family of imperative programming languages, and its constructs will be generally familiar to programmers. The Sunrise language is presented in this application merely as an example of the kinds of langugaes to which this new invention may be applied, and is not intended to limit the invention in any way. Those skilled in the art will recognize that this invention can be applied to any language that includes procedures.

The constructs included in the Sunrise language have been carefully chosen to have natural, straightforward, and simple semantics, which will support proofs of correctness. To this end, the normal notation for some constructs has been extended, notably while loops and procedure declarations, to include annotations used in constructing the proof of a Sunrise program's correctness. These annotations are required, but have no effect on the actual operational semantics of the constructs involved. They could therefore be considered comments, except that they are used by the verification condition generator in order to produce an appropriate set of verification conditions to complete the proof.

In the past, there has been considerable debate over the need for the programmer to provide, say, a loop invariant. Some have claimed that this is an unreasonable burden on the programmer, who should have to provide only a program and an input/output specification. Others have replied that the requirement to provide a loop invariant forces clear thinking and documentation that should have been done in any case.

We would like to take the pragmatic position that the provision of loop invariants is necessary for the simple definition of verification condition generators, which are not complex functions. The same principle holds for the more complex annotations we require for procedures, that the provision of these annotations is necessary for simple and clean definitions of the program logic rules which serve as an axiomatic semantics for procedures. If one wishes to transfer the burden of coming up with the loop invariant from the human to the automatic computer, one incurs a great increase in the degree of difficulty of constructing the verification condition generator, including the need for automatic theorem provers, multiple decision procedures, and search strategies which have exponential time complexity. We wish to attempt something rather more tractable, and to perform only part of the task, in particular that part which seems most amenable to automatic analysis. This desire has guided the construction of the language here defined.

3.1 Programming Language Syntax

Table 3.1 contains the concrete syntax of the Sunrise programming language, defined using Backus-Naur Form as a context-free grammar.

Six types of phrases are defined in this programming language (Table 3.2):

The lexical elements of the syntax expressed in Table 3.1 are numbers and variables. Numbers (denoted by n) are simple unsigned decimal integers, including zero, with no a priori limit on size, to match the HOL type num. They cannot be negative, either as written or as the result of calculations.

Variables (denoted with x or y, etc.) are a new concrete datatype var consisting of two components, a string and a number. In HOL a character string may be of any length from zero or more. The name of a variable is typically printed as the string, followed immediately by the variant number, unless it is zero, when no number is printed; the possibility exists for ambiguity of the result. The parser expects the name of the variable to consist of letters, digits, and underscore ('_') except that the first character may also be a caret ('^'). However, the operations of the Verification Condition Generator 112 allow the string to contain any characters. The meaning of the string is to be the base of the name of the variable, and the meaning of the number is to be the variant number of the variable. Hence there might be several variables with the same string but differing in their number attribute, and these are considered distinct variables. This structure is used for variables to ease the construction of variants of variables, by simply changing (increasing) the variant number of the variable.

Variables are divided into two classes, depending on the initial character (if any) of the string. If the initial character is a caret ("^"), then the variable is a logical variable, otherwise it is a program variable. Program and logical variables are completely disjoint; "y" and "ŷ" are separate and distinct variables. Both kinds are permitted in assertion language expressions, but only program variables are permitted in programming language expressions. Since logical variables cannot appear in programming language expressions, they may never be altered by program control, and thus retain their values unchanged throughout a computation. " ŷ" is also sometimes written "ŷ".

The syntax given in Table 3.1 uses standard notations for readability. The actual data types (except for lists) are created in HOL as new concrete recursive datatypes, using Melham's type definition package [GM93]. The results of this definition includes the creation of the constructor functions for the various programming language syntactic phrases in Table 3.3. This forms the abstract syntax of the Sunrise programming language.

All the internal computation of the verification condition generator is based on manipulating expressions which are trees of these constructor functions and the corresponding ones for assertion language expressions. These trees are not highly legible. However, we have provided parsers and pretty-printing functions to provide an interface that is more human-readable, so that the constructor trees are not seen for most of the time.

3.2 Informal Semantics of Programming Language

The constructs in the Sunrise programming language, shown in Table 3.1, are mostly standard. The full semantics of the Sunrise language will be given as a structural operational semantics later in this section. But to familiarize the reader with these constructs in a more natural and understandable way, informal descriptions of the semantics of the Sunrise language are given here. This is intended to give the reader the gist of the meaning of each operator and clause in Table 3.1. The significance of the system of annotations for both partial and total correctness is also described.

3.2.1 Numeric Expressions n is an unsigned integer.

x is a program variable. It may not here be a logical variable.

++x denotes the increment operation, where x is a program variable as above. The increment operation adds one to the variable, stores that new value into the variable, and yields the new value as the result of the expression.

The addition, subtraction, and multiplication operators have their normal meanings, except that subtraction is restricted to nonnegative values, so x−y=0 for x≦y. The two operands of a binary operator are evaluated in order from left to right, and then their values are combined and the numeric result yielded.

3.2.2 Lists of Numeric Expressions

HOL provides a polymorphic list type, and a set of list operators that function on lists of any type. This list type has two constructors, NIL and CONS, with the standard meanings. In both its meta language and object language, HOL typically displays lists using a more compact notation, using square brackets ([]) to delimit lists and semicolons (;) to separate list elements. Thus NIL=[], and [2; 3; 5; 7] is the list of the first four primes. In this Sunrise programming language square brackets are reserved to denote total correctness specifications, and so angle brackets (< >) are used instead to denote lists within the Sunrise language, for example <2; 3; 5; 7> or < >. When dealing with HOL lists, however, the square brackets will still be used.

The numeric expressions in a list are evaluated in order from left to right and their values are combined into a list of numbers which is the result yielded.

3.2.3 Boolean Expressions

The operators provided here have their standard meaning, except for $es_1 << es_2$, which evaluates two lists of expressions and compares their values according to their lexicographic ordering. Here the left-most elements of each list are compared first, and if the element from $es_1$ is less, then the test is true; if the element from $es_1$ is greater, then the test is false; and if the element from $es_1$ is the same as (equal to) the element from $es_2$, then these elements are discarded and the tails of $es_1$ and $es_2$ are compared in the same way, recursively.

For every operator here, the operands are evaluated in order from left to right, and their values combined and the boolean result yielded.

3.2.4 Commands

The skip command has no effect on the state. The abort command causes an immediate abnormal termination of the program. x:=e evaluates the numeric expression e and assigns the value to the variable x, which must be a program variable. $c_1; c_2$ executes command $c_1$ first, and if it terminates, then executes $c_2$. The conditional command if b then $c_1$ else $c_2$ fi first evaluates the boolean expression b; if it is true, then $c_1$ is executed, otherwise $c_2$ is executed.

The iteration command assert a with apr while b do c od evaluates b; if it is true, then the body c is executed, followed by executing the whole iteration command again, until b evaluates to false, when the loop ends. The "assert a" and "with $a_{pr}$" phrases of the iteration command do not affect its execution; these are here as annotations to aid the verification condition generator. a denotes an invariant, a condition that is true every time control passes through the head of the loop. This is used in proving the partial correctness of the loop.

In contrast, $a_{pr}$ denotes a progress expression, which here must be of the form v<x, where v is a assertion language numeric expression and x is a logical variable. v may only contain program variables. Assertion language expressions will be defined presently; here, v serves as a variant, an expression whose value strictly decreases every time control passes through the head of the loop. This is used in proving the termination of the loop. In future versions of the Sunrise programming language, $a_{pr}$ will be broadened to other expressions, such as vs<<xs, whose variants describe values of well-founded sets.

Finally, $p(x_1, \ldots, x_n; e_1, \ldots, e_m)$ denotes a procedure call. This first evaluates the actual value parameters $e_1, \ldots, e_m$ in order from left to right, and then calls procedure p with the resulting values and the actual variable parameters $x_1, \ldots, x_n$. The value parameters are passed by value; the variable parameters are passed by name, to simulate call-by-reference. The call must match the declaration of p in the number of both variable and value parameters. Aliasing is forbidden, that is, the actual variable parameters $x_1, \ldots, x_n$, may not contain any duplicates, and may not duplicate any global variables accessible from p. The body of p has the actual variable parameters substituted for the formal variable parameters. This substituted body is then executed on the state where the values from the actual value parameters have been bound to the formal value parameters. If the body terminates, then at the end the values of the formal value parameters are restored to their values before the procedure was entered. The effect of the procedure call is felt in the actual variable parameters and in the globals affected.

3.2.5 Declarations

The main kind of declaration is the procedure declaration: the other forms simply serve to create lists of procedure declarations or empty declarations. The procedure declaration has the concrete syntax procedure p (var $x_1, \ldots, x_n$; val $y_1, \ldots y_m$);
  global $z_1, \ldots z_k$;
  pre $a_{pre}$;
  post $a_{post}$;
  calls $p_1$ with $a_1$;
  calls $p_j$ with $a_j$;
  recurses with $a_{rec}$;
  c
end procedure This syntax is somewhat large and cumbersome to repeat; usually the following lithe abstract syntax version is used instead:

proc p vars vals gibs pre post calls rec c
where it is understood to mean p=p
vars=$x_1, \ldots, x_n$
vals=$y_1, \ldots, y_m$
vars=$z_1, \ldots, z_k$
pre=$a_{pre}$
post=$a_{post}$
calls=$(\lambda p.\ \text{false})[a_j/p_j] \ldots [a_1/p_1]$
rec=$a_{rec}$
c=c Note that the calls parameter is now a progress environment of type prog_env, where prog_env=string→aexp, a function from procedure names to progress expressions, to serve as the collection of all the calls . . . with phrases given.

The meaning of each one of these parameters is as follows:

p is the name of the procedure, a simple string.

vars is the list of the formal variable parameters, a list of variables. If there are no formal variable parameters, the entire "var $x_1, \ldots, x_n$" phrase may be omitted.

vals is the list of the formal value parameters, a list of variables. If there are no formal value parameters, the entire "val $y_1, \ldots, y_m$" phrase may be omitted.

gibs is the list of the global variables accessible from this procedure. This includes not only those variables read or written within the body of this procedure, but also those read or written by any procedure called immediately or eventually by the body of this procedure. Thus it is a list of all globals which can possibly be read or written during the course of execution of the body once entered. If there are no globals accessible, the entire "global $z_1, \ldots z_k$;" phrase may be omitted.

pre is the precondition of this procedure. This is a boolean expression in the assertion language, which denotes a requirement that must be true whenever the procedure is entered. Only program variables may be used.

post is the postcondition of this procedure. This is a boolean expression in the assertion language, which denotes the relationship between the states at the entrance and exit of this procedure. Two kinds of variables may be used in post, program variables and logical variables. The logical variables will denote the values of variables at the time of entrance, and the program variables will denote the values of the variables at the time of exit. The postcondition expresses the logical relationship between these two sets of values, and thus describes the effect of calling the procedure.

calls is the progress environment, the collection of all the calls . . . with phrases given. Each "calls $p_i$ with $a_i$" phrase expresses a relationship between two states, similar to the post expression but for different states. The first state is that at the time of entrance of this procedure p. The second state is that at any time that procedure $p_i$ is called directly from the body of p. That is, if while executing the body of p there is a direct call to $p_i$, then the second state is that just after entering $p_i$. Expression $a_i$ is a progress expression. Similar to the post expression, there are two kinds of variables that may be used in $a_1$, program variables and logical variables. The logical variables will denote the values of variables at the time of entrance of p, and the program variables will denote the values of the variables at the time of entrance of $p_i$. The progress expression gives the logical relationship between these two sets of values, and thus describes the degree of progress achieved between these calls.

rec is the recursion expression for this procedure. It is a progress expression, similar to the progress expression of an iteration command, describing a relationship between two states. For rec, the first state is that at the time of entrance of p, and the second state is any time of entrance of p recursively (at any depth) as part of executing the body of p for the first call. Similar to the post expression, there are two kinds of variables that may be used in rec, program variables and logical variables. The logical variables will denote the values of variables at the time of original entrance of p, and the program variables will denote the values of the variables at the times of recursive entrance of p. The rec expression gives the logical relationship between these two sets of values, and thus describes the degree of progress achieved between recursive calls. There are two permitted forms for rec. rec may be of the form v<x, where v is an assertion language numeric expression and x is a logical variable, or rec may be false. false is appropriate when the procedure p is not recursive and cannot call itself. Otherwise, v<x should be used. v may only contain program variables: it serves as a variant, an expression whose value strictly decreases for each recursive call. Thus if v was equal to x at the time rec was originally called, then at any recursive call to p nested within that first call to p, we should have v<x. In the future, this will be broadened to include other expressions, such as vs<<xs, whose variants describe values in well-founded sets, and the strict decrease described will be in terms of the relation used, e.g., <<. If this procedure is not expected to ever call itself recursively, then the phrase "recurses with $a_{rec}$;" may be omitted, in which case rec is taken by default to be false.

Command c is the body of this procedure. It may only use variables appearing in vars, vals, or glbs.

The actual significance of the various annotations, especially calls and rec, will be explained in greater depth and illustrated with examples in later sections.

3.2.6 Programs

A program consists of a declaration of a set of procedures and a command as the main body. The declarations are processed to create a procedure environment ρ of type env, collecting all of the information declared for each procedure into a function from procedure names to tuples of the following form:

ρp=(vars, vals, gibs, pre, post, calls, rec, c).

The definition of env is env=string→((var)list×(var)list×(var)list×aexp×aexp× prog_env×aexp×cmd).

This environment is the context used for executing the bodies of the procedures themselves, and also for executing the main body of the program.

The program is considered to begin execution in a state where the value of all variables is zero; however, this initial state is not included in the proof of a program's correctness. A future version of the Sunrise program may have an arbitrary initial state, and the same programs will prove correct.

3.3 Assertion Language Syntax

Table 3.4 contains the syntax of the Sunrise assertion language, defined using Backus-Naur Form as a context-free grammar.

Three types of phrases are defined in this assertion language, in Table 3.5.

The above syntax uses standard notations for readability. The actual data types are created in HOL as new concrete recursive datatypes, using Melham's type definition package [GM93]. The results of this definition includes the creation of the constructor functions for the various assertion language syntactic phrases in Table 3.6. This forms the abstract syntax of the Sunrise assertion language.

3.4 Informal Semantics of Assertion Language

The constructs in the Sunrise assertion language, shown in Table 3.4, are mostly standard. The full semantics of the Sunrise assertion language will be given as a denotational semantics later in this section. But to familiarize the reader with these constructs in a more natural and understandable way, informal descriptions of the semantics of the Sunrise assertion language are provided here. This is intended to give the reader the gist of the meaning of each operator and clause.

The evaluation of any expression in the assertion language cannot change the state; hence it is immaterial in what order subexpressions are evaluated.

3.4.1 Numeric Expressions n is an unsigned integer, as before for the programming language.

x is a variable, which may be either a program variable or a logical variable.

The addition, subtraction, and multiplication operators have their normal meanings, except that subtraction is restricted to nonnegative values, so x−y=0 for x≦y.

3.4.2 Lists of Numeric Expressions

These are similar to the lists of numeric expressions described previously for the programming language, except that the constituent expressions are assertion language numeric expressions. This list type has two constructors, NIL and CONS, with the standard meanings.

3.4.3 Boolean Expressions

Most of the operators provided here have their standard meaning, and are similar to their counterparts in the programming language, if one exists. true and false are the logical constants. = and < have the normal interpretation, and so do the various boolean operators, such as conjunction ∧ and disjunction ∨ $vs_1 << vs_2$ evaluates two lists of expressions and compares their values according to their lexicographic ordering. ($a_1 => a_2 | a_3$) is a conditional expression, first evaluating $a_1$, and then yielding the value of $a_2$ or $a_3$ respectively, depending on whether $a_1$, evaluated to T or F, which are the HOL truth constants. close a forms the universal closure of a, which is true when a is true for all possible assignments to its free variables. We have specifically included the universal and existential quantifiers; all quantification is over the nonnegative integers.

3.5 Formal Semantics

This section presents the structural operational semantics of the Sunrise programming language, according to the style of Plotkin [Plo81] and Hennessey [Hen90]. Also, the semantics of the Sunrise assertion language are presented in denotational style.

The definitions in this section are the primary foundation for all succeeding proof activity. In particular, it is from these definitions from which the Verification Condition Generator 112 presented hereinafter is proven sound.

These extensions to the HOL system are purely definitional. No new axioms are asserted. This is therefore classified as a "conservative extension" of HOL, and there is no possibility of unsoundness entering the system. This security was essential to this invention. These proofs culminated in the Verification Condition Generator 112 soundness theorems, and once proven, the theorems are applied to example programs without needing to retrace the same proofs for each example.

This significant expenditure of effort was necessary because of the history of unsoundness in proposed axiomatic semantics, particularly in relation to procedures. After constructing the necessary proofs, we are grateful for the unrelenting vigilance of the HOL system, which kept us from proving any incorrect theorems. Apparently it is easier to formulate a correct structural operational semantics than it is to formulate a sound axiomatic semantics. This agrees with our intuition, that an axiomatic semantics is inherently higher-level than operational semantics, and omits details covered at the lower level. We exhibit this structural operational semantics as the critical foundation for our work, and present it for the research community's appraisal.

As previously described, the programming language has six kinds of phrases, and the assertion language has three. For each programming language phrase, a relation is defined to denote the semantics of that phrase. The structural operational semantics consists of a series of rules which together constitute an inductive definition of the relation. This is implemented in HOL using Melham's excellent library [Mel91] for inductive rule definitions.

The semantics of the assertion language is defined in a denotational style. For each assertion language phrase, a function is defined which yields the interpretation of that phrase into the HOL Object Language. This is implemented in HOL using Melham's tool for defining recursive functions on concrete recursive types [Mel89]. The types used here are the types of the assertion language phrases.

3.5.1 Programming Language Structural Operational Semantics

The structural operation semantics of the six kinds of Sunrise programming language phrases is expressed by the six relations in Table 3.7.

In Table 3.8, the rules that inductively define the numeric expression semantic relation E are presented. This is a structural operational semantics for numeric expressions.

In Table 3.9, the rules that inductively define the numeric expression list semantic relation ES are presented. This is a structural operational semantics for lists of numeric expressions. The ES relation was actually defined in HOL as a list recursive function, with two cases for the definition based on NIL or CONS.

In Table 3.10, the rules that inductively define the boolean expression semantic relation B are presented. This is a structural operational semantics for boolean expressions.

In Table 3.11, the rules that inductively define the command semantic relation C are presented. This is a structural operational semantics for commands.

In Table 3.12, the rules that inductively define the declaration semantic relation D are presented. This is a structural operational semantics for declarations.

In Table 3.13, the rules that inductively define the program semantic relation P are presented. This is a structural operational semantics for programs. As used in this definition, $\rho_0$ is defined as the empty environment:

$\rho_1 = \lambda p.$ [], [], [], false, true, ($\lambda p.$ false), false, abort), and $s_0$ as the initial state $s_0 = \lambda x.\ 0$.

3.5.2 Assertion Language Denotational Semantics

The denotational semantics of the three kinds of Sunrise assertion language phrases is expressed by the three functions in Table 3.14.

In Table 3.15, a denotational definition of the assertion language semantic function V for numeric expressions is presented.

In Table 3.16, a denotational definition of the assertion language semantic function VS for lists of numeric expressions is presented.

In Table 3.17, a denotational definition of the assertion language semantic function A for boolean expressions is presented.

The lexicographic ordering << is defined as $$[] \ll [] = F$$
$$[] \ll CONS\ n\ ns = T$$
$$CONS\ n\ ns \ll [] = F$$
$$CONS\ n_1\ ns_1 \ll CONS\ n_2\ ns_2 = (n_1 < n_2) \vee (n_1 = n_2 \wedge ns_1 \ll ns_2)$$

This concludes the definition of the semantics of the assertion language.

The Sunrise language is properly thought of as consisting of both the programming language and the assertion language, even though the assertion language is never executed, and only exists to express specifications and annotations, to facilitate proofs of correctness. The two languages are different in character. The semantics of the programming language is very dependent on time; it both responds to and causes the constantly changing state of the memory. In contrast, the assertion language has a timeless quality, where, for a given state, an expression will always evaluate to the same value irrespective of how many times it is evaluated. The variables involved also reflect this, where program variables often change their values during execution, but logical variables never do. The programming language is an active, involved participant in the execution as it progresses; the assertion language takes the role of a passive, detached observer of the process.

This difference carries over to how the languages are used. States and their changes in time are the central focus of the operational semantics, whereas assertions and their permanent logical interrelationships are the focus of the axiomatic semantics. Programs in the programming language are executed, causing changes to the state. Assertions in the assertion language are never executed or even evaluated. Instead they are stepping stones supporting the proofs of correctness, which also have a timeless quality. Done once for all possible executions of the program, a proof replaces and exceeds any finite number of tests.

3.6 Procedure Entrance Semantic Relations

In addition to the traditional structural operational semantics of the Sunrise programming language, semantic relations that connect to states reached at the entrances of procedures called from within a command are also defined. These semantic relations are used to define the correctness specifications for the Entrance Logic.

The entrance structural operational semantics of commands and procedures is expressed by the two relations described in Table 3.18.

In Table 3.19, rules that inductively define the command semantic relation C_calls are presented.

In Table 3.20, rules that inductively define the procedure path semantic relation M_calls are presented.

3.7 Termination Semantic Relations

In addition to the other structural operational semantics of the Sunrise programming language, two semantic relations that describe the termination of executions begun in states reached at the entrances of procedures called from within a command are also defined. These semantic relations are used to define the correctness specifications for the Termination Logic.

The termination semantics of commands and procedures is expressed by the two relations in Table 3.21. These termination semantic relations are true when all direct calls from c or from the body of $p_1$ are known to terminate.

In Tables 3.22 and 3.23, the definitions of the command termination semantic relation C_calls_terminate and the procedure path termination semantic relation M_calls_terminate are presented.

The definitions of the relations presented in this section define the semantics of the Sunrise programming language, as a foundation for all later work. From this point on, all descriptions of the meanings of program phrases will be proven as theorems from this foundation, with the proofs mechanically checked. This will ensure the soundness of the later axiomatic semantics, a necessary precondition to a verified Verification Condition Generator 112.

4. Verification Condition Generator

In this section, a vcg for the Sunrise programming language is described. This is a function that analyzes programs with specifications to produce an implicit proof of the program's correctness with respect to its specification, modulo a set of verification conditions which need to be proven by the programmer. This reduces the problem of proving the program correct to the problem of proving the verification conditions. This is a partial automation of the program proving process, and significantly eases the task.

The previous discussions of many different correctness specifications and Hoare-style rules all culminate here, and contribute to the correctness of the Verification Condition Generator 112 presented. All the rules condense into a remarkably small definition of the verification condition generator. The operations of the Verification Condition Generator are simple syntactic manipulations, which may be easily and quickly executed.

The correctness that is proven by the Verification Condition Generator 112 is total correctness, including the termination of programs with mutually recursive procedures. Much of the work involved is aimed at establishing the termination of programs. This is the part of the verification condition generator which is most novel. The partial correctness of programs is verified by the Verification Condition Generator producing a fairly standard set of verification conditions, based on the structure of the syntax of bodies of procedures and the main body of the program. Termination is verified by the Verification Condition Generator producing new kinds of verification conditions arising from the structure of the procedure call graph.

4.1 Definitions

In this section, the primary functions that make up the verification condition generator are defined.

4.1.1 Partial Correctness

Additional information concerning various aspects of the Verification Condition Generator 112, including variants, Substitution, Translation, Well-Formedness, and Semantic Stages can be found in Chapter 10 (and other parts) of the co-pending U.S. provisional application Ser. No. 60/016,357, filed Apr. 26, 1996, by Peter Vincent Homeier, entitled "METHOD FOR VERIFYING THE TOTAL CORRECTNESS OF A PROGRAM WITH MUTUALLY RECURSIVE PROCEDURES", which application is incorporated by reference herein. Such additional information is also available in Chapter 10 (and other parts) of the Ph.D. dissertation entitled "TRUSTWORTHY TOOLS FOR TRUSTWORTHY PROGRAMS: A MECHANICALLY VERIFIED VERIFICATION CONDITION GENERATOR FOR THE TOTAL CORRECTNESS OF PROCEDURES", by inventor Peter Vincent Homeier, published by the University of California, Los Angeles, in June, 1995, which dissertation is incorporated by reference herein.

4.1.2 Program Logics

The following describes some of the program logics used in the present invention. Additional information concerning various aspects of the program logics can be found in Chapter 6 (and other parts) of the co-pending U.S. provisional application Ser. No. 60/016,357, filed Apr. 26, 1996, by Peter Vincent Homeier, entitled "METHOD FOR VERIFYING THE TOTAL CORRECTNESS OF A PROGRAM WITH MUTUALLY RECURSIVE PROCEDURES", which application is incorporated by reference herein. Such additional information is also available in Chapter 6 (and other parts) of the Ph.D. dissertation entitled "TRUSTWORTHY TOOLS FOR TRUSTWORTHY PROGRAMS: A MECHANICALLY VERIFIED VERIFICATION CONDITION GENERATOR FOR THE TOTAL CORRECTNESS OF PROCEDURES", by inventor Peter Vincent Homeier, published by the University of California, Los Angeles, in June, 1995, which dissertation is incorporated by reference herein.

4.1.2.1 Call Progress Function

The call-rogress function can compute the appropriate precondition when starting execution from the entrance of one procedure to establish a given entrance condition for another procedure as true. It is defined in Table 4.1.

This is a specific example of such a function, made in particular to fit the exact semantics of the Sunrise language. Those skilled in the art will understand that the present invention also covers adaptations of this to match the semantics of other languages.

Once the environment $\rho$ is proven to be well-formed for calls progress, the following rule, proven as a theorem, applies for proving the effect of the call_progress function across a single procedure call.

Call Progress Rule:

$$WF_{env\_syntax}\rho, WF_{env\_calls}\rho$$

$$\rho p_1 = \langle vars, vals, glbs, pre, post, calls, rec, c \rangle$$

$$\rho p_2 = \langle vars', vals', glbs', pre', post', calls', rec', c' \rangle$$

-continued $$y = vars' \;\&\; vals' \;\&\; glbs'$$

$$FV_a q \subseteq SL(y \;\&\; logicals\; z)$$

$$\overline{\{pre \wedge call\_progress\; p_1\; p_2\; q\; \rho\}\; p_1 - \langle\rangle \to p_2\; \{q\}/\rho}$$

4.1.2.1.1 Example of Call Progress Specification

As an example, consider the progress of calls from procedure odd to procedure even in the odd/even program presented in Table 4.2. It has been proved that the correctness of the claim in the heading for procedure odd that calls even with n<n̂, that the value of the n argument to even must be strictly less than the value of n at the head of the of the body of odd.

Then, by the Call Progress Rule given above, we have:

$$\{\text{true} \wedge call\_progress\; odd\; even\; (n < \hat{n})\rho\}\; odd - \langle\rangle \to even\; \{n < \hat{n}\}/\rho$$

The invocation of call_progress evaluates as:

$$call\_progress\; odd\; even\; (n < \hat{n})\rho$$

$$= (\forall a, n.\; ((n < \hat{n}) \triangleleft [\hat{a}, \hat{n}_1 / \hat{a}, \hat{n}]) \Rightarrow (n < \hat{n})) \triangleleft [a, n/\hat{a}, \hat{n}_1]$$

$$= (\forall a, n.\; (n < \hat{n}_1) \Rightarrow (n < \hat{n})) \triangleleft [a, n/\hat{a}, \hat{n}_1]$$

$$= (\forall a_1, n_1.\; (n_1 < \hat{n}_1) \Rightarrow (n_1 < \hat{n})) \triangleleft [a, n/\hat{a}, \hat{n}_1]$$

$$= \forall a_1, n_1.\; (n_1 < n) \Rightarrow (n_1 < \hat{n})$$

Thus, we have proven:

$$\{\forall a_1, n_1.\; (n_1 < n) \Rightarrow (n_1 < \hat{n})\}\; odd - \langle\rangle \to even\; \{n < \hat{n}\}/\rho$$

A similar pattern of reasoning could be followed to proved the following:

$$\{\forall a_1, n_1.(n_1 < n) \Rightarrow (n_1 < \hat{n})\}$$

$$even - \langle\rangle \to even\; \{n < \hat{n}\}/\rho$$

$$\{\forall a_1, n_1.(n_1 < n) \Rightarrow (\forall a_2, n_2.(n_2 < n_1) \Rightarrow (n_2 < \hat{n}))\}$$

$$odd - \langle\rangle \to odd\; \{\forall a_1, n_1.(n_1 < n) \Rightarrow (n_1 < \hat{n})\}/\rho$$

$$\{\forall a_1, n_1.(n_1 < n) \Rightarrow (\forall a_2, n_2.(n_2 < n_1) \Rightarrow (n_2 < \hat{n}))\}$$

$$even - \langle\rangle \to odd\; \{\forall a_1, n_1.(n_1 < n) \Rightarrow (n_1 < \hat{n})\}/\rho$$

4.1.2.2 Call Path Progress Function

Just as the call_progress function can compute the appropriate precondition across a single procedure call, the call_path_progress function can compute the appropriate precondition when starting execution from the entrance of one procedure to establish a given entrance condition at the end of a path of procedure calls. It is defined in Table 4.3.

Once the environment $\rho$ is proven to be well-formed preconditions and for calls progress, the following rule, proven as a theorem, applies for proving the effect of the call_path_progress function across a path of procedure calls.

$$WF_{env\_syntax}\rho, WF_{env\_pre}\rho\;\; WF_{env\_calls}\rho$$

$$\rho p_1 = \langle vars, vals, glbs, pre, post, calls, rec, c \rangle$$

-continued $$pp_2 = \langle vars', vals', glbs', pre', post', calls', rec', c' \rangle$$

$$y = vars' \ \& \ vals' \ \& \ glbs'$$

$$FV_a q \subseteq SL(y \ \& \ logicals \ z)$$

$$\overline{\{pre \wedge call\_path\_progress \ p_1 \ ps \ p_2 \ q \ \rho\} \ p1 - ps \rightarrow p_2 \ \{q\} / \rho}$$

4.1.2.2.1 Example of Call Path Progress Specification

As an example, consider the progress of paths of procedure calls that involve the procedure even in the odd/even program presented in Table 4.2. Examining the procedure call graph in FIG. 2, we can observe several cycles that include the even node. Let us assume the correctness of the call progress parts of the headers of the procedures as declared, that is, that every calls . . . with clause has been verified to be true.

Then, consider the path odd→odd→even. By the Call Path Progress Rule given above, we have:

$$\{\mathbf{true} \wedge call\_path\_progress \ odd \ \langle odd \rangle \ even \ (n < \hat{n}) \rho\}$$

$$odd - \langle odd \rangle \rightarrow even \ \{n < \hat{n}\} / \rho$$

We previously evaluated call-progress odd even $(n<\hat{n}) \ \rho$ as:

$$call\_progress \ odd \ even \ (n < \hat{n}) \rho = \forall \ a_1, n_1.(n_1 < n) \Rightarrow (n_1 < \hat{n})$$

Using this, we can evaluate the invocation of call_path_progress as call_path_progress odd (odd) even $(n<\hat{n})$ $$= call\_progress \ odd \ odd \ (call\_path\_progress \ odd \ \langle \rangle \ even \ (n < \hat{n}) \rho) \rho$$

$$= call\_progress \ odd \ odd \ (call\_progress \ odd \ even \ (n < \hat{n}) \rho) \rho$$

$$= call\_progress \ odd \ odd \ (\forall \ a_1, n_1.(n_1 < n) \Rightarrow (n_1 < \hat{n})) \rho$$

$$= (\forall \ a, n. \ ((n < \hat{n}) \triangleleft [\hat{a}, \hat{n}_1 / \hat{a}, \hat{n}]) \Rightarrow$$

$$(\forall \ a_1, n_1. \ (n_1 < n) \Rightarrow (n_1 < \hat{n}))) \triangleleft [a, n / \hat{a}, \hat{n}_1]$$

$$= (\forall \ a, n. \ (n < \hat{n}_1) \Rightarrow (\forall \ a_1, n_1. \ (n_1 < n) \Rightarrow (n_1 < \hat{n}))) \triangleleft [a, n / \hat{a}, \hat{n}_1]$$

$$= (\forall \ a_1, n_1. \ (n_1 < \hat{n}_1) \Rightarrow (\forall \ a_2, n_2. \ (n_2 < n_1) \Rightarrow (n_2 < \hat{n}))) \triangleleft [a, n / \hat{a}, \hat{n}_1]$$

$$= (\forall \ a_1, n_1. \ (n_1 < n) \Rightarrow (\forall \ a_2, n_2. \ (n_2 < n_1) \Rightarrow (n_2 < \hat{n})))$$

Thus, we have proven:

$$\{\forall \ a_1, n_1. \ (n_1 < n) \Rightarrow (\forall \ a_2, n_2. \ (n_2 < n_1) \Rightarrow (n_2 < \hat{n}))\}$$

$$odd - \langle odd \rangle \rightarrow even \ \{n < \hat{n}\} / \rho$$

Similar patterns of reasoning could be followed to prove the following:

$$\{(\forall \ a_1, n_1. \ (n_1 < n) \Rightarrow (\forall \ a_2, n_2. \ (n_2 < n_1) \Rightarrow (n_2 < \hat{n}))\}$$

$$even - \langle odd \rangle \rightarrow even \ \{n < \hat{n}\} / \rho$$

$$\{(\forall \ a_1, n_1. \ (n_1 < n) \Rightarrow (n_1 < \hat{n})\}$$

$$even - \langle \rangle \rightarrow even \ \{n < \hat{n}\} / \rho$$

4.1.2.3 Hoare Logic for Total Correctness
4.1.2.3.1 Total Correctness Specification

| | |
|---|---|
| | $[a_1] \ c \ [a_2] / \rho$ |
| $a_1$ | precondition |
| $c$ | command |
| $a_2$ | postcondition |
| $\rho$ | procedure environment |

4.1.2.3.2 Semantics of Total Correctness Specification $$[a_1] c [a_2] / \rho = (\forall \ s_1 s_2. \ Aa_1 s_1 \wedge C c \rho s_1 s_2 \Rightarrow Aa_2 s_2) \wedge$$

$$(\forall \ s_1. \ Aa_1 s_1 \Rightarrow (\exists \ s_2. \ Cc \rho s_1 s_2))$$

If the command c is executed, beginning in a state satisfying $a_1$, then the execution terminates in a state satisfying $a_2$.

Consider the Hoare logic in Tables 4.4 and 4.5 for total correctness. This is a traditional Hoare logic for total correctness, except that we have added /ρ at the end of each specification to indicate the ubiquitous procedure environment. This must be used to resolve the semantics of procedure call. However, the environment ρ never changes during the execution of the program, and hence could be deleted from every specification, being understood in context. Of particular interest are the Rule of Adaptation and the Procedure Call Rule. Each rule has been proved completely sound from the corresponding rules in Tables 4.6 and 4.7, using the following rule:

$$\frac{\{p\}c\{q\}/\rho}{[p]c\Downarrow/\rho}$$
$$\overline{[p]c[q]/\rho}$$

The procedure environment ρ is defined to be well-formed for correctness if for every procedure p, its body is totally correct with respect to the given precondition and postcondition:

$$WF_{env\_correct}\rho = \forall \ p. \ \text{let} \ \langle vars, vals, glbs, pre, post, calls, rec.c \rangle = \rho p \ \text{in}$$

$$\text{let} \ x = vars \ \& \ vals \ \& \ glbs \ \text{in}$$

$$\text{let} \ x_0 = logicals \ x \ \text{in}$$

$$[x_0 = x \wedge pre]c[post] / \rho$$

An environment ρ is well-formed for correctness if and only if it is well-formed for partial correctness and for termination.

$$WF_{env\_correct}\rho = WF_{env\_partial}\rho \wedge WF_{env\_total}\rho$$

4.1.3 Verification of Commands

There are two Verification Condition Generator functions that analyze commands. The main function is the vcgc function. Most of the work of vcgc is done by a helper function, vcg1.

In the definitions of these functions, comma (,) makes a pair of two items, square brackets ([]) delimit lists, semicolon (;) within a list separates elements, and ampersand (&) appends two lists. In addition, the function dest< is a destructor function, breaking an assertion language expression of the form $v_0 < v_1$ into a pair of its constituent subexpressions, $v_0$ and $v_1$.

The vcg1 function is presented in Table 4.8. This function has type cmd→prog_env→aexp→env→(aexp×(aexp)list). vcg1 takes a command, a calls progress environment, a postcondition, and a procedure environment, and returns a precondition and a list of verification conditions that must be proved in order to verify that command with respect to the precondition, postcondition, and environments. vcg1 is defined recursively, based on the structure of the command argument. Note that the procedure call clause includes calls p; this inclusion causes the verification conditions generated to verify not only the partial correctness of the command, but also the calls progress claims present in calls.

The vcgc function is presented in Table 4.9. This function has type aexp→cmd→prog_env→aexp→env→(aexp)list. vcgc takes a precondition, a command, a calls progress environment, a postcondition, and a procedure environment, and returns a list of verification conditions that must be proved in order to verify that command with respect to the precondition, postcondition, and environments.

4.1.4 Verification of Declarations

The verification condition generator function to analyze declarations is vcgd. The vcgd function is presented in Table 4.0. This function has type dec1→env→(aexp)list. vcgd takes a declaration and a procedure environment, and returns a list of verification conditions that must be proved in order to verify the declaration's body with respect to the precondition, postcondition, and environments.

4.1.5 Verification of Call Graph

The next several functions deal with the analysis of the structure of the procedure call graph. The description begins with the lowest level functions, and build up to the main Verification Condition Generator function for the procedure call graph, vcgg.

There are two mutually recursive functions at the core of the algorithm to analyze the procedure call graph, extend_graph_vcs and fan_out_graph_vcs. They are presented together in Table 4.11. Each yields a list of verification conditions to verify progress across parts of the graph. In the definitions, SL converts a list to a set, and CONS adds an element to a list. MAP applies a function to each element of a list, and gathers the results of all the applications into a new list which is the value yielded. FLAT takes a list of lists and appends them together, to "flatten" the structure into a single level, a list of elements from all the lists.

The purpose of the graph analysis is to verify that the progress specified in the recurses with clause for each procedure is achieved for every possible recursive call of the procedure. The general process is to begin at a particular node of the call graph, and explore backwards through the directed arcs of the graph. The recursion expression for that procedure is associated with that starting node, and this is the starting path expression. For each arc traversed backwards, the current path expression is transformed using the call_progress function defined in Table 4.12, and the result yielded by call_progress is associated with the new node reached along the arc. At each point the Verification Condition Generator 112 keeps track of the path of nodes from the current node to the starting node. This backwards exploration continues recursively, until the Verification Condition Generator 112 reaches a "leaf" node. A leaf node is one which is a duplicate of one already in the path of nodes to the starting node. This duplicate may match the starting node itself, or it may match one of the other nodes encountered in the path of the exploration.

When a leaf node is reached, a verification condition is generated by the Verification Condition Generator 112.

These will be explained in more detail later; for now it suffices to note that there are two kinds of verification conditions generated, depending on which node the leaf node duplicated. If the leaf node matched the starting node, then we generate an undiverted recursion verification condition. If the leaf node matched any other node, then the Verification Condition Generator 112 generates a diversion verification condition.

extend_graph_vcs performs the task of tracing backwards across a particular arc of the procedure call graph. fan_out_graph_vcs traces backwards across all incoming arcs of a particular node in the graph. The arguments to these functions have the following types and meanings:

| | | |
|---|---|---|
| p | string | current node (procedure name) |
| ps | (string)list | path (list of procedure names) |
| $p_0$ | string | starting node (procedure name) |
| q | aexp | current path condition |
| pcs | string→aexp | prior path conditions |
| p | env | procedure environment |
| all_ps | (string)list | all declared procedures (list of names) |
| n | num | depth counter |
| p' | string | source node of arc being explored |

The depth counter n was a necessary artifact to be able to define these functions in HOL; first fan_out_graph_vcs was defined as a single primitive recursive function on n combining the functions of Table 4.11. Then extend_graph_vcs was defined as a mutually recursive part of fan_out_graph_vcs, and fan_out_graph_vcs resolved to the remainder. For calls of fan_out_graph_vcs, n should be equal to the difference between the lengths of all_ps and ps. For calls of extend_graph_vcs, n should be equal to the difference between the lengths of all_ps and ps, minus one.

The definition of fan_out_graph_vcs maps extend_graph_vcs across all defined procedures, as listed in all_ps. It is expected that practically speaking, most programs will have relatively sparse call graphs, in that there will be many procedures in the program, but each individual procedure will only be called by a small fraction of all defined. Therefore it is important for the application of extend_graph_vcs described above to terminate quickly for applications across an arc which does not actually exist in the procedure call graph. The lack of an arc is represented by the lack of a corresponding calls . . . with clause in the header of the procedure which would be the source of the arc.

When assembling the calls progress environment calls from the calls . . . with clauses of a procedure, each clause produces a binding onto an initial default calls progress environment. This default calls progress environment is λp. false. Then all references to target procedures not specified in the calls . . . with clauses yield the default value of this default calls progress environment, false. This indicates that there is no relationship at all possible between the values in the states before and after such a call, and therefore signifies that such calls cannot occur. As a side benefit, this ensures that any omission of a calls . . . with clause from the header of a procedure whose body does indeed contain a call to the target procedure will generate verification conditions that require proving false, and these will be quickly identified as untrue.

An invocation of extend_graph_vcs will at its beginning call the call_progress function. call_progress will evaluate calls $p_2$ to extract the progress expression. For a nonexistent arc, this will be false, as described above. The definition of call_progress then tests whether the progress expression is equal to false. For such a nonexistent arc in the procedure call graph, it is, and call-progress then immediately terminates with value true.

The invocation of extend_graph_vcs then receives true as the current path condition. The next step of extend_graph_vcs is to test whether the path condition is equal to true. Since it is, the definition of extend_graph_vcs then immediately terminates, yielding an empty list with no verification conditions as its result.

In theory these functions could have been designed more simply and homogeneously to yield equivalent results just using the parts of each definition which handle the general case. However, this would not have been a practical solution. All these functions are designed with particular attention to as quickly as possible dismiss all nonexistent arcs of the procedure call graph. This is critical in practice, because of the potentially exponential growth of the time involved in exploring a large graph. This rapid dismissal limits the exponential growth to a factor depending more on the average number of incoming arcs for nodes in the graph, than on the total number of declared procedures.

The fan_out_graph_vcs function is called initially by the function graph_vcs. graph_vcs is presented in Table 4.13. It analyzes the procedure call graph, beginning at a particular node, and generates verification conditions for paths in the graph to that node to verify its recursive progress, as designated in its recursion expression declared in the procedure's header.

The graph_vcs function is called by the function vcgg. vcgg is presented in Table 4.14. It analyzes the entire procedure call graph, beginning at each node in turn, and generates verification conditions for paths in the graph, to verify the recursive progress declared for each procedure in all_ps.

4.1.5.1 Example of Verification of Call Graph

Figure 2:
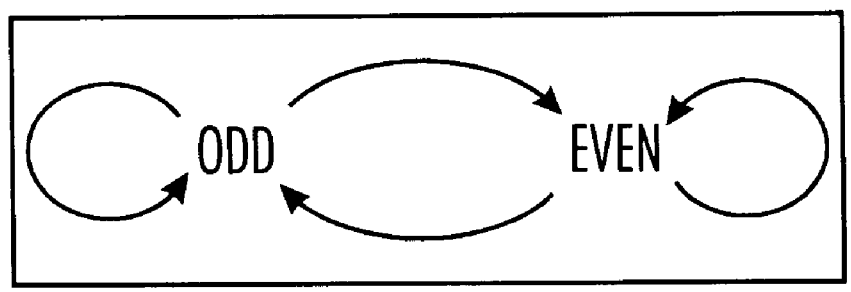
FIG. 2 is an illustration of a procedure call graph for an example odd/even computer program.
Figure 3:
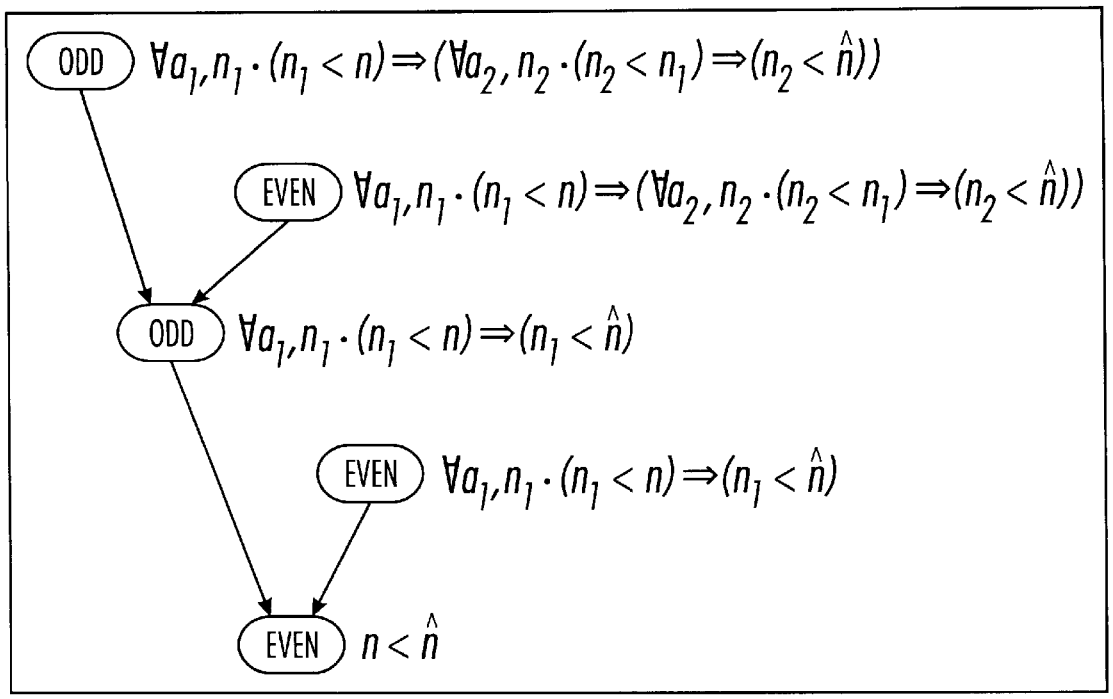
FIG. 3 is an illustration of a procedure call tree for the odd/even computer program of FIG. 2.

As an example of this graph traversal algorithm, consider the odd/even program in Table 4.2. Its procedure call graph is illustrated in FIG. 2. The following examples explore this call graph, beginning at the node corresponding to procedure even. In this process, part of the structure of the procedure call tree rooted at even is traced, which is given in FIG. 3. The Verification Condition Generator 112 takes the recursion expression of even, n<ñ, and attaches that to the even node. This becomes the current path expression. Examining the call graph, it can be seen that there are two arcs coming into the even node, one from odd and one from even itself, as a self-loop. These will form two paths, which we will explore as two cases.

Case 1: Path odd→even.

The call graph arc goes from odd to even. The Verification Condition Generator 112 pushes the current path expression backwards across the arc from even to odd, using the function call_progress. As previously described:

$$call\_progress\ even\ odd\ (n, ñ)\rho$$
$$= \forall\ a_1, n_1.(n_1 < n) \Rightarrow (n_1 < ñ)$$

The Verification Condition Generator 112 attaches this path expression to the odd node. According to the definition of extend_graph_vcs, the Verification Condition Generator 112 then goes through a series of tests. The Verification Condition Generator 112 first tests to see if this path expression is true, which it clearly is not. If, however, there had been no arc in the procedure call graph from odd to even, then the call_progress function would have returned true, and extend_graph_vcs would terminate, yielding an empty list of verification conditions for this path.

The second test the Verification Condition Generator 112 encounters in the definition of extend_graph_vcs is whether the node just reached backwards across the arc is the same as the starting node. In this case, the node just reached is odd and the starting node is even, so this test is not satisfied.

The third test the Verification Condition Generator 112 encounters is whether the node just reached, odd, is a duplicate of one of the nodes in the path to the starting node. In this case, the path only consists of the starting node even itself, and odd is not a duplicate of any member.

The choice finally arrived at in the definition of extend_graph_vcs is to continue the graph exploration recursively, by calling fan_out_graph vcs. Considering the node odd in the procedure call graph in FIG. 2, it can be seen there are two arcs of the procedure call graph which enter the node odd, one from odd itself and one from even. These will form two paths, which we will explore as two cases.

Case 1.1: Path odd→odd→even.

The Verification Condition Generator 112 pushes the current path expression backwards across the arc from odd to odd, using the function call_progress. As previously described:

$$call\_progress\ odd\ odd\ (\forall\ a_1, n_1.(n_1 < n) \Rightarrow (n_1, ñ))\rho$$
$$= \forall\ a_1, n_1.(n_1 < n) \Rightarrow (\forall\ a_2, n_2 \cdot (n_2 < n_1) \Rightarrow (n_2 < ñ))$$

This becomes the current path expression. The Verification Condition Generator 112 then goes through the series of tests in the definition of extend_graph_vcs. The Verification Condition Generator 112 first tests to see if this path expression is true, which it clearly is not.

The second test is whether the node just reached backwards across the arc is the same as the starting node. In this case, the node just reached is odd and the starting node is even, so this test is not satisfied.

The third test is whether the node just reached, odd, is a duplicate of one of the nodes in the path to the starting node. In this case, this path is odd→even, so odd is a duplicate, and this test succeeds.

According to the definition of extend_graph_vcs, for satisfying this test, the Verification Condition Generator 112 generates a verification condition of the form pcs p⇒q₁, which in this case is:

$$(\forall\ a_1, n_1.(n_1 < n) \Rightarrow (n_1 < ñ)) \Rightarrow$$
$$(\forall\ a_1, n_1.(n_1 < n) \Rightarrow (\forall\ a_2, n_2.(n_2 < n_1) \Rightarrow (n_2 < ñ)))$$

This kind of verification condition is called a diversion verification condition, which is described in more detail later.

This terminates this exploration of this path (Case 1.1) through the procedure call graph.

Case 1.2: Path even→odd→even.

The Verification Condition Generator 112 pushes the current path expression backwards across the arc from odd to even, using the function call_progress. As previously described:

$$call\_progress\ even\ odd\ (\forall\ a_1, n_1.(n_1 < n) \Rightarrow (n_1 < ñ))\rho$$
$$= \forall\ a_1, n_1.(n_1 < n) \Rightarrow (\forall\ a_2, n_2.(n_2 < n_1) \Rightarrow (n_2 < ñ))$$

This becomes the current path expression. The Verification Condition Generator 112 then goes through the series of tests in the definition of extend_graph_vcs. The Verification Condition Generator 1 12 first tests to see if this path expression is true, which it clearly is not.

The second test is whether the node just reached backwards across the arc is the same as the starting node. In this case, the node just reached is even and the starting node is even, so this test succeeds.

According to the definition of extend_graph_vcs, for satisfying this test, the Verification Condition Generator 112 generates a verification condition of the form:

let (vars, vals, glbs, pre, post, calls, rec, c) = $\rho p_0$ in

$[pre \wedge induct\_pre\ rec \Rightarrow q_1]$, which in this case is:

$(true \wedge n = \hat{n}) \Rightarrow$ $(\forall\ a_1, n_1.(n_1 < n) \Rightarrow (\forall\ a_2, n_2.(n_2 < n_1) \Rightarrow (n_2 < \hat{n})))$.

This kind of verification condition is called an undiverted recursion verification condition, which is described in more detail later.

This terminates this exploration of this path (Case 1.2) through the procedure call graph. Since this is also the last case for expanding the path of Case 1, this also terminates the exploration of that path.

Case 2: Path even→even.

The call graph arc goes from even to even. The Verification Condition Generator 112 pushes the current path expression backwards across the arc from even to even, using the function call_progress. As previously described:

$call\_progress\ even\ even\ (n_1 < \hat{n})\rho$ $= \forall\ a_1, n_1.(n_1 < n) \Rightarrow (n_1 < \hat{n})$ This becomes the current path expression. The Verification Condition Generator 112 then goes through the series of tests in the definition of extend_graph_vcs. The Verification Condition Generator 112 first tests to see if this path expression is true, which it clearly is not.

The second test is whether the node just reached backwards across the arc is the same as the starting node. In this case, the node just reached is even and the starting node is even, so this test succeeds.

According to the definition of extend_graph_vcs, for satisfying this test, the Verification Condition Generator 112 generates a verification condition of the form:

let (vars, vals, glbs, pre, post, calls, rec, c) = $\rho p_o$ in

$[pre \wedge induct\_pre\ rec \Rightarrow q_1]$, which in this case is:

$(true \wedge n = \hat{n})$ $(\forall\ a_1, n_1.\ (n_1 < n) \Rightarrow (n_1 < \hat{n}))$ This is another undiverted recursion verification condition.

This terminates this exploration of this path (Case 2) through the procedure call graph. Since this is also the last case, this also terminates the exploration of the procedure call graph for paths rooted at even.

This ends the example.

4.1.6 Verification of Programs

The mkenv function is presented in Table 4.15. This function has type decl→env→env. mkenv takes a declaration and an environment, and returns a new environment containing all of the declarations of procedures present in the declaration argument, overriding the declarations of those procedures already present in the environment.

The proc_names function is presented in Table 4.16. This function has type decl→(string)list. proc_names takes a declaration, and returns the list of procedure names that are declared in the declaration.

vcg is the main Verification Condition Generator function presented in Table 4.17. vcg calls vcgd to analyze the declarations, vcgg to analyze the call graph, and vcgc to analyze the main body of the program. vcg takes a program and a postcondition as arguments, analyzes the entire program, and generates verification conditions whose proofs are sufficient to prove the program totally correct with respect to the given postcondition. mkenv creates the procedure environment that corresponds to a declaration using the empty procedure environment po (with all procedures undeclared), and $g_0$ is the "empty" calls progress environment $\lambda p.$ true.

4.2 Verification Conditions

In the functions presented above, the essential task is constructing a proof of the program, but this proof is implicit and not actually produced as a result. Rather, the primary results are verification conditions, whose proof verifies the construct analyzed.

In [Gri81], Gries gives an excellent presentation of a methodology for developing programs and proving them correct. He lists many principles to guide and strengthen this process. The first and primary principle he lists is:

Principle: A program and its proof should be developed hand-in-hand, with the proof usually leading the way.

In [AA78], Alagic and Arbib establish the following method of top-down design of an algorithm to solve a given problem:

Principle: Decompose the overall problem into precisely specified subproblems, and prove that if each subproblem is solved correctly and these solutions are fitted together in a specified way then the original problem will be solved correctly. Repeat the process of "decompose and prove correctness of the decomposition" for the subproblems; and keep repeating this process until reaching subproblems so simple that their solution can be expressed in a few lines of a programming language.

We would like to summarize these in our own principle:

Principle: The structure of the proof should match the structure of the program.

In the past, verification condition generators have concentrated exclusively on the structure of the syntax of the program, decomposing commands into their subcommands, and constructing the proof with the same structure based on the syntax, so that the proof and the program mirror each other.

That tradition is continued in this work, but we also recognize that an additional kind of structure exists in programs with procedures, the structure of the procedure call graph. This is a perfectly valid kind of structure, and it provides an opportunity to structure part of the proof of a program's correctness. In particular, it is the essential structure used to prove the recursive progress claims of procedures.

In our opinion, wherever a natural and inherent kind of structure is recognized in a class of programs, it is worth examining to see if it may be useful in structuring proofs of properties about those programs. Such structuring regularizes proofs and reduces their ad hoc quality. In addition, it may provide opportunities to prove general results about all programs with that kind of structure, moving a part of the proof effort to the meta-level, so that it need not be repeated for each individual program being proven.

4.2.1 Program Structure Verification Conditions

The functions vcg1, vcgc, and vcgd are defined recursively, based on the recursive syntactic structure of the program constructs involved. An examination of the definitions of vcg1, vcgc, and vcgd (Tables 4.8, 4.9, 4.10) reveals several instances where verification conditions are generated in this analysis of the syntactic structure. The thrust of the work done by vcg1 is to transform the postcondition argument into an appropriate precondition, but it also generates two verification conditions for the iteration command. vcgc takes the verification conditions generated by vcg1, and adds one new one, making sure the given precondition implies the precondition computed by vcgl. vcgd invokes vcgc on the body of each procedure declared, and collects the resulting verification conditions into a single list. All of these verification conditions were generated at appropriate places in the syntactic structure of the program.

Principally, the purpose of these verification conditions is to establish the partial correctness of the constructs involved, with respect to the preconditions and postconditions present. In addition, however, a careful examination of the procedure call clause in the definition of vcgl in Table 4.8 discloses that the pre $\wedge$ calls p phrase occurring there ensures that both pre and calls p must be true upon entry to the procedure being called. Thus the preconditions generated by vcg1, and incorporated by vcgc and vcgd, carry the strength of being able to ensure both that the preconditions of any called procedures are fulfilled, and that the calls progress specified in the calls argument is fulfilled. For vcgd, this means that that the preconditions of declared procedures are fulfilled, and the calls progress claimed in the header of each procedure declared has been verified. From the partial correctness that they imply, it is then possible to prove for each of these Verification Condition Generator functions that the command involved terminates if all of its immediate calls terminate. Thus it is possible to reason simply from the verification conditions generated by this syntactic analysis and conclude four essential properties of the procedure environment ρ:

| | |
|---|---|
| $WF_{envp}\ \rho$ | ρ is well-formed for partial correctness |
| $WF_{env\_pre}\ \rho$ | ρ is well-formed for preconditions |
| $WF_{env\_calls}\ \rho$ | ρ is well-formed for calls progress |
| $WF_{env\_term}\ \rho$ | ρ is well-formed for conditional termination |

4.2.2 Call Graph Structure Verification Conditions

In this application, functions have been introduced as part of the verification condition generator to analyze the structure of the procedure call graph. The goal of this graph analysis is to prove that every recursive call, reentering a procedure that had been called before and has not yet finished, demonstrates some measurable degree of progress. This progress is quantified in the recurses with clause in the procedure declaration's header. The expression given in this clause is either false, signifying that no recursion is allowed, or $v<x$, where v is an assertion language numeric expression, and where x is a logical variable. The exact choice of x is not vital, merely that it serve as a name for the prior value of v at the first call of the procedure, so that it may be compared with the eventual value of v at the recursive call.

The progress described by $v<x$ is the decrease of an integer expression. In the Sunrise language, this is restricted to nonnegative integer values. The nonnegative integers form a well-founded set with < as its ordering. By the definition of well-founded sets, there does not exist any infinite decreasing sequence of values from a well-founded set. Hence there cannot be an infinite number of times that the expression v decreases before it reaches 0, and thus we will eventually be able to argue that any call of the procedure must terminate. However, at this point, we are only trying to establish the recursive progress between recursive invocations of the procedure, that v has strictly decreased.

To prove this recursive progress, the Verification Condition Generator 112 needs to consider every possible path of procedure calls from the procedure to itself. Given the possible presence of cycles in the procedure call graph, there may be an infinite number of such paths, all of which cannot be examined in finite time. However, in our research, we have discovered a small, finite number of verification conditions which together cover every possible path, even if the paths are infinite in number. These verification conditions are of two kinds, which we call undiverted recursion verification conditions and diversion verification conditions.

Figure 4:
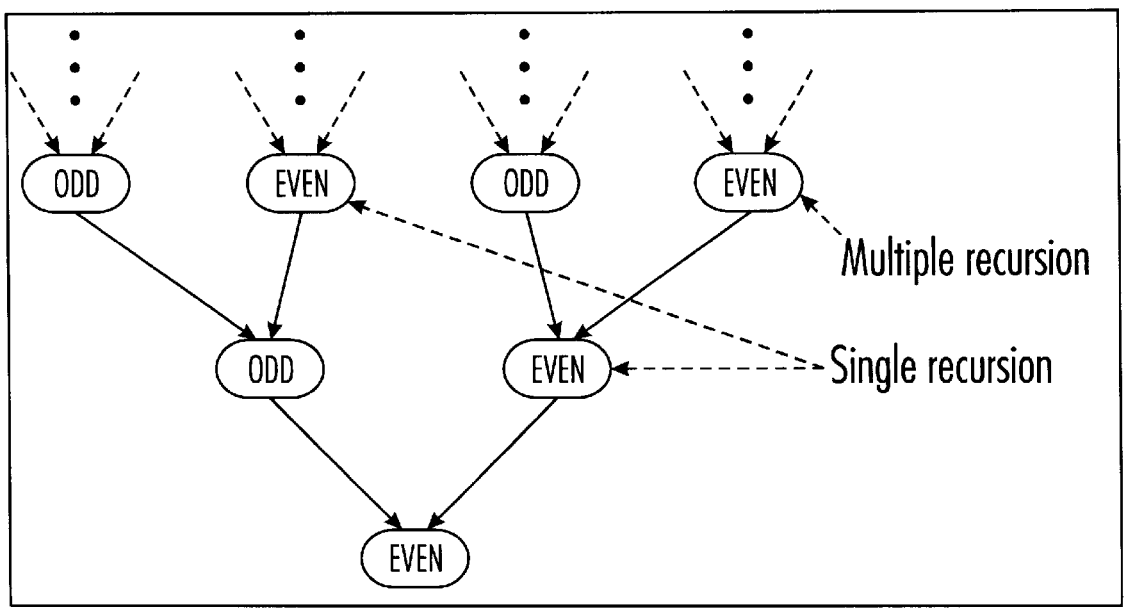
FIG. 4 is an illustration of a procedure call tree for (unrestricted) recursion in the odd/even computer program of FIG. 2.

To understand the intent of these verification conditions, as a first step consider the possibility of exploring the procedure call graph to find paths that correspond to recursive calls. Starting from a designated procedure and exploring backwards across arcs in the graph yields an expanding tree of procedure calls, where the root of the tree is the starting procedure. If cycles are present in the graph, this tree will grow to be infinite in extent. An example of such a tree is presented in FIG. 4.

Now, examine this infinite tree of procedure calls. Some of the nodes in the tree duplicate the root node, that is, they refer to the same procedure. These occurrences are called instances of recursion. Of these duplicate nodes, consider the paths from each node to the root. Some of these paths will themselves contain internally another duplicate of the root, and some will not. Those that do not contain another duplicate of the root are called instances of single recursion. The other paths, that do contain additional duplicates of the root, are called instances of multiple recursion. Observe that each instance of multiple recursion is a chaining together of multiple instances of single recursion. In addition, if the progress claimed by the recursion expression for the root procedure is achieved for each instance of single recursion, then the progress achieved for each instance of multiple recursion will be the accumulation of the progresses of each constituent instance of single recursion, and thus should also satisfy the progress claim even more easily.

Figure 5:
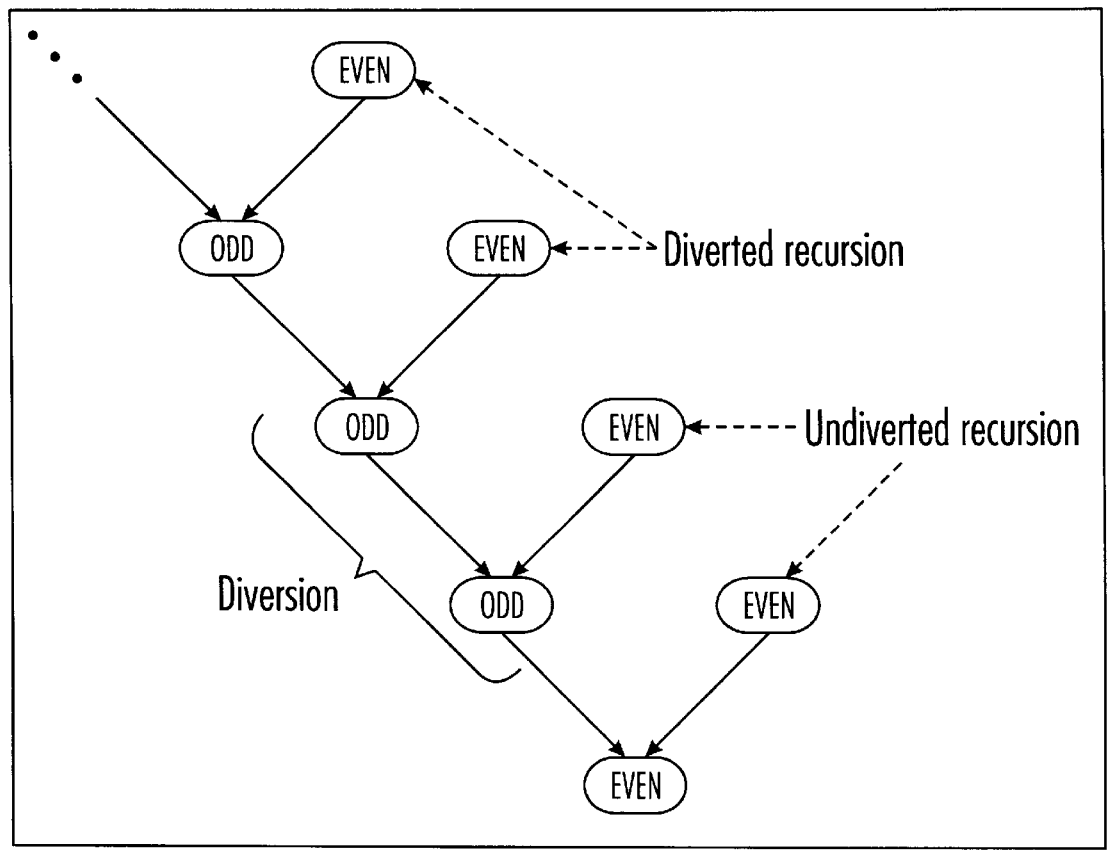
FIG. 5 is an illustration of a procedure call tree for single recursion in the odd/even computer program of FIG. 2.

So the problem of proving the recursive progress for all recursive paths simplifies to proving it for all singly recursive paths. Now, there still may be an infinite number of singly recursive paths in the procedure call tree. For instance, in the odd/even program example, if all singly recursive paths with root at even are considered, the presence of the self-loop at odd means that there are an infinite number of paths with different numbers of times around that self-loop involved. This tree is presented in FIG. 5. Singly recursive paths traverse the call graph from even to odd, then to odd via an indefinite number of times around the self-loop, and finally to even.

Consider the procedure call tree as before but limited now in its expansion to singly recursive paths, so that the only occurrences of the root node are at the root and as leaves. None of the internal nodes of the tree duplicate the root node. However, for any particular leaf node and the path from that leaf to the root, there may be duplicates within that list, not involving the root node. If there are duplicates, say two occurrences of a procedure p not the root, then this is called an instance of diverted recursion, and the part of the path between the two occurrences of p is called a diversion. Intuitively, this name suggests that the search for recursive paths from the root procedure to itself became diverted from that goal when the search reached p. For a while the search followed the cycle from p to p, and only when it returned to p did it resume again to head for the root procedure. In contrast, a path from a leaf to the root which does not have any examples of diversion is called an instance of undiverted recursion. These instances of undiverted recursion would be the occasions of generating verification conditions to verify the recursion expression claim, except that the tree is still infinite.

Figure 6:
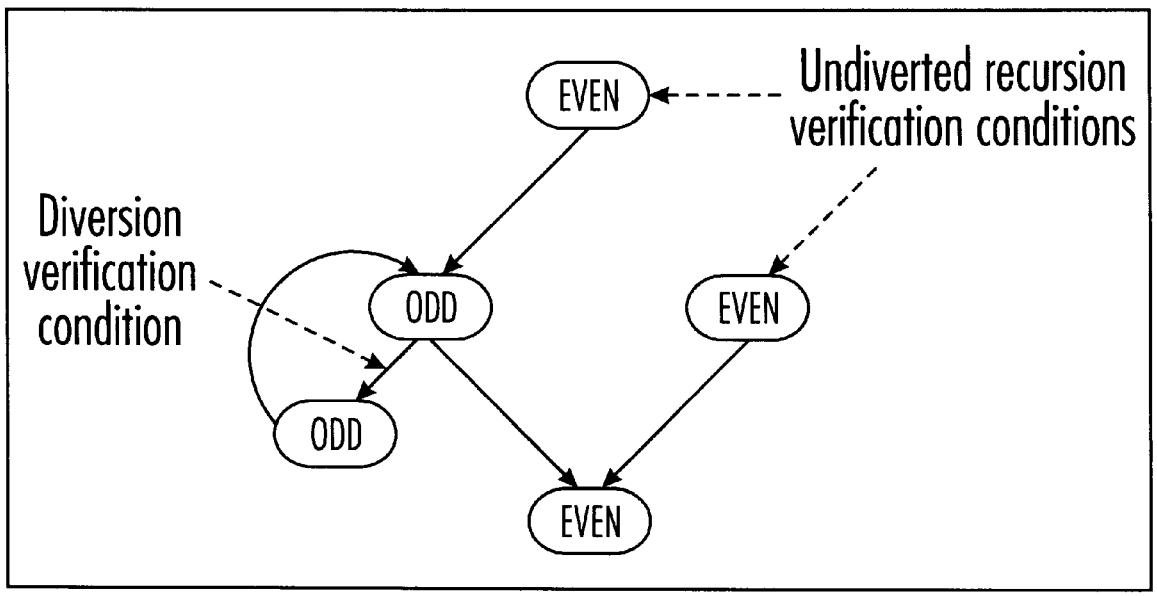
FIG. 6 is an illustration of diverted and undiverted verification conditions for the odd/even computer program of FIG. 2.

Now, given a diversion involving the procedure p, it can be observed that the subtrees of the procedure call tree rooted at the two instances of p are identical in their branching structure. The only things that change are the path conditions attached to the various nodes. Except for these, one could copy one of the subtrees, move it so that it was superimposed on the other subtree, and the two would look identical. This provides the motivation for the final simplification here, the introduction of diversion verification conditions. We can implicitly cover the infinite expansion of the procedure call tree for single recursion by looking for cases of diversion as we expand the tree, and then for each case, bending the endpoint of the diversion farthest from the root around and connecting it to the near endpoint of the diversion. The connection we establish is the generation of a verification condition, that the path condition at the near endpoint implies the path condition at the far endpoint. Compare FIGS. 5 and 6 to see an example of this for the odd/even program.

At first, this may seem counter-intuitive or even bizarre. Since the far endpoint is previous in time to the near endpoint, one would normally expect any implication to flow from the prior to the later. However, in this case what the diversion verification condition is saying is that the changes to the path expressions imposed by moving around the diversion cycle in the graph do not interfere with justifying the recursive progress claim for the root procedure. In other words, no ground is lost by going around a diversion cycle, but instead the cycle either has no effect or a positive effect. In terms of the procedure call tree, making this connection between the endpoints of a diversion is tantamount to copying the entire subtree rooted at the nearer endpoint and attaching the root of the copy at the farther endpoint. Since the copied subtree includes the farther endpoint within it, this creates an infinite expansion, fully covering the infinite singly recursive procedure call tree. However, since there is only one verification condition per diversion required to achieve this, the proof burden imposed on the programmer is reduced to a finite number of verification conditions, which now consist of a mixture of undiverted recursion verification conditions for leaves of the expansion which match the root, and diversion verification conditions for leaves of the expansion which match another node along the path to the root.

4.3 Verification Condition Generator Soundness Theorems

The Verification Condition Generator 112 functions defined above are simple syntactic manipulations of expressions as data. For this to have any reliable use, the semantics of these syntactic manipulations must be established. This has been done in this application by proving theorems within the HOL system that describe the relationship between the verification conditions produced by these functions and the correctness of the programs with respect to their specifications. These theorems are proven at the meta- level, which means that they hold for all programs that may be submitted to the Verification Condition Generator 112.

The Verification Condition Generator theorems that have been proven related to the vcg1 function are listed in Table 4.18. There are seven theorems listed, which correspond to seven ways that the results of the vcg1 function are used to prove various kinds of correctness about commands. vcg1_0_THM and vcg1_THM are the proof of staged versions of the partial correctness of commands, necessary steps in proving the full partial correctness. Given these two theorems, it is possible to prove vcg1p_THM, which verifies that if the verification conditions produced by vcg1 are true, then the partial correctness of the command analyzed follows. Furthermore, it is possible to prove vcg1_PRE_PROGRESS and vcg_BODY_PROGRESS, which state that if the verification conditions are true, then the preconditions of all called procedures hold, and the progress conditions contained in calls also hold. Beyond this, vcg1_TERM shows that the command conditionally terminates if all immediate calls terminate. Finally, if the environment ρ has been shown to be completely well formed, then vcg1_THM states that if all the verification conditions are true, then the command is totally correct with respect to the computed precondition and the given postcondition.

The VCG theorems that have been proven related to the vcgc function are listed in Table 4.19. These are similar to the theorems proven for vcg1. There are seven theorems listed, which correspond to seven ways that the results of the vcgc function are used to prove various kinds of correctness about commands. vcgc_0_THM and vcgc_k_THM are the proof of staged versions of the partial correctness of commands, necessary steps in proving the full partial correctness. Given these two theorems, it is possible to prove vcgcp_THM, which verifies that if the verification conditions produced by vcgc are true, then the partial correctness of the command analyzed follows. Furthermore, it is possible to prove vcgc_PRE_PROGRESS and vcgc_BODY_PROGRESS, which state that if the verification conditions are true, then the preconditions of all called procedures hold, and the progress conditions contained in calls also hold. Beyond this, vcgc_TERM shows that the command conditionally terminates if all immediate calls terminate. Finally, if the environment ρ has been shown to be completely well formed, then vcgc_THM states that if all the verification conditions are true, then the command is totally correct with respect to the given precondition and postcondition.

The VCG theorems that have been proven related to the vcgd function for declarations are listed in Table 4.20. These are similar in purpose to the theorems proven for vcg1 and vcgc. There are seven theorems listed, which correspond to seven ways that the results of the vcgd function are used to prove various kinds of correctness about declarations. vcgd_syntax_THM shows that if a declaration is well-formed syntactically and the verification conditions returned by vcgd are true, then the corresponding procedure environment is well-forned syntactically. vcgd_0_THM and vcgd_k_THM are the proof of staged versions of the partial correctness of declarations, necessary steps in proving the full partial correctness. Given these two theorems, it is possible to prove vcgd_THM, which verifies that if the verification conditions produced by vcgd are true, then the partial correctness of the environment follows. Furthermore, it is possible to prove vcgd_PRE_PROGRESS and vcgd_BODY_PROGRESS, which state that if the verification conditions are true, then the environment is well-formed for preconditions and for calls progress. Finally, vcgd_TERM shows that if all the verification conditions are true, then every procedure in the environment conditionally terminates if all immediate calls from its body terminate.

The VCG theorems that have been proven related to the graph exploration functions for the procedure call graph are given in the following tables. The theorem about fan_out_graph_vcs is listed in Table 4.21. It essentially states that if the verification conditions returned by fan_out_graph_vcs are true, then for every possible extension of the current path to a leaf node, if it is a leaf corresponding to an instance of undiverted recursion, then the undiverted recursion verification condition is true, and if the leaf corresponds to an instance of diversion, then the diversion verification condition is true. In brief, this theorem says that fan_out_graph_vcs produces all the verification conditions previously described as arising from the current point on in the exploration of the call graph.

The theorem about the verification of graph_vcs is listed in Table 4.22. It essentially states that if the verification conditions returned by graph_vcs are true, then for every instance of undiverted recursion, the undiverted recursion verification condition is true, and for every instance of diversion, the diversion verification condition is true. In brief, this theorem says that graph_vcs produces all the verification conditions previously described as arising from a particular starting node in the exploration of the call graph.

Given that graph_vcs collects the proper set of verification conditions, it can now be proven that for all instances of single recursion, if the verification conditions returned by graph_vcs are true, then the initial value of the recursion expression for a procedure implies the precondition computed by the call_path_progress function, as shown in Table 4.23. The proof proceeds by well-founded induction on the length of the path ps.

Previously, a rule was presented that call_path_progress returned appropriate preconditions for path entrance specifications. Path entrance specifications can now be proven for all possible paths starting from a procedure to a recursive call of the same procedure, where the precondition at the original entrance of the procedure is induct_pre rec, and the entrance condition at all the eventual recursive entrances of the procedure is rec. If rec is of the form v<x, then induct_pre rec is v=x, and these path entrance specifications declare that the recursive expression v strictly decreases across every possible instance of single recursion of that procedure. This theorem is shown in Table 4.24.

Using the transitivity of <, we can now prove the verification of all recursion, single and multiple, by well-founded induction on the length of the path ps. This theorem is shown in Table 4.25.

We can now describe the verification of recursion given the verification conditions returned by graph_vcs, in Table 4.26.

This allows us to verify the recursion of all declared procedures by the main call graph analysis function, vcgg, as described in Table 4.27.

Finally, this allows us to verify the main call graph analysis function, vcgg, as described in Table 4.28.

At last, we come to the main theorem of the correctness of the Verification Condition Generator 112. This is our ultimate theorem and our primary result. It is given in Table 4.29.

This verifies the Verification Condition Generator 112. It shows that the vcg function is sound, that the correctness of the verification conditions it produces suffice to establish the total correctness of the annotated program. This does not show that the vcg function is complete, namely that if a program is correct, then the vcg function will produce a set of verification conditions sufficient to prove the program correct from the axiomatic semantics. However, this soundness result is quite useful, in that we may directly apply these theorems in order to prove individual programs totally correct within HOL, as seen in the next section.

5. Implementation

The following describes the implementation details of the present invention.

5.1 Flowcharts

Figure 7:
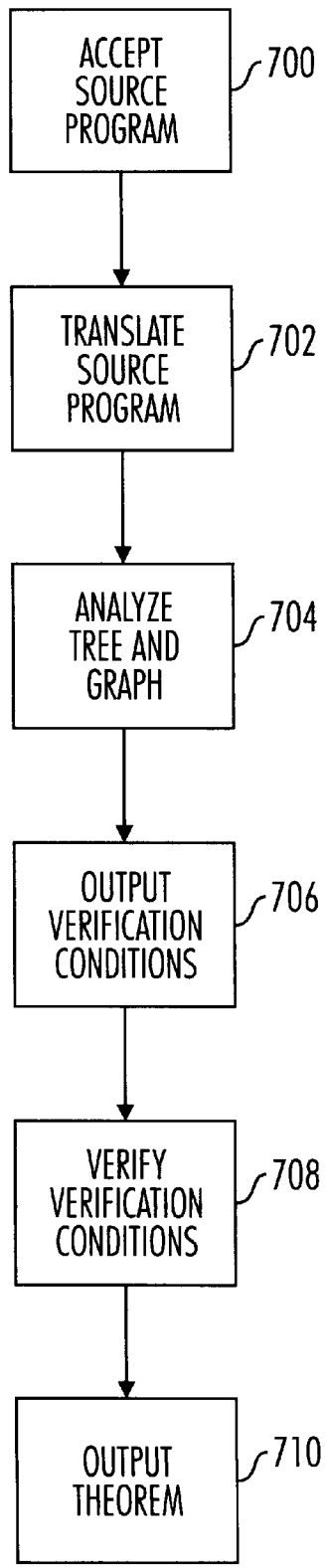
FIG. 7 is a flowchart that illustrates the logic for verifying the total correctness of a computer program with mutually recursive procedures.

FIG. 7 is a flowchart that illustrates the logic of the present invention. More specifically, FIG. 7 illustrates the logic for verifying the total correctness of a computer program with mutually recursive procedures.

Block 700 represents the computer 100 receiving the computer program as a series of source statements, wherein the source statements include annotations indicating the intended behavior of the source statements. At this step, annotations are added to the source statements indicating the intended behavior of the source statements at various strategic points. The annotations may comprise, for example, loop statement annotations regarding partial correctness, loop statement annotations regarding termination, procedure declaration annotations regarding partial correctness, and procedure declaration annotations regarding termination. This Block is described in more detail in FIG. 8.

Block 702 represents the computer 100 translating the source statements into an abstract syntax tree and a call graph of the program, wherein the call graph includes nodes representing procedures and directed arcs between the nodes representing procedure calls.

Block 704 represents the computer 100 analyzing the abstract syntax tree and call graph for correctness by invoking a Verification Condition Generator 112 to generate a set of verification conditions from the abstract syntax tree and call graph. This Block is described in more detail in FIG. 9.

Block 706 represents the computer 100 outputting the set of verification conditions as conditions to be proven to complete a proof of total correctness of the program.

Block 708 represents the computer 100 verifying the set of verification conditions.

Block 710 represents the computer 100 outputting a theorem showing that the program is totally proven to be totally correct with respect to its specification based on the set of verification conditions.

Figure 8:
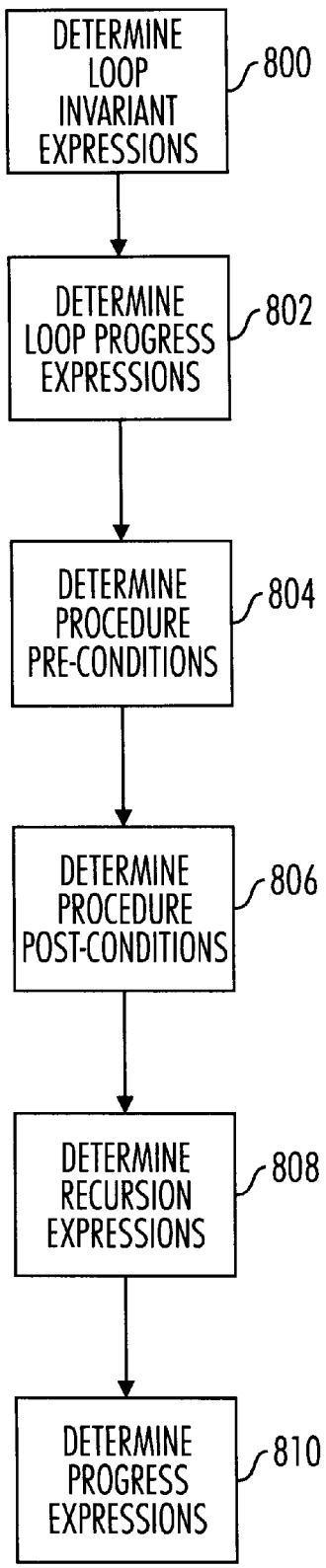
FIG. 8 is a flowchart that illustrates the logic for annotating the source statements of a computer program.

FIG. 8 is a flowchart that further illustrates the logic of the present invention.

More specifically, FIG. 8 illustrates the logic for annotating the source statements of a computer program (Block 700 in FIG. 7).

Block 800 represents the computer 100 determining a loop invariant expression for each loop in the program.

Block 802 represents the computer 100 determining a loop progress expression for each loop, containing an expression whose value is taken from a well-founded set, with the well-founded relation of that set.

Block 804 represents the computer 100 determining a precondition for each declared procedure, describing what must be true upon entrance to the procedure.

Block 806 represents the computer 100 determining a post condition for each declared procedure, describing what must be true upon exit from the procedure due to the termination of its body, relating the two states at the entrance and the exit of the procedure.

Block 808 represents the computer 100 determining a recursion expression for each declared procedure which is intended to recurse, containing an expression whose value is taken from a well-founded set, with the well-founded relation of that set.

Block 810 represents the computer 100 determining a progress expression for each pair of procedures, where the first procedure calls the second (and in fact may be the same procedure), describing the change in state from the entrance of the first procedure to any point in its body where a procedure call is issued to the second procedure, and it is entered.

Figure 9:
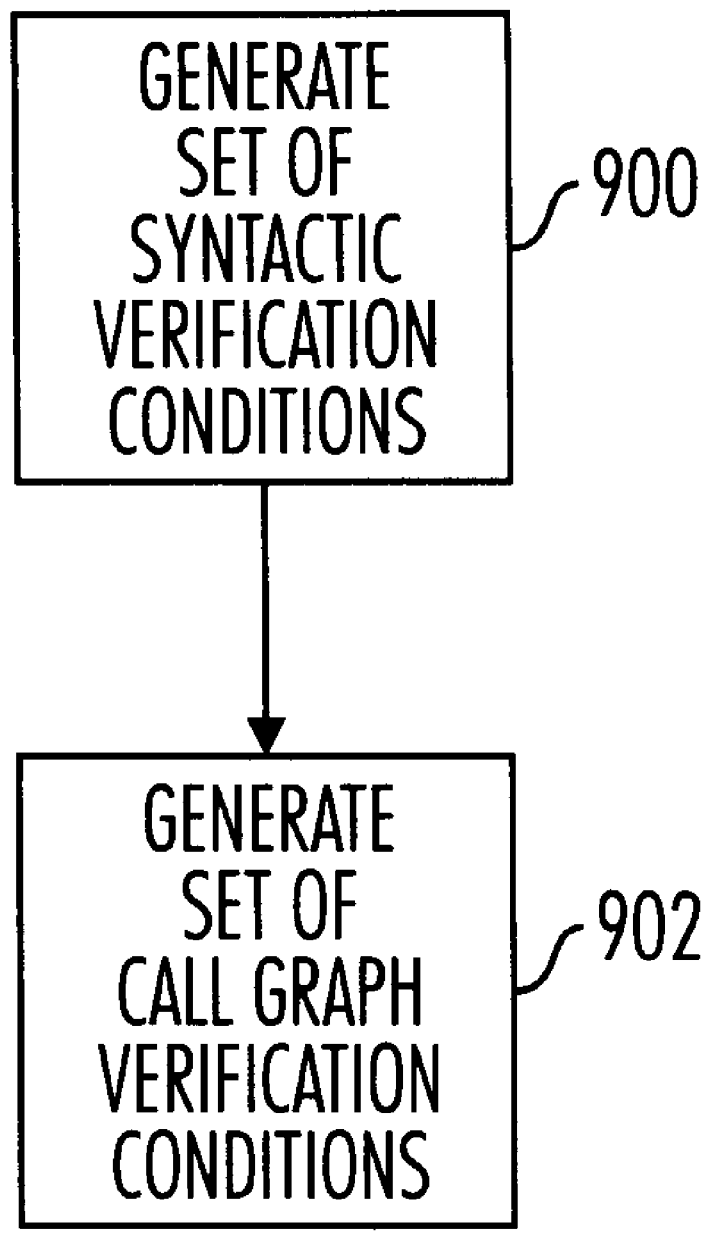
FIG. 9 is a flowchart that illustrates the logic for generating the set of verification conditions.

FIG. 9 is a flowchart that further illustrates the logic of the present invention. More specifically, FIG. 9 illustrates the logic for generating the set of verification conditions (Block 704 in FIG. 7).

Block 900 represents the computer 100 generating a set of syntactic verification conditions through a traversal of an abstract syntax tree of the program.

Block 902 represents the computer 100 generating a set of call graph verification conditions through an analysis of the procedure call graph of the program along with the abstract syntax tree. This Block is described in more detail in FIG. 10.

Figure 10:
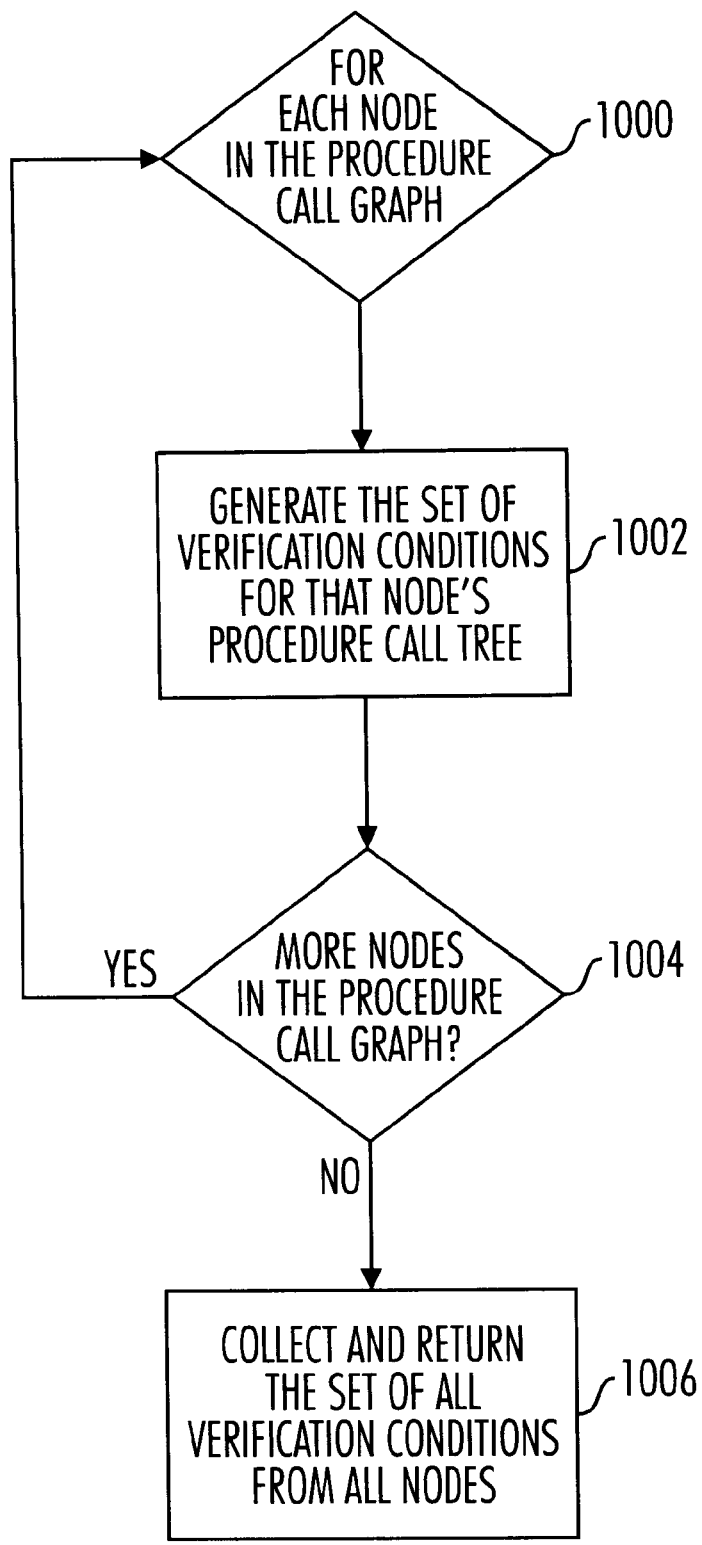
FIG. 10 is a flowchart that illustrates the logic for generating the set of call graph verification conditions.

FIG. 10 is a flowchart that further illustrates the logic of the present invention. More specifically, FIG. 10 illustrates the logic for generating the set of call graph verification conditions (Block 902 in FIG. 9).

Block 1000 is a looping block that represents the computer 100 beginning a loop which extends to the decision block 1004, and repeats the part of the flowchart between Block 1000 and Block 1004 for each node in the procedure call graph. Block 1000 represents the computer 100 selecting a node in the procedure call graph not selected before for this loop.

Block 1002 represents the computer 100 generating a set of verification conditions for the procedure call tree of the node of the procedure call graph selected in Block 1000. This Block is described in more detail in FIG. 11.

Block 1004 is a decision block that represents the computer 100 determining whether all nodes in the procedure call graph have had their procedure call tree's verification conditions generated. If so, control transfers to Block 1006; otherwise, control transfers to Block 1000, to select another node in the procedure call graph not selected before this loop.

Block 1006 represents the computer 100 collecting all the verification conditions generated for every node of the procedure call graph and returned by every execution of Block 1002, and returning the collection as the set of call graph verification conditions computed by Block 902.

Figure 11:
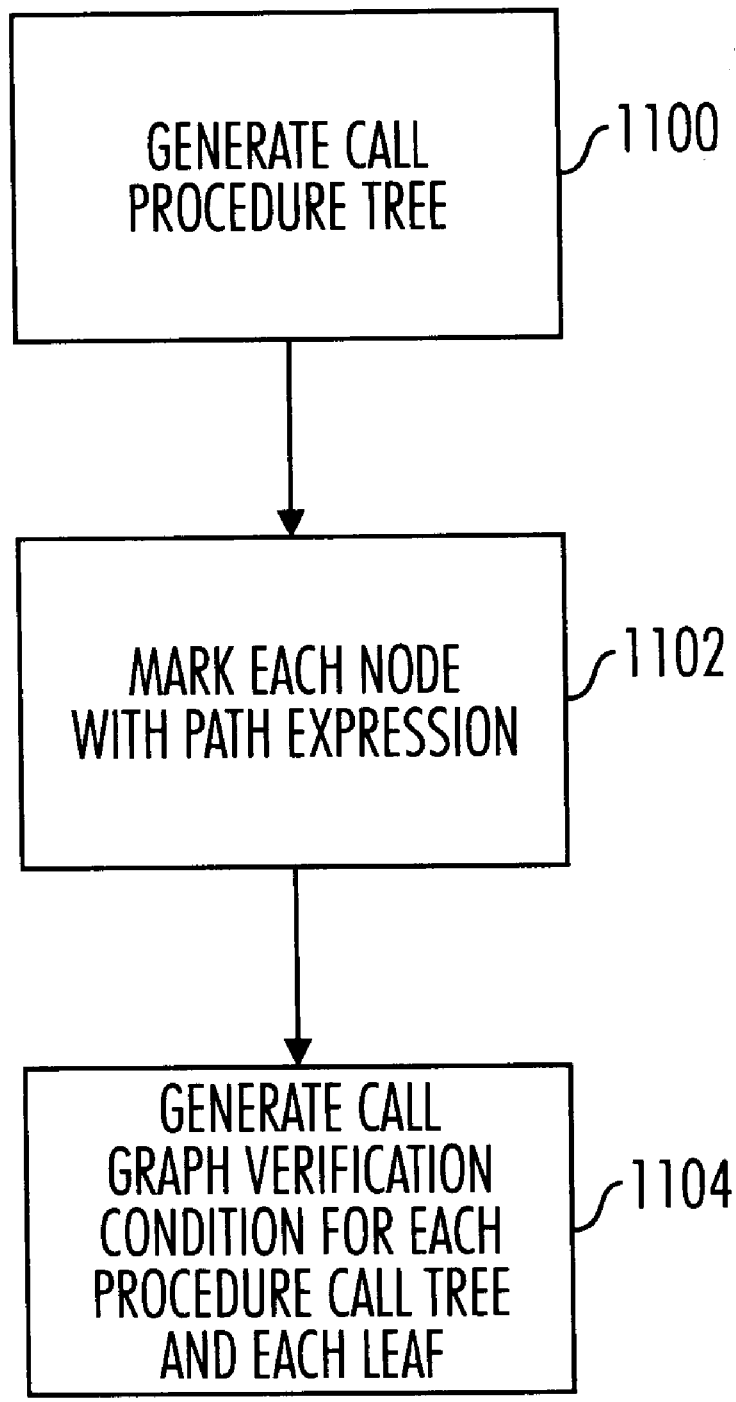
FIG. 11 is a flowchart that illustrates the logic for generating the set of call graph verification condeitions for the procedure call tree of a particular node.

FIG. 11 is a flowchart that further illustrates the logic of the present invention. More specifically, FIG. 11 illustrates the logic for generating the set of call graph verification conditions for the call tree of a particular node of the procedure call graph (Block 1002 in FIG. 10).

Block 1100 represents the computer 100 generating a procedure call tree for the specified node of the procedure call graph. This Block is described in more detail in FIG. 12.

Block 1102 represents the computer 100 marking each node in the procedure call tree with its appropriate path expression. This Block is described in more detail in FIG. 13.

Block 1104 represents the computer 100 generating a call graph verification condition for each leaf of the procedure call tree, where depending on the particular leaf, either a diversion verification condition or an undiverted recursion verification condition is generated. If the leaf node matches the root node of the tree, then an undiverted recursion verification condition is generated; otherwise, a diversion verification condition is generated.

Figure 12:
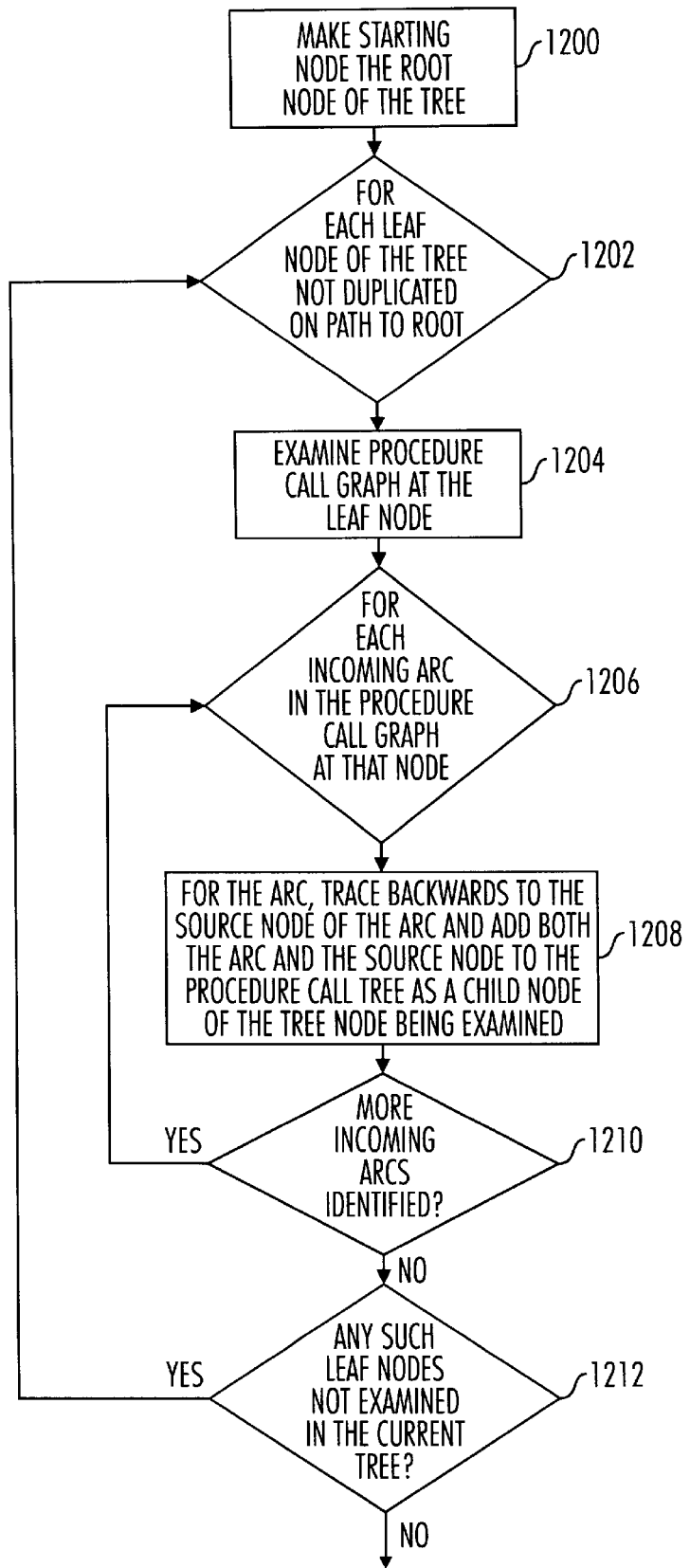
FIG. 12 is a flowchart that illustrates the logic for generating a procedure call tree for a node in the procedure call graph.

FIG. 12 is a flowchart that further illustrates the logic of the present invention. More specifically, FIG. 12 illustrates the logic for generating a procedure call tree for any one starting node in the procedure call graph (Block 1102 in FIG. 11).

Block 1200 represents the computer 100 beginning the construction of the procedure call tree as the tree with only the starting node as the root.

Block 1202 is a looping block that represents the computer 100 beginning a loop which extends to the decision block 1212, and repeats the part of the flowchart between Block 1202 and Block 1212 for each leaf node of the procedure call tree which is not a duplicate of another node on the path in the tree from the leaf to the root. Block 1202 represents the computer 100 selecting such a leaf node from the procedure call tree not selected before this loop.

Block 1204 represents the computer 100 examining the procedure call graph at the node corresponding to the leaf node selected in Block 1202, and identifying all the incoming arcs of the graph that terminate at that node.

Block 1206 is a looping block that represents the computer 100 beginning a loop which extends to the decision block 1210, and repeats the part of the flowchart between Block 1206 and 1210 for each incoming arc of the procedure call graph which terminates at the node selected in Block 1202. Block 1206 represents the computer 100 selecting such an arc from the procedure call graph not selected before in this loop.

Block 1208 represents the computer 100 tracing the arc selected in Block 1206 backwards in the procedure call graph to the source node of the arc, and adding both the arc and the source node to the procedure call tree; the source node of the arc is added to the procedure call tree as a child node of the node selected in Block 1202.

Block 1210 is a decision block that represents the computer 100 determining whether all incoming arcs of the procedure call graph which terminate at the node selected in Block 1202 have had their source nodes added to the tree. If so, control transfers to Block 1212; otherwise, control transfers to Block 1206, to select another arc of the procedure call graph not selected before for this loop, as described above for Block 1206.

Block 1212 is a decision block that represents the computer 100 determining whether there are any leaf nodes in the current version of the tree which are not duplicates of another node on the path in the tree from the leaf to the root. If so, control transfers to Block 1202, to select another leaf node of the procedure call tree not selected before for this loop, as described above for Block 1202, otherwise, control returns to FIG. 11.

Figure 13:
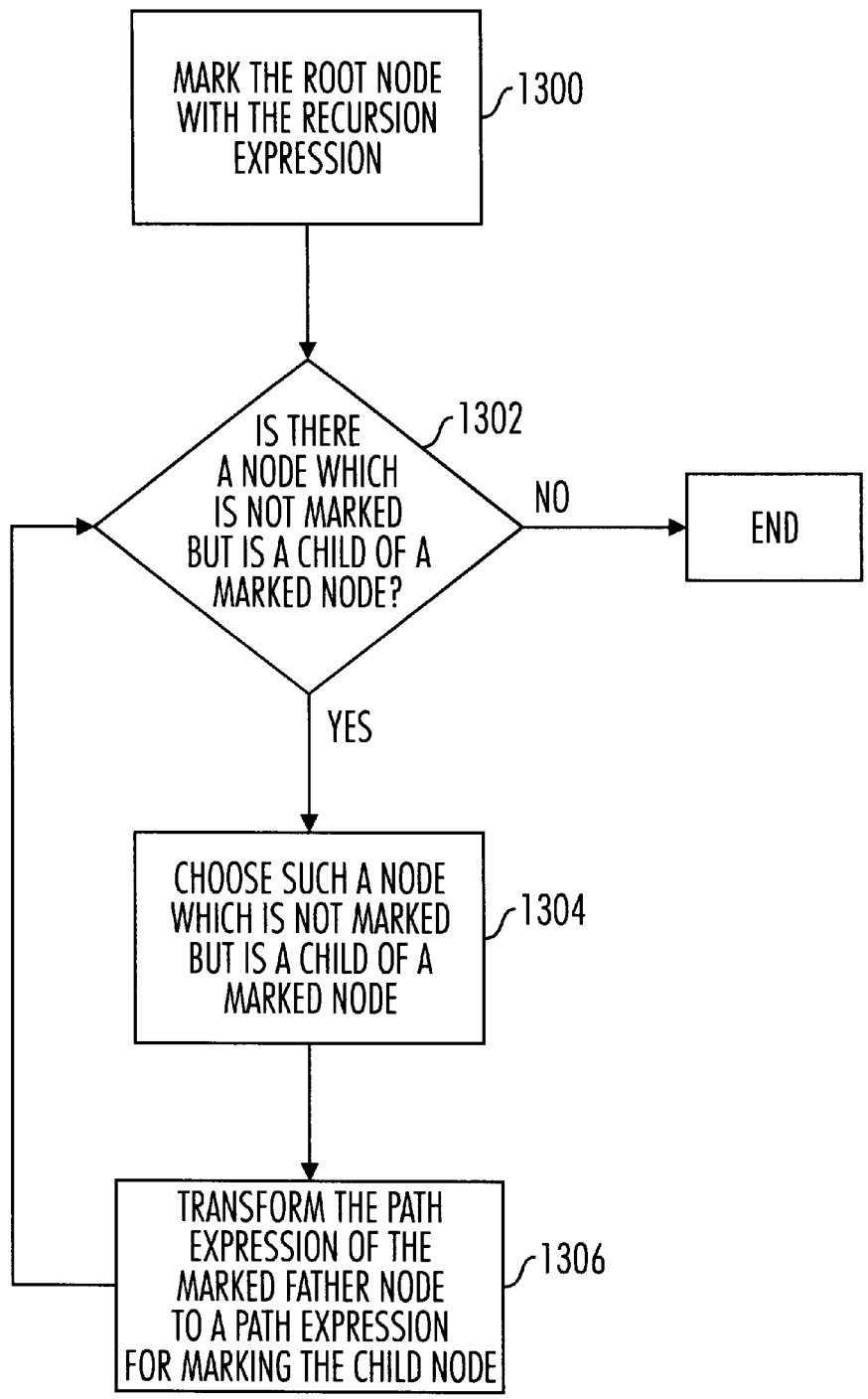
FIG. 13 is a flowchart that illustrates the logic for marking a procedure call tree with path expressions for each node in the procedure call tree.

FIG. 13 is a flowchart that further illustrates the logic of the present invention. More specifically, FIG. 13 illustrates the logic for marking each procedure call tree for each node in the procedure call graph with path conditions denoting the conditions true at entrance to those procedures (Block 1104 in FIG. 11).

Block 1300 represents the computer 100 marking the root node with the recursion expression included as part of the annotation of the procedure that the node represents, wherein this is the path expression of the root node.

Block 1302 is a decision block that represents the computer 100 determining whether there is any node which is not marked but which is a child of a marked node. If so, control transfers to Block 1304; otherwise, control returns to FIG. 11.

Block 1304 represents the computer 100 choosing such a node, which is not marked but which is a child of a marked node.

Block 1306 represents the computer 100 transforming the path expression of the father node of the node selected in Block 1304 into a path expression with which the child node is marked according to the specifications of both procedures involved and the partially marked tree, after which control transfers to Block 1302.

5.2 Verification Condition Generator Improvements

The Verification Condition Generator 112 functions can be improved for greater efficiency and ease of use, for example to reduce the number of verification conditions generated, especially those created through the analysis of the procedure call graph. One immediate improvement may be found by generating the verification conditions for each procedure in order. When the termination of a procedure was thus established, it would be deleted from the procedure call graph along with all incident arcs. This smaller call graph would then be the one used in generating verification conditions for the next procedure in order. Since there would be fewer arcs, there would be fewer cycles, and we anticipate far fewer verification conditions produced.

6. Conclusion

The foregoing description of the preferred embodiments of the application has been presented for the purposes of illustration and description. It is not intended to be exhaustive or to limit the application to the precise form disclosed. Many modifications and variations are possible in light of the above teaching. It is intended that the scope of the application be limited not with this detailed description, but rather by the claims appended hereto.

7. References

The following references, all of which are incorporated by reference herein, have been cited previously in this specification using the abbreviation in brackets indicated at the beginning of each reference:

[AA78] Suad Alagic and Michael A. Arbib. *The Design of Well-Structured and Correct Programs.* Springer-Verlag, 1978.

[And86] Peter B. Andrews. *An Introduction to Mathematical Logic and Type Theory: To Truth Through Proof.* Academic Press, 1986.

[BGG+92] Richard Boulton, Andrew Gordon, John Harrison, John Herbert, and John Van Tassel. Experience with embedding hardware description languages in HOL. In V. Stavridou, T. F. Melham, and T. T. Boute, editors, *Theorem Provers in Circuit Design,* pages 129–156. Elsevier Science Publishers B.V. (North Holland), 1992.

[BM88] Robert S. Boyer and J Strother Moore. *A Computational Logic Handbook.* Academic Press, 1988.

[Chu40] Alonzo Church. A formulation of the simple theory of types. *Journal of Symbolic Logic,* 5(2):56–68, June 1940.

[Dij72] Edsger W. Dijkstra. Notes on structured programming. In O. -J. Dahl, E. W. Dijkstra, and C. A. R. Hoare, editors, *Structured Programming.* Academic Press, 1972.

[GM93] Michael J. C. Gordon and Thomas F. Melham. *Introduction to HOL: A Theorem Proving Environment for Higher-Order Logic.* Cambridge University Press, Cambridge, 1993.

[Gor89] Michael J. C. Gordon. Mechanizing programming logics in higher order logic. In P. A. Subrahmanyam and G. Birtwistle, editors, *Current Trends in Hardware Verification and Automated Theorem Proving.* pages 387–489. Springer-Verlag, New York, 1989.

[Gri81] David Gries. *The Science of Programming.* Springer-Verlag, 1981.

[Hen90] Matthew Hennessy. *The Semantics of Programming Languages.* Wiley, 1990.

[Hoa69] C. A. R. Hoare. An axiomatic basis for computer programming. *Communications of the ACM,* 12(10:576:581, October 1969.

[Mel89] Thomas F. Melham. Automating recursive type definitions in higher-order logic. In G. Birtwistle and P. Subrahmanyarn, editors, *Current Trends in Hardware Verification and Automated Theorem Proving,* pages 341–386. Springer-Verlag, 1989.

[Mel91] Thomas F. Melham. A package for inductive relation definitions in HOL. In M. Archer, J. J. Joyce, K. N. Levitt, and P. J. Windley, editors, *Proceedings of the 1991 International Workshop on the HOL Theorem Proving System and its Applications,* pages 350–357. IEEE Computer Society Press, August 1991.

[Plo81] Gordon Plotkin. A structured approach to operational semantics. Technical Report DAIMIFN-19, Aarhus University Computer Science Department, September 1981.

TABLE 2.1

Example programming language.

$$c ::= \text{skip} \mid \text{abort} \mid x := e \mid c_1 ; c_2 \mid \text{if } b \text{ then } c_1 \text{ else } c_2 \text{ fi} \mid \text{assert } a \text{ while } b \text{ do } c \text{ od}$$

TABLE 2.2

Example programming language structural operational semantics.

Skip:

$$\overline{C \text{skip} ss}$$

Abort:

(no rules)

Assignment:

$$\overline{C(x:=e)ss[(Ees)/x]}$$

uence:

$$\frac{Cc_1 s_1 s_2 \quad Cc_2 s_2 s_3}{C (c_1 ; c_2) s_1 s_3}$$

Conditional:

$$\frac{B b s_1 = T, \quad C c_1 s_1 s_2}{C(\text{if} b \text{then} c_1 \text{else} c_2 \text{fi}) s_1 s_2}$$

$$\frac{B b s_1 = F, \quad C c_2 s_1 s_2}{C(\text{if} b \text{then} c_1 \text{else} c_2 \text{fi}) s_1 s_2}$$

Iteration:

$$\frac{B b s_1 = T, \quad C c s_1 s_2 \quad C(\text{assert} a \text{while} b \text{do} c \text{od}) s_2 s_3}{C (\text{assert } a \text{ while } b \text{ do } c \text{ od}) s_1 s_3}$$

TABLE 2.2-continued

Example programming language structural operational semantics.

$$\frac{B\ b\ s_1 = F}{C(\text{assert}\ a\ \text{while}\ b\ \text{do}\ c\ \text{od}) s_1 s_1}$$

TABLE 2.3

Floyd/Hoare Partial and Total Correctness Semantics.

$\{a\}$ = close $a$ = $\forall s.\ A\ a\ s$
$\{p\}\ c\ \{q\}$ = $\forall s_1\ s_2.\ A\ p\ s_1 \wedge C\ c\ s_1\ s_2 \Rightarrow A\ q\ s_2$
$[p]\ c\ [q]$ = $(\forall s_1\ s_2.\ A\ p\ s_1 \wedge C\ c\ s_1\ s_2 \Rightarrow A\ q\ s_2)$
$\wedge\ (\forall s_1.\ a\ p\ s_1 \Rightarrow (\exists s_2.\ C\ c\ s_1\ s_2))$

TABLE 2.4

Example programming language amiomatic semantics.

*Skip:*

$$\overline{\{q\}\text{skip}\{q\}}$$

*Abort:*

$$\overline{\{\text{false}\}\text{abort}\{q\}}$$

*Assignment:*

$$\overline{\{q\triangleleft[e/x]\}x:=e\{q\}}$$

*Sequence:*

$$\frac{\{p\}c_1\{r\},\{r\}c_2\{q\}}{\{q\}\ c_1\ ;\ c_2\ \{r\}}$$

*Conditional:*

$$\frac{\{p \wedge b\}\ c_1\ \{q\}}{\{p\}\text{if}b\text{then}c_1\text{else}c_2\text{fi}\{q\}}$$

*Iteration:*

$$\frac{\{a \wedge b\}\ c\ \{a\}}{\{a\}\ \text{assert}\ a\ \text{while}\ b\ \text{do}\ c\ \text{od}\ \{q\}}$$ 
$55\ a \wedge \sim b \Rightarrow q$

*Precondition Strengthening:*

$\{p \wedge q\}$
$\{a\}\ c\ \{q\}$
$\{p\}\ c\ \{q\}$

TABLE 2.5

Example Verification Condition Generator.

$vcgvcg1$ (skip)
$q = q, [\ ]$ $vcg1$ (abort) $q$ = true, $[\ ]$ $vcg1\ (x := e)\ q = q \triangleleft [e/x], [\ ]$
$vcg1\ (c_1; c_2)\ q$ = let $(r,h_2)$ = $vcg1\ c_2\ q$ in
  let $(p,h_1)$ = $vcg1\ c_1\ r$ in
  $p, (h_1\ \&\ h_2)$
$vcgg1$ (if $b$ then $c_1$ else $c_2$ fi) $q$ =
  let $(r_1, h_1) = vcg1\ c_1\ q$ in
  let $(r_2, h_2) = vcg1\ c_2\ q$ in
  $(b \Rightarrow r_1\ |\ r_2), (h_1\ \&\ h_2)$

TABLE 2.5-continued

Example Verification Condition Generator.

$vcgg1$ (assert $a$ while $b$ do $c$ od) $q$ =
  let $(p, h) = vcg1\ c\ a$ in
  $a, [a \wedge b \Rightarrow p;$
  $a \wedge \sim b \Rightarrow q]\ \&\ h$
$vcg$      $vcg\ p\ c\ q$ = let $(r, h) = vcg1\ c\ q$ in $[p \Rightarrow r]\ \&\ h$

TABLE 3.1

Sunrise programming language.

| | | | |
|---|---|---|---|
| exp: | $e$ | ::= | $n\ |x|\ ++x|e_1 + e_2\ |e_1 + e_1 * e_2$ |
| (exp)list: | $es$ | ::= | $<>|CONS\ e\ es$ |
| bexp: | $b$ | ::= | $e_1 = e_2|e_1 < e_2|es_1 << es_2|b_1 \wedge b_2|b_1 \vee b_2|$ |
| | | | $\sim b$ |
| cmd: | $c$ | ::= | skip |
| | | | abort |
| | | | $x := e$ |
| | | | $c_1;c_2$ |
| | | | if $b$ then $c_1$ else $c_2$ fi |
| | | | assert $a$ with $a_{pr}$ while $b$ do $c$ od |
| | | | $p(x_1, \ldots, x_n; e_1, \ldots, e_m)$ |
| decl: | $d$ | ::= | procedure $p$ (var $x_1, \ldots x_n$; val $y_1, \ldots, y_m$); |
| | | | global $z_1, \ldots, z_k$; |
| | | | pre $a_{pre}$; |
| | | | post $a_{post}$; |
| | | | calls $p_1$ with $a_1$; |
| | | | . |
| | | | . |
| | | | . |
| | | | calls $p_j$ with $a_j$; |
| | | | recurses with $a_{rec}$; |
| | | | $c$ |
| | | | end procedure |
| | | | $d_1;d_2$ |
| | | | empty |
| prog: | $\pi$ | ::= | program $d$; $c$ end program |

TABLE 3.2

Sunrise programming language types of phrases.

| Type | Description | Typical Member |
|---|---|---|
| exp | numeric expressions | $e$ |
| (exp)list | lists of numeric expressions | $es$ |
| bexp | boolean expressions | $b$ |
| cmd | commands | $c$ |
| decl | declarations | $d$ |
| prog | programs | $\pi$ |

TABLE 3.3

Sunrise programming language constructor functions.

| | | | |
|---|---|---|---|
| exp: | NUM $n$ | | $n$ |
| | PVAR $x$ | | $x$ |
| | INC $x$ | | $++x$ |
| | PLUS $e_1\ e_2$ | | $e_1 + e_2$ |
| | MINUS $e_1\ e_2$ | | $e_1 - e_2$ |
| | MULT $e_1\ e_2$ | | $e_1 * e_2$ |
| bexp: | EQ $e_1\ e_2$ | | $e_1 = e_2$ |
| | LESS $e_1\ e_2$ | | $e_1 \leq e_2$ |
| | LLESS $es_1\ es_2$ | | $es_1 << es_2$ |
| | AND $b_1\ b_2$ | | $b_1 \wedge b_2$ |
| | OR $b_1\ b_2$ | | $b_1 \vee b_2$ |
| | NOT $b$ | | $\sim b$ |
| cmd: | SKIP | | skip |
| | ABORT | | abort |

TABLE 3.3-continued

Sunrise programming language constructor functions.

|  | ASSIGN $x$ $e$ | $x := e$ |
|---|---|---|
|  | SEQ $c_1$ $c_2$ | $c_1 ; c_2$ |
|  | IF $b$ $c_1$ $c_2$ | if $b$ then $c_1$ else $c_2$ fi |
|  | WHILE $a$ $pr$ $b$ $c$ | assert $a$ with $pr$ while $b$ do $c$ od |
|  | CALL $p$ $xs$ $es$ | $p(xs;es)$ |
| delc: | PROC $p$ vars vals glbs pre post calls rec $c$ | proc $p$ vars vals glbs pre post calls rec $c$ |
|  | DSEQ $d_1$ $d_2$ | $d_1 ; d_2$ |
|  | DEMPTY | empty |
| prog: | PROG $d$ $c$ | program $d$; $c$ end program |

TABLE 3.4

Sunrise assertion language.

| vexp: | $v$ | ::= | $n\|x\|v_1 + v_2\|v_1 - v_2\|v_1 * v_2$ |
|---|---|---|---|
| (vexp)list: | $vs$ | ::= | $<>\|CONS\ v\ vs$ |
| aexp: | $a$ | ::= | true\|false |
|  |  | \| | $v_1 = v_1\|v_1 < v_2\|vs_1 << vs_2$ |
|  |  | \| | $a_1 \wedge a_2\|a_1 \wedge a_2\|\sim a$ |
|  |  | \| | $a_1 \Rightarrow a_2\|a_2 = a_2\|(a_1 => a_2\|a_3)$ |
|  |  | \| | close $a\|\forall x.\ a\|\exists x.\ a$ |

TABLE 3.5

Sunrise assertion language types of phrases.

| Type | Description | Typical Member |
|---|---|---|
| vexp | numeric expressions | $v$ |
| (vexp)list | lists of numeric expressions | $vs$ |
| aexp | boolean expressions | $a$ |

TABLE 3.6

Sunrise assertion language constructor functions.

| vexp: | ANUM $n$ | $n$ |
|---|---|---|
|  | AVAR $x$ | $x$ |
|  | APLUS $v_1$ $v_2$ | $v_1 + v_2$ |
|  | AMINUS $v_1$ $v_2$ | $v_1 - v_2$ |
|  | AMULT $v_1$ $v_2$ | $v_1 * v_2$ |
| aexp: | ATRUE | true |
|  | AFALSE | false |
|  | AEQ $v_1$ $v_2$ | $v_1 = v_2$ |
|  | ALESS $v_1$ $v_2$ | $v_1 < v_2$ |
|  | ALLESS $vs_1$ $vs_2$ | $vs_1 << vs_2$ |
|  | AAND $a_1$ $a_2$ | $a_1 \wedge a_2$ |
|  | AOR $a_1$ $a_2$ | $a_1 \vee a_2$ |
|  | ANOT $a$ | $\sim a$ |
|  | AIMP $a_1$ $a_2$ | $a_1 \Rightarrow a_2$ |
|  | AEQB $a_1$ $a_2$ | $a_1 = a_2$ |
|  | ACOND $a_1$ $a_2$ $a_3$ | $a_1 => a_2 \mid a_3$ |
|  | ACLOSE $a$ | close $a$ |
|  | AFORALL $x$ $a$ | $\forall x.\ a$ |
|  | AEXISTS $x$ $a$ | $\exists x.\ a$ |

TABLE 3.7

Sunrise programming language semantic relations.

| $E\ e\ s_1\ n\ s_2$ | numeric expression $e$:exp evaluated in state $s_1$ yields numeric value $n$:num and state $s_2$ |
|---|---|
| $ES\ es\ s_1\ ns\ s_2$ | numeric expressions $es$:(exp)list evaluated in state $s_1$ yield numeric values $ns$:(num)list and state $s_2$ |
| $B\ b\ s_1\ t\ s_2$ | boolean expression $b$:bexp evaluated in state $s_1$ yields truth value $t$:bool and state $s_2$ |

TABLE 3.7-continued

Sunrise programming language semantic relations.

| $C\ c\ \rho\ s_1\ s_2$ | command $c$:cmd evaluated in environment $\rho$ and state $s_1$ yields state $s_2$ |
|---|---|
| $D\ d\ \rho_1\ \rho_2$ | declaration $d$:decl elaborated in environment $\rho_1$ yields result environment $\rho_2$ |
| $P\ \pi\ s$ | program $\pi$:prog executed yields state $s$ |

TABLE 3.8

Numeric Expression Structural Operational Semantics.

*Number:*

$$\overline{E(n)sns}$$

*Variable:*

$$\overline{E(x)s(sx)s}$$

*Addition:*

$$\frac{E\ e_1\ s_1\ n_1\ s_2 \quad E\ e_2\ s_2\ n_2\ s_3}{E(e_1+e_2)s_1(n_1+n_2)s_3}$$

*Multiplication:*

$$\frac{E\ e_1\ s_1\ n_1\ s_2 \quad E\ e_2\ s_2\ n_2\ s_3}{E(e_1*e_2)s_1(n_1*n_2)s_3}$$

*Increment:*

$$\frac{E\ (x)\ s_1\ n\ s_2}{E(++x)s_1(n+1)s_2[(n+1)/x]}$$

*Subtration:*

$$\frac{E\ e_1\ s_1\ n_1\ s_2 \quad E\ e_2\ s_2\ n_2\ s_3}{E(e_1-e_2)s_1(n_1-n_2)s_3}$$

TABLE 3.9

Numeric Expression List Structural Operational Semantics.

*Nil:*

$$\overline{ES(<>)s[]s}$$

*Cons:*

$$\frac{E\ e\ s_1\ n\ s_2 \quad ES\ es\ s_2\ ns\ s_3}{ES(CONSees)s_1(CONSnns)s_3}$$

TABLE 3.10

Boolean Expression Structural Operational Semantics.

*Equality:*

$$\frac{E\ e_1\ s_1\ n_1\ s_2 \quad E\ e_2\ s_2\ n_2\ s_3}{B(e_1=e_2)s_1(n_1=n_2)s_3}$$

*Less Than:*

$$\frac{E\ e_1\ s_1\ n_1\ s_2 \quad E\ e_2\ s_2\ n_2\ s_3}{B(e_1<e_2)s_1(n_1<n_2)s_3}$$

TABLE 3.10-continued

Boolean Expression Structural Operational Semantics.

*Lexicographic Less Than:*

$$\frac{E\,es_1\,s_1\,ns_1\,s_2 \quad E\,es_2\,s_2\,ns_2\,s_3}{B(es_1<<es_2)s_1(ns_1<<ns_2)s_3}$$

*Conjunction:*

$$\frac{B\,b_1\,s_1\,t_1\,s_2 \quad B\,b_2\,s_2\,t_2\,s_3}{B(b_1 \wedge b_2)s_1(t_1 \wedge t_2)s_3}$$

*Disjunction:*

$$\frac{B\,b_1\,s_1\,t_1\,s_2 \quad B\,b_2\,s_2\,t_2\,s_3}{B(b_1 \vee b_2)s_1(t_1 \vee t_2)s_3}$$

*Negation:*

$$\frac{B\,b\,s_1\,t\,s_2}{B(\sim b)s_1(\sim t)s_2}$$

TABLE 3.11

Command Structural Operational Semantics.

*Skip:*

$$\overline{C\,\text{skip}\,\rho\,s\,s}$$

*Abort:*

(no rules)

*Assignment:*

$$\frac{E\,e\,s_1\,n\,s_2}{C(x::=e)\rho s_1 s_2[n/x]}$$

*Sequence:*

$$\frac{C\,c_1\,\rho\,s_1\,s_2 \quad C\,c_2\,\rho\,s_2\,s_3}{C\,(c_1;\,c_2)\,\rho\,s_1\,s_3}$$

*Conditional:*

$$\frac{B\,b\,s_1\,T\,s_2 \quad C\,c_1\,\rho\,s_2\,s_3}{C(\text{if}b\text{then}c_1 else c_2 \text{fi})\rho s_1 s_3}$$

$$\frac{B\,b\,s_1\,F\,s_2 \quad C\,c_2\,\rho\,s_2\,s_3}{C(\text{if}b\text{then}c_1 else c_2 \text{fi})\rho s_1 s_3}$$

*Iteration:*

$$\frac{B\,b\,s_1 T\,s_2 \quad C\,c\,\rho\,s_2\,s_3}{\begin{array}{c}C\,(\text{assert}\,a\,\text{with}\,a_{pr}\\\text{while}\,b\,\text{do}\,c\,\text{od})\rho s_3 s_4\\\hline C\,(\text{assert}\,a\,\text{with}\,a_{pr}\\\text{while}\,b\,\text{do}\,c\,\text{od})\,\rho\,s_1\,s_4\end{array}}$$

$$\frac{B\,b\,s_1\,F\,s_2}{\begin{array}{c}C(\text{assert}\,a\,\text{with}\,a_{pr}\\\text{while}\,b\,\text{do}\,c\,\text{od})\,\rho\,s_1\,s_2\end{array}}$$

*Call:*

$$\frac{\begin{array}{c}E\,S\,es\,s_1\,ns\,s_2\\\rho\,p = (vars,vals,glbs,pre,post,calls,rec,c)\\vals' = \text{variants}\,vals\,(SL\,(xs\,\&\,glbs))\\C(c \triangleleft [xs\&vals'/vars\&vals])\rho s_2[ns/vals']s_3\end{array}}{C\,(\text{call}\,p(xs;\,es))\,\rho\,s_1\,s_3[(\text{map}\,s_2\,vals')/vals']}$$

TABLE 3.12

Declaration Structural Operational Semantics.

*Procedure Declaration:*

$$\overline{D(\text{proc}\,p\,vars\,vals\,glbs\,pre\,post\,calls\,rec\,c)\rho}$$
$$\rho[(vars,vals,glbs,pre,post,calls,rec,c)/p]$$

*Declaration Sequence:*

$$\frac{D\,d_1\,\rho_1\,\rho_2 \quad D\,d_2\,\rho_2\,\rho_3}{D\,(d_1;\,d_2)\,\rho_1\,\rho_3}$$

*Empty Declaration:*

$$\overline{D(\text{empty})\rho\rho}$$

TABLE 3.13

Program Structural Operational Semantics.

*Program:*

$$\frac{D\,d\,\rho_0\,\rho_1, \quad C\,c\,\rho_1\,s_0\,s_1}{P(\text{program}\,d;c\text{endprogram})s_1}$$

TABLE 3.14

Sunrise assertion language semantic functions.

| | |
|---|---|
| $V\,v\,s$ | numeric expression $v$:vexp evaluated in state $s$ yields numeric value in num |
| $VS\,vs\,s$ | list of numeric expressions $vs$:(vexp)list evaluated in state $s$ yields list of numeric values in (num)list |
| $A\,a\,s$ | boolean expression $a$:aexp evaluated in state $s$ yields truth value in bool |

TABLE 3.15

Assertion Numeric Expression Denotational Semantics.

| | | |
|---|---|---|
| $V\,n\,s$ | = | $n$ |
| $V\,x\,s$ | = | $s\,x$ |
| $V\,(v_1 + v_2)\,s$ | = | $V\,v_1\,s + V\,v_2\,s$ |
| $V\,(v_1 - v_2)\,s$ | = | $V\,v_1\,s - V\,v_2\,s$ |
| $V\,(v_1 * v_2)\,s$ | = | $V\,v_1\,s * V\,v_2\,s$ |

TABLE 3.16

Assertion Numeric Expression List Denotational Semantics.

| | | |
|---|---|---|
| $VS\,<\,>\,s$ | = | $[\,]$ |
| $VS\,(CONS\,v\,vs)\,s$ | = | $CONS\,(V\,v\,s)\,(VS\,vs\,s)$ |

TABLE 3.17

Assertion Boolean Expression Denotational Semantics.

| | | |
|---|---|---|
| $A$ true $s$ | = | T |
| $A$ false $s$ | = | F |
| $A\,(v_1 = v_2)\,s$ | = | $(V\,v_1\,s = V\,v_2\,s)$ |
| $A\,(v_1 < v_2)\,s$ | = | $(V\,v_1\,s < V\,v_2\,s)$ |
| $A\,(vs_1 << vs_2)\,s$ | = | $(VS\,vs_1\,s << VS\,vs_2\,s)$ |
| $A\,(a_1 \wedge a_2)\,s$ | = | $(A\,a_1\,s \wedge A\,a_2\,s)$ |
| $A\,(a_1 \vee a_2)\,s$ | = | $(A\,a_1\,s \vee A\,a_2\,s)$ |
| $A\,(\sim a)\,s$ | = | $\sim(A\,a\,s)$ |
| $A\,(a_1 \Rightarrow a_2)\,s$ | = | $(A\,a_1\,s \Rightarrow A\,a_2\,s)$ |
| $A\,(a_1 = a_2)\,s$ | = | $(A\,a_1\,s = A\,a_2\,s)$ |

TABLE 3.17-continued

Assertion Boolean Expression Denotational Semantics.

$$A\ (a_1 => a_2\ |\ a_3)\ s\ =\ (A\ a_1\ s => A\ a_2\ s\ |\ A\ a_3\ s)$$
$$A\ (\text{close}\ a)\ s\ =\ (\forall s_1.\ A\ a\ s_1)$$
$$A\ (\forall x.\ a)\ s\ =\ (\forall n.\ A\ a\ s[n/x])$$
$$A\ (\exists x.\ a)\ s\ =\ (\exists n.\ A\ a\ s[n/x])$$

TABLE 3.18

Sunrise programming language entrance semantic relations.

$C\_calls\ c\ \rho\ s_1\ p\ s_2$ — Command $c$:cmd, evaluated in environment $\rho$ and state $s_1$, calls procedure $p$ directly from $c$, where the state just after entering $p$ is $s_2$.

$M\_calls\ p_1\ s_1\ ps\ p_2\ s_2\ \rho$ — The body of procedure $p_1$, evaluated in environment $\rho$ and state $s_1$, goes through a path $ps$ of successively nested calls, and finally calls $p_2$, where the state just after entering $p_2$ is $s_2$.

TABLE 3.19

Command Entrance Semantic Relation.

Skip:  (no rules)
Abort: (no rules)
Assignment: (no rules)

Sequence:

$$\frac{C\_calls\ c_1\ \rho\ s_1\ p\ s_2}{C\_calss(c_1;c_2)\rho s_1 p s_2}$$

$$\frac{C\ c_1\ \rho\ s_1\ s_2\quad C\_calls\ c_1\ \rho\ s_2\ p\ s_3}{C\_calss(c_1;c_2)\rho s_1 p s_3}$$

Conditional:

$$\frac{B\ b\ s_1\ T\ s_2\quad C\_calls\ c_1\ \rho\ s_2\ p\ s_3}{C\_calls(\text{if}b\text{then}c_1\text{else}c_2\text{fi})\rho s_1 p s_3}$$

$$\frac{B\ b\ s_1\ F\ s_2\quad C\_calls\ c_2\ \rho\ s_2\ p\ s_3}{C\_calls(\text{if}b\text{then}c_1\text{else}c_2\text{fi})\rho s_1 p s_3}$$

Iteration:

$$\frac{B\ b\ s_1\ T\ s_2\quad C\_calls\ c\ \rho\ s_2\ p\ s_3}{C\_calls(\text{assert}a\text{with}a_{pr}\text{ while }b\text{ do }c\text{ od})\ \rho\ s_1\ p\ s_3}$$

$$\frac{B\ b\ s_1\ T\ s_2\quad C\ c\ \rho\ s_2\ s_3\quad C\_calls\ (\text{assert}\ a\ \text{with}\ a_{pr}\text{ while }b\text{ do }c\text{ od})\ \rho\ s_3\ p\ s_4}{C\_calls(\text{assert}a\text{with}a_{pr}\text{ while }b\text{ do }c\text{ od})\ \rho\ s_1\ p\ s_4}$$

Call:

$$\frac{ES\ es\ s_1\ ns\ s_2\quad \rho\ p\ =\ (vars,vals,glbs,pre,post,calls,rec,c)\quad vals'\ =\ variants\ vals\ (SL\ (xs\ \&\ glbs))}{C\_calls(\text{call}p(xs;es))\rho s_1 p((s_2[ns/vals']) \triangleleft [xs\&vals'/vars\&vals])}$$

TABLE 3.20

Path Entrance Semantic Relation.

Single:

$$\rho\ p_1\ =\ (vars,vals,glbs,pre,post,calls,rec,c)$$
$$\frac{C\_callsc\rho s_1 p_2 s_2}{M\_calls\ p_1\ s_1\ [\ ]\ p_2\ s_2\ \rho}$$

Multiple:

$$\frac{M\_calls\ p_1\ s_1\ ps_1\ p_2\ s_2\ \rho \quad M\_calls\ p_2\ s_2\ ps_2\ p_3\ s_3\ \rho}{M\_callsp_1 s_1(ps_1\&(CONSp_2 ps_2))p_3 s_3 \rho}$$

TABLE 3.21

Sunrise programming language termination semantic relations.

$C\_calls\_terminate\ c\ \rho\ s_1$ — For every procedure $p$ and state $s_2$ such that $C\_calls\ c\ \rho\ s_1\ p\ s_2$, the body of $p$ executed in state $s_2$ terminates.

$M\_calls\_terminate\ p_1\ s_1\ \rho$ — For every procedure $p_2$ and state $s_2$ such that $M\_calls\ p_1\ s_1\ []\ p_2\ s_2\ \rho$, the body of $p_2$ executed in state $s_2$ terminates.

TABLE 3.22

Command Termination Semantic Relation $C\_calls\_terminate$.

$C\_calls\_terminate\ c\ \rho\ s_1\ =$
  $\forall p\ s_2.\ C\_calls\ c\ \rho\ s_1\ p\ s_2 \Rightarrow$
    $(\exists s_3.\ \text{let }(vars,vals,glbs,pre,post,calls,rec,c')\ =\ \rho\ p\text{ in}$
    $C\ c'\ \rho\ s_2\ s_3)$

TABLE 3.23

Procedure Path Termination Semantic Relation $M\_calls\_terminate$.

$M\_calls\_terminate\ p_1\ s_1\ \rho\ =$
  $\forall p_2\ s_2.\ M\_calls\ p_1\ s_1\ []\ p_2\ s_2\ \rho \Rightarrow$
    $(\exists s_3.\ \text{let }(vars,vals,glbs,pre,post,calls,rec,c)\ =\ \rho\ p_2\text{ in}$
    $C\ c\ \rho\ s_2\ s_3)$

TABLE 4.1

Call Progress Function.

$call\_progress\ p_1\ p_2\ q\ \rho\ =$
  let $(vars,vals,glbs,pre,post,calls,rec,c)\ =\ \rho\ p_1$ in
  let $x\ =\ vars\ \&\ vals\ \&\ glbs$ in
  let $x_0\ =\ logicals\ x$ in
  let $x'_0\ =\ variants\ x_0\ (FV_a\ q)$ in
  let $(vars',vals',glbs',pre',post',calls',rec',c')\ =\ \rho\ p_2$ in
  let $y\ =\ vars'\ \&\ vals'\ \&\ glbs'$ in
  let $a\ =\ calls\ p_2$ in
  ( $a\ =\ false \Rightarrow true$
  $|(\forall y.\ (a\ \triangleleft\ [x'_0/x_0]) \Rightarrow$
  $q)\ \triangleleft\ [x/x'_0])$

TABLE 4.2

Odd/Even Example Program.

program
  procedure $odd$(var $a$; val $n$);
    pre true;
    post ($\exists b.\ \hat{n}\ =\ 2\ *\ b\ +\ a$)

TABLE 4.2-continued

Odd/Even Example Program.

$\wedge \ a < 2 \wedge \ n = \hat{n}$;
calls *odd* with $n < \hat{n}$;
calls *even* with $n < \hat{n}$;
recurses with $n < \hat{n}$;
if $n = 0$ then $a := 0$
else if $n = 1$
then *even* $(a; n - 1)$
else *odd* $(a; n - 2)$
fi
fi
end procedure;
procedure *even*(var $a$; val $n$);
pre true;
post $(\exists b. \ \hat{n} + 1 = 2 * b + a)$
$\wedge \ a < 2 \wedge \ n = \hat{n}$;
calls *even* with $n < \hat{n}$;
calls *odd* with $n < \hat{n}$;
recurses with $n < \hat{n}$;
if $n = 0$ then $a := 1$
else if $n = 1$
then *odd* $(a; n - 1)$
else *even* $(a; n - 2)$
fi
fi
end procedure;
*odd*$(a; 5)$
end program
$[a = 1]$

TABLE 4.3

Call Path Progress Function.

call_path_progress $p_1$ () $p_2$ $q$ $\rho$ =
  call_progress $p_1$ $p_2$ $q$ $\rho$
call_path_progress $p_1$ (CONS $p$ $ps$) $p_2$ $q$ $\rho$ =
  call_progress $p_1$ $p$ (call_path_progress $p$ $ps$ $p_2$ $q$ $\rho$) $\rho$

TABLE 4.4

General rules for Total Correctness.

*Precondition Strengthening:*

$$\frac{\{p \Rightarrow a\}}{[a] \ c \ [q]/\rho}$$
$$\overline{[p]c[q]/\rho}$$

*False Precondition:*

$$\overline{[\text{false}]c[q]/92}$$

*Postcondition Weakening:*

$$\frac{[p] \ c \ [a]/\rho}{\{a \Rightarrow q\}}$$
$$\overline{[p] \ c \ [q]/\rho}$$

TABLE 4.5

Hoare Logic for Total Correctness.

*Skip:*

$$\overline{[q]\text{skip}[q]/\rho}$$

*Abort:*

$$\overline{[\text{false}]\text{abort}[q]/\rho}$$

TABLE 4.5-continued

Hoare Logic for Total Correctness.

*Assignment:*

$$\overline{[q \Rightarrow [x:=e]]x:=e[q]/\rho}$$

*Sequence:*

$$\overline{[p]c_1[r]/\rho, [r]c_2[q]/\rho}$$

*Conditional:*

$$\frac{[r_1] \ c_1 \ [q]/\rho}{[r_2] \ c_2 \ [q]/\rho}$$
$$\frac{[ABb \Rightarrow ab\_prebr_1|ab\_prebr_2]}{\text{if } b \text{ then } c_1 \text{ else } c_2 \text{ fi } [q]/\rho}$$

*Iteration:*

$$WF_{env\_syntax} \ \rho$$
$$WF_c \ (\text{assert } a \text{ with } v < x$$
$$\text{while } b \text{ do } c \text{ od}) \ g \ \rho$$
$$[p] \ c \ [a \wedge (v < x)]/\rho$$
$$\{a \wedge (AB \ b) \wedge (v = x) \Rightarrow ab\_pre \ b \ p\}$$
$$\frac{\{a \wedge \sim(ABb) \Rightarrow ab\_prebq\}}{[a] \text{ assert } a \text{ with } v < x}$$
$$\text{while } b \text{ do } c \text{ od } [q]/\rho$$

*Rule of Adaption:*

$$WF_{env\_syntax} \ \rho, \ WF_c \ c \ g \ \rho, \ WF_{xs} \ x, \ DL_x$$
$$x_0 = \text{logicals } x, \ x_0' = \text{variants } x_0 \ (FV_a q)$$
$$FV_c \ c \ p \subseteq x, \ FV_a \ pre \subseteq x, \ FV_a \ post \subseteq (x \cup x_0)$$
$$[x_0 = x \wedge pre] \ c \ [post]/\rho$$
$$\overline{[pre \wedge ((\forall x.(post \triangleleft [x_0'/x_0] \Rightarrow q)) \triangleleft [x/x_0'])]c[q]/\rho}$$

*Procedure Call:*

$$WF_{env} \ \rho, \ WF_c \ (\text{call } p(xs:es)) \ g \ \rho$$
$$\rho \ p = (vars, vals, glbs, pre, post, calls, rec, c)$$
$$vals' = \text{variants vals} \ (FV_a \cup SL \ (xs \ \& \ glbs)), \ y = vars \ \& \ vals \ \& \ glbs$$
$$u = xs \ \& \ vals', \ v = vars \ \& \ vals, \ x = xs \ \& \ vals' \ \& \ glbs$$
$$x_0 = \text{logicals } x, \ y_0 = \text{logicals } y, \ x_0' = \text{variants } x_0 \ (FV_a \ q)$$
$$\frac{[(pre \triangleleft [u/v] \wedge (((\forall x(post \triangleleft [u, x_0'/v, y_0] \Rightarrow q)) \triangleleft [x/x_0'])) \triangleleft [vals':=es]]}{\text{call } p(xe; ex)[q]/\rho}$$

TABLE 4.6

Hoare Logic for Partial Correctness.

*Skip:*

$$\overline{\{q\}\text{skip}\{q\}/\rho}$$

*Abort:*

$$\overline{\{a\}\text{abort}\{q\}/\rho}$$

*Assignment:*

$$\overline{\{q \Rightarrow [x:=e]\}x:=e\{q\}/\rho}$$

*Sequence:*

$$\overline{\{p\}c_1\{r\}/\rho, \{r\}c_2\{q\}/\rho}$$

*Conditional:*

$$\{r_1\} \ c_1 \ \{q\}/\rho$$
$$\{r_2\} \ c_2 \ \{q\}/\rho$$
$$\frac{\{ABb \Rightarrow ab\_prebr_1|ab\_prebr_2\}}{\text{if } b \text{ then } c_1 \text{ else } c_2 \text{ fi } \{q\}/\rho}$$

TABLE 4.6-continued

Hoare Logic for Partial Correctness.

*Iteration:*

$$WF_{env\_syntax}\ \rho$$
$$WF_c\ (\text{assert}\ a\ \text{with}\ v < x$$
$$\text{while}\ b\ \text{do}\ c\ \text{od})\ g\ \rho$$
$$\{p\}\ c\ \{a \wedge (v < x)\}/\rho$$
$$\{a \wedge (AB\ b) \wedge (v = x) \Rightarrow ab\_pre\ b\ p\}$$
$$\frac{\{a \wedge \sim(ABb) \Rightarrow ab\_preb q\}}{\{a\}\ \text{assert}\ a\ \text{with}\ v < x}$$
$$\text{while}\ b\ \text{do}\ c\ \text{od}\ \{q\}/\rho$$

*Rule of Adaption:*

$$WF_{env\_syntax}\ \rho,\ WF_c\ c\ g\ \rho,\ WF_{xs}\ x,\ DL_x$$
$$x_O = \text{logicals}\ x,\ x_O' = \text{variants}\ x_O\ (FV_a q)$$
$$FV_c\ c\ p \subseteq x,\ FV_a\ pre \subseteq x,\ FV_a\ post \subseteq (x \cup x_O)$$
$$\frac{\{x_O = x \wedge pre\}\ c\ \{post\}/\rho}{\{pre \wedge ((\forall x.(post \triangleleft [x_O'/x_O] \Rightarrow q)) \triangleleft [x/x_O'])\} c \{q\}/\rho}$$

*Procedure Call:*

$$WF_{env}\ \rho,\ WF_c\ (\text{call}\ p(xs{:}es))\ g\ \rho$$
$$\rho\ p = (vars, vals, glbs, pre, post, calls, rec, c)$$
$$vals' = \text{variants}\ vals\ (FV_a \cup SL\ (xs\ \&\ glbs)),\ y = vars\ \&\ vals\ \&\ glbs$$
$$u = xs\ \&\ vals',\ v = vars\ \&\ vals,\ x = xs\ \&\ vals'\ \&\ glbs$$
$$x_O = \text{logicals}\ x,\ y_O = \text{logicals}\ y,\ x_O' = \text{variants}\ x_O\ (FV_a\ q)$$
$$\frac{\{(pre \triangleleft [u/v] \wedge (((\forall x(post \triangleleft [u,x_O'/v,y_O] \Rightarrow q)) \triangleleft [x/x_O'])) \triangleleft [vals' := es]\}}{\text{call}\ p(xe;ex)\{q\}/\rho}$$

TABLE 4.7

Hoare Logic for Command Termination.

*Skip:*

$$[q]\text{skip} \Downarrow/\rho$$

*Abort:*

$$[\text{false}]\text{abort} \Downarrow/\rho$$

*Assignment:*

$$[a]x{:}=e \Downarrow/\rho$$

*Sequence:*

$$[p]\ c_1 \Downarrow/\rho$$
$$\{p\}\ c_1\ [q]/\rho$$
$$\frac{[q]\ c_2 \Downarrow/\rho}{[p]\ c_1\ ;\ c_2 \Downarrow/\rho}$$
$$[p]c_1;c_2 \Downarrow/\rho$$

*Conditional:*

$$[r_1]\ c_1\ \Downarrow/\rho$$
$$\frac{[r_2]\ c_2\ \Downarrow/\rho}{[ABb \Rightarrow ab\_prebr_1 | ab\_prebr_2]}$$
$$\text{if}\ b\ \text{then}\ c_1\ \text{else}\ c_2\ \text{fi} \Downarrow/\rho$$

*Iteration:*

$$WF_{env\_syntax}\ \rho$$
$$WF_c\ (\text{assert}\ a\ \text{with}\ v < x$$
$$\text{while}\ b\ \text{do}\ c\ \text{od})\ g\ \rho$$
$$\{p\}\ c\ \{a \wedge (v < x)\}/\rho$$
$$[p]\ c \Downarrow/\rho$$
$$\{a \wedge (AB\ b) \wedge (v = x) \Rightarrow ab\_pre\ b\ p\}$$
$$\frac{\{a \wedge \sim(ABb) \Rightarrow ab\_preb q\}}{[a]\ \text{assert}\ a\ \text{with}\ v < x}$$
$$\text{while}\ b\ \text{do}\ c\ \text{od} \Downarrow/\rho$$

TABLE 4.7-continued

Hoare Logic for Command Termination.

*Rule of Adaption:*

$$WF_{env\_syntax}\ \rho,\ WF_c\ c\ g\ \rho,\ WF_{xs}\ x,\ DL_x$$
$$x_O = \text{logicals}\ x,\ x_O' = \text{variants}\ x_O\ (FV_a q)$$
$$FV_c\ c\ p \subseteq x,\ FV_a\ pre \subseteq x,\ FV_a\ post \subset (x \cup x_O)$$
$$[x_O = x \wedge pre]\ c\ \Downarrow/\rho$$
$$[pre \wedge ((\forall x.\ (post \triangleleft [x_O'/x_O] \Rightarrow q)) \triangleleft [x/x_O'])]\ c\ \Downarrow/\rho$$

*Procedure Call:*

$$WF_{env}\ \rho,\ WF_c\ (\text{call}\ p(xs{:}es))\ g\ \rho$$
$$\rho\ p = (vars, vals, glbs, pre, post, calls, rec, c)$$
$$vals' = \text{variants}\ vals\ (FV_a \cup SL\ (xs\ \&\ glbs)),\ y = vars\ \&\ vals\ \&\ glbs$$
$$u = xs\ \&\ vals',\ v = vars\ \&\ vals,\ x = xs\ \&\ vals'\ \&\ glbs$$
$$x_O = \text{logicals}\ x,\ y_O = \text{logicals}\ y,\ x_O' = \text{variants}\ x_O\ (FV_a\ q)$$
$$\frac{[(pre \triangleleft [u/v] \wedge (((\forall x(post \triangleleft [u,x_O'/v,y_O] \Rightarrow q)) \triangleleft [x/x_O'])) \triangleleft [vals' := es]]}{\text{call}\ p(xs;es) \Downarrow/\rho}$$

TABLE 4.8

Definition of vcg1, helper VCG function for commands.

```
vcg1 (skip) calls q ρ = q, []
vcg1 (abort) calls q ρ = false, []

vcg1 (x := e) calls q ρ = q ◁ [x := e], []
vcg1 (c_1 ; c_2) calls q ρ =
    let (s,h_2) = vcg1 c_2 calls q ρ in
    let (p,h_1) = vcg1 c_1 calls s ρ in
    p, h_1 & h_2
vcg1 (if b then c_1 else c_2 fi) calls q ρ =
    let (r_1,h_1) = vcg1 c_1 calls q ρ in
    let (r_2,h_2) = vcg1 c_2 calls q ρ in
    (AB b => ab_pre b r_1 | ab_pre b r_2), h_1 & h_2
vcg1 (assert a with a_pr while b do c od) calls q ρ =
    let (v_0,v_1) = dest_< a_pr in
    let (p,h) = vcg1 c calls (a ∧ a_pr) ρ in
    a, [ a ∧ AB b ∧ (v_0 = v_1)
        ⇒ ab_pre b p ;
        a ∧ ~(AB b) ⇒
        ab_pre b q ] & h
vcg1 (call p (xs ; es)) calls q ρ =
    let (vars,vals,glbs,pre,post,calls',rec,c) = ρ p in
    let vals' = variants vals (FV_a q ∪ SL(xs & glbs)) in
    let u = xs & vals' in
    let v = vars & vals in
    let x = u & glbs in
    let y = v & glbs in
    let x_0 = logicals x in
    let y_0 = logicals y in
    let x'_0 = variants x_0 (FV_a q) in
    ( ( (pre ∧ calls p)
        ◁ [u/v] ) ◁
        ( (∀x. (post ◁ [u & x'_0/v &
            y_0]) ⇒ q)
        ◁ [x/x'_0] )
    ) ◁ [vals' := es], []
```

TABLE 4.9

Definition of *vcgc*, main VCG function for commands.

$vcgc \ p \ c \ calls \ q \ \rho$ = let $(a,h)$ = $vcg1 \ c \ calls \ q \ \rho$ in
$[ \ p \Rightarrow a \ ] \ \& \ h$

TABLE 4.10

Definition of *vcgd*, VCG function for declarations.

$vcgd$ (proc $p$ vars vals glbs pre post calls rec $c$) $\rho$ =
   let $x$ = vars $\&$ vals $\&$ glbs in
   let $x_0$ = logicals $x$ in
   $vcgc \ (x_0 = x \land \ pre) \ c \ calls \ post \ \rho$
$vcgd \ (d_1 \ ; \ d_2) \ \rho$ = let $h_1$ = $vcgd \ d_1 \ \rho$ in
   let $h_2$ = $vcgd \ d_2 \ \rho$ in
   $h_1 \ h_2$
$vcgd$ (empty) $\rho$ = [ ]

TABLE 4.11

Definition of *extend*_graph_vcs and *fan*_out_graph_vcs.

$extend$_graph_vcs p ps $p_0$ $q$ $pcs$ $\rho$ $all$_ps n p' =
   let $q_1$ = $call$_progress p' p q $\rho$ in
   $(q_1$ = true => [ ]
   $| \ p' = p_0$ =>
     let $(vars,vals,glbs,pre,post,calls,rec,c)$ = $\rho \ p_0$ in
     $[ \ pre \land \ induct\_$pre
      $rec \Rightarrow q_1 \ ]$
   $| \ p' \in SL(CONS \ p \ ps)$ =>
     $[ \ pcs \ p' \Rightarrow q_1 \ ]$
   $| \ fan\_$out_graph_vcs p' $(CONS \ p \ ps)$
     $p_0 \ q_1 \ (pcs[q_1/p']) \ \rho \ all\_$ps n
   )
$fan$_out_graph_vcs p ps $p_0$ $q$ $pcs$ $\rho$ $all\_$ps $(n + 1)$ =
   $FLAT \ (MAP \ (extend\_$graph_vcs p ps $p_0$ $q$ $pcs$ $\rho$ $all\_$ps n$)$ $all\_$ps$)$
$fan$_out_graph_vcs p ps $p_0$ $q$ $pcs$ $\rho$ $all\_$ps $0$ = [ ]

TABLE 4.12

Call Progress Function.

$call$_progress $p_1 \ p_2 \ q \ \rho$ =
   let $(vars,vals,glbs,pre,post,calls,rec,c)$ = $\rho \ p_1$ in
   let $x$ = vars $\&$ vals $\&$ glbs in
   let $x_0$ = logicals $x$ in
   let $x'_0$ = variants $x_0 \ (FV_a \ q)$ in
   let $(vars',vals',glbs',pre',post',calls',rec',c')$ = $\rho \ p_2$ in
   let $y$ = vars' $\&$ vals' $\&$ glbs' in
   let $a$ = calls $p_2$ in
   $( \ a$ = false => true
     $|(\forall y. \ (a \ \triangleleft \ [x'_0/x_0]) \Rightarrow$
      $q) \ \triangleleft \ [x/x'_0] \ )$

TABLE 4.13

Definition of *graph*_vcs.

$graph$_vcs $all\_$ps $\rho$ p =
   let $(vars,vals,glbs,pre,post,calls,rec,c)$ = $\rho \ p$ in
   $fan\_$out_graph_vcs p [ ] $p$ $rec$ $(\lambda p'. \ true)$
   $\rho \ all\_$ps $(LENGTH \ all\_$ps$)$

TABLE 4.14

Definition of *vcgg*, the VCG function to analyze the call graph.

$vcgg \ all\_$ps $\rho$ = $FLAT \ (MAP \ (graph\_$vcs $all\_$ps $\rho) \ all\_$ps$)$

TABLE 4.15

Definition of *mkenv*.

$mkenv$ (proc $p$ vars vals glbs pre post calls rec $c$) $\rho$ =
   $\rho[(vars,vals,glbs,pre,post,calls,rec,c)/p]$
$mkenv \ (d_1 \ ; \ d_2) \ \rho$ = $mkenv \ d_2 \ (mkenv \ d_1 \ \rho)$
$mkenv$ (empty) $\rho$ = $\rho$

TABLE 4.16

Definition of proc_names.

proc_names (proc p vars vals glbs pre post calls rec c) = [p]
proc_names $(d_1;d_2)$ = proc_names $d_1$ $\&$ proc_names $d_2$
proc_names (empty) = [ ]

TABLE 4.17

Definition of vcg, the main VCG function.

vcg (program d; c end program) q =
   let p = mkenv d $p_0$ in
   let $h_1$ = vcgd d p in
   let $h_2$ = vcgg (proc_names d) p in
   let $h_3$ = vcgc true c $g_0$ q p in
   $h_1 \ \& \ h_2 \ \& \ h_3$

TABLE 4.18

Theorems of verification of commands using the vcg1 function.

| vcg1_0_THM | $\forall c \ calls \ q \ p. \ WF_{env\_syntax} \ p \ \forall \ WF_c \ c \ calls \ p \Downarrow$ <br> let $(p,h)$ = vcg1 c calls q p in <br> $(all\_el \ close \ h \Downarrow \ \{p\} \ c \ \{q\}/p, 0)$ |
|---|---|

TABLE 4.18-continued

Theorems of verification of commands using the vcg1 function.

| | | |
|---|---|---|
| vcg1_k_THM | $\forall$c calls q p k. | $WF_{envk}$ p k $\forall$ $WF_c$ c calls p$\Downarrow$ <br> let (p,h) = vcg1 c calls q p in <br> (all_el close h $\Downarrow$ {p} c {q}/p, k + 1) |
| vcg1p_THM | $\forall$c calls q p. | $WF_{envp}$ p $\forall$ $WF_c$ c calls p$\Downarrow$ <br> let (p,h) = vcg1 c calls q p in <br> (all_el close h $\Downarrow$ {p} c {q}/p) |
| vcg1_PRE_PROGRESS | $\forall$c calls q p. | $WF_{envp}$ p $\forall$ $WF_c$ c calls p$\Downarrow$ <br> let (p,h) = vcg1 c calls q p in <br> (all_el close h $\Downarrow$ {p} c $\rightarrow$ pre/p) |
| vcg1_BODY_PROGRESS | $\forall$c calls q p. | $WF_{envp}$ p $\forall$ $WF_{calls}$ calls p <br> $\forall$ $WF_c$ c calls p$\Downarrow$ <br> let (p,h) = vcg1 c calls q p in <br> (all_el close h $\Downarrow$ {p} c $\rightarrow$ calls/p) |
| vcg1_TERM | $\forall$c calls q p. | $WF_{envp}$ p $\forall$ $WF_c$ c calls p$\Downarrow$ <br> let (p,h) = vcg1 c calls q p in <br> (all_el close h $\Downarrow$ {p} c $\downarrow$ /p) |
| vcg1_THM | $\forall$c calls q p. | $WF_{env}$ p $\forall$ $WF_c$ c calls p$\Downarrow$ <br> let (p,h) = vcg1 c calls q p in <br> (all_el close h $\Downarrow$ {p} c {q}/p) |

TABLE 4.19

Theorems of verification of commands using the vcgc function.

| | | |
|---|---|---|
| vcgc_0_THM | $\forall$c p calls q p. | $WF_{env\_syntax}$ p $\forall$ $WF_c$ c calls p$\Downarrow$ <br> all_el close (vcgc p c calls q p)$\Downarrow$ <br> {p} c {q}/p, 0 |
| vcgc_k_THM | $\forall$c p calls q p k. | $WF_{envk}$ p $\forall$ $WF_c$ c calls p$\Downarrow$ <br> all_el close (vcgc p c calls q p)$\Downarrow$ <br> {p} c {q}/p, k + 1 |
| vcgcp_THM | $\forall$c p calls q p. | $WF_{envp}$ p $\forall$ $WF_c$ c calls p$\Downarrow$ <br> all_el close (vcgc p c calls q p)$\Downarrow$ <br> {p} c {q}/p |
| vcgc_PRE_PROGRESS | $\forall$c p calls q p. | $WF_{envp}$ p $\forall$ $WF_c$ c calls p$\Downarrow$ <br> all_el close (vcgc p c calls q p)$\Downarrow$ <br> {p} c $\rightarrow$ pre/p |
| vcgc_BODY_PROGRESS | $\forall$c p calls q p. | $WF_{envp}$ p $\forall$ $WF_c$ c calls p <br> all_el close (vcgc p c calls q p)$\Downarrow$ <br> {p} c $\rightarrow$ calls/p |
| vcgc_TERM | $\forall$c p calls q p. | $WF_{envp}$ p $\forall$ $WF_c$ c calls p$\Downarrow$ <br> all_el close (vcgc p c calls q p)$\Downarrow$ <br> [p] c $\downarrow$ /p |
| vcgc_THM | $\forall$c p calls q p. | $WF_{env}$ p $\forall$ $WF_c$ c calls p$\Downarrow$ <br> all_el close (vcgc p c calls q p)$\Downarrow$ <br> [p] c {q}/p |

TABLE 4.20

Theorems of verification of declarations using the vcgd function.

| | | |
|---|---|---|
| vcgd_syntax_THM | $\forall$d p. | p = mkenv d $p_0$ $\forall$ $WF_d$ d p $\forall$ <br> all_el close (vcgd d p)$\Downarrow$ <br> $WF_{env\_syntax}$ p |
| vcgd_0_THM | $\forall$d p. | p = mkenv d $p_0$ $\forall$ $WF_d$ d p $\forall$ <br> all_el close (vcgd d p)$\Downarrow$ <br> $WF_{envk}$ p 0 |
| vcgd_k_THM | $\forall$d p k. | p = mkenv d $p_0$ $\forall$ $WF_d$ d p $\forall$ <br> all_el close (vcgd d p)$\Downarrow$ <br> $WF_{envk}$ p k$\Downarrow$ |

TABLE 4.20-continued

Theorems of verification of declarations using the vcgd function.

vcgd_THM  
$\forall$d p. $\begin{array}{l} WF_{envk}\ p\ (k+1) \\ p = mkenv\ d\ p_0\ \forall\ \ WF_d\ d\ p\ \forall \\ all\_el\ close\ (vcgd\ d\ p)\Downarrow \\ WF_{envp}\ p \end{array}$ vcgd_PRE_PROGRESS  
$\forall$d p. $\begin{array}{l} p = mkenv\ d\ p_0\ \forall\ \ WF_d\ d\ p\ \forall \\ all\_el\ close\ (vcgd\ d\ p)\Downarrow \\ WF_{env\_pre}\ p \end{array}$ vcgd_BODY_PROGRESS  
$\forall$d p. $\begin{array}{l} p = mkenv\ d\ p_0\ \forall\ \ WF_d\ d\ p\ \forall \\ all\_el\ close\ (vcgd\ d\ p)\Downarrow \\ WF_{env\_calls}\ p \end{array}$ vcgd_TERM  
$\forall$d p. $\begin{array}{l} p = mkenv\ d\ p_0\ \forall\ \ WF_d\ d\ p\ \forall \\ all\_el\ close\ (vcgd\ d\ p)\Downarrow \\ WF_{env\_term}\ p \end{array}$

TABLE 4.21

Theorems of verification condition collection by fan_out_graph_vcs.

$\forall$n p ps $p_0$ q pcs p all_ps y z
vars vals glbs pre post calls rec c
vars' vals' glbs' pre' post' calls' rec' c'.
$WF_{env\_syntax}\ p\ \forall$
$WF_{env\_pre}\ p\ \forall$
$WF_{env\_calls}\ p\ \forall$
p $p_0$ = (vars, vals, glbs, pre, post, calls, rec, c) $\forall$
$p_0\ \epsilon\ SL\ all\_ps\ \forall$
($\forall$p'. (p' $\notin$ SL all _ops)$\Downarrow$(p p' = $p_0$ p')) $\forall$
LENGTH all _ps = LENGTH ps + n $\forall$
$p_0\ \epsilon$ SL (CONS p ps) $\forall$
SL (CONS p ps) $\subseteq$ SL (y & logicals z) $\forall$
((ps = [])$\Downarrow$(q = rec)) $\forall$
({ps'. (ps = ps' & [$p_0$])$\Downarrow$
     (q = call_path_progree p ps' $p_0$ rec p)) $\forall$
({p'. p' $\epsilon$ SL (CONS p ps) $\forall$ p' $\neq p_0\Downarrow$
   ($\forall$pd$_2$ ps$_1$. (CONS p ps = ps$_2$ & (CONS p '(ps$_1$ & [$p_0$])))$\Downarrow$
        (pcs p' = call_path_progress p' ps$_1$ $p_0$ rec p))) $\forall$
all_el close (fan_out_graph_vcs p ps $p_0$ q pcs p all_ps n)
$\Downarrow$
({ps'.
   DL ps' $\forall$ DISJOINT (SL ps') (SL(CONS p ps))$\Downarrow$
   close (pre $\forall$induct_pre rec$\Downarrow$
      call_path_progress $p_0$ ps' p q p)) $\forall$
($\forall p_1$ ps' ps$_1$ ps$_2$.
   ($p_1 \neq p_0$) $\forall$
   DL ps' $\forall$
   DL ps' $\forall$
   DISJOINT (SL ps') (SL(CONS p ps))$\Downarrow$
   (ps' & (CONS p ps) = ps$_2$ & (CONS $p_1$ (ps$_1$ & [ps$_1$ & [$p_0$])))$\Downarrow$
   close (call_path_progress $p_1$ ps$_1$ $p_0$ rec p$\Downarrow$
      call_path_progress $p_1$ (ps$_2$ & (CONS $p_1$ ps$_1$)) $p_0$ rec p))

TABLE 4.22

Theorem of verification condition collection by graph_vcs.

$\forall$p all_ps vars vals glbs pre post calls rec c.
$WF_{env\_syntax}\ p\ \forall$
$WF_{env\_pre}\ p\ \forall$
$WF_{env\_calls}\ p\ \forall$
($\forall$p'. (p' $\notin$ SL all _ps) $\forall$(p p' = $p_0$ p')) $\forall$
p $\epsilon$ SL all_ps $\forall$
p p = (vars, vals, glbs, pre, post, calls, rec, c) $\forall$
all_el close (graph_vcs all_ps p p)
$\forall$
({ps.
   DL(ps & [p]) $\forall$ TABLE 4.22-continued Theorem of verification condition collection by graph_vcs.

close (pre $\forall$ induct_pre rec $\forall$
      call_path_progress p ps p rec p)) $\forall$
({p' ps ps$_1$ ps$_2$.
   (p' $\neq$ p) $\forall$
   DL ps $\forall$
   p $\epsilon$ SL ps $\forall$
   ps = ps$_2$ & (CONSp' ps$_1$) $\forall$
   close (call_path_progress p' ps$_1$ p rec p $\forall$
      call_path_progress p' (ps$_2$ & (CONS p' ps$_1$)) p rec p))

TABLE 4.23

Theorem of verification of single recursion by call_path_progress.

$\forall$n p p all_ps vars vals glbs pre post calls rec c.
$WF_{env\_syntax}\ p\ \forall$
$WF_{env\_pre}\ p\ \forall$
$WF_{env\_calls}\ p\ \forall$
($\forall$p'. (p' $\notin$ SL all _ps) $\Downarrow$(p p' = $p_0$ p')) $\forall$
LENGTH ps = n $\forall$
$p_0\ \epsilon$ SL all_ps $\forall$
$p_0 \notin$ SL ps $\forall$
p p = (vars, vals, glbs, pre, post, calls, rec, c) $\forall$
all_el close (graph_vcs all_ps p p)
$\Downarrow$
close (pre $\forall$ induct_pre rec$\Downarrow$
   call_path_progress p ps p rec p)

TABLE 4.24

Theorem of verification of all single recursion.

$\forall$ps p all_ps vars vals glbs pre post calls rec c.
$WF_{env\_syntax}\ p\ \forall$
$WF_{env\_pre}\ p\ \forall$
$WF_{env\_calls}\ p\ \forall$
($\forall$p'. (p' $\notin$ SL all _ps)$\Downarrow$(p p' = $p_0$ p')) $\forall$
$p_0\ \epsilon$ SL all_ps $\forall$
$p_0 \notin$ SL ps $\forall$
p p = (vars, vals, glbs, pre, post, calls, rec, c) $\forall$
all_el close (graph_vcs all_ps p p)
$\Downarrow$
{pre $\forall$ induct_pre rec} p — ps $\rightarrow$ p {rec}/p

TABLE 4.25

Theorem of verification of all recursion, single and multiple.

∀n ps p p all_ps vars vals glbs pre post calls rec c.
   $WF_{env\_syntax}$ p ∀
   $WF_{env\_pre}$ p ∀
   $WF_{env\_calls}$ p ∀
   (∀p'. (p' ∉ SL all _ps)⇓(p p' = $p_0$ p')) ∀
   LENGTH ps = n ∀
   $p_0$ ∈ SL all_ps ∀
   p p = (vars, vals, glbs, pre, post, calls, rec, c) ∀
   all_el close (graph_vcs all_ps p p)
   ⇓
   {pre ∀ induct_pre rec} p — ps → p {rec}/p

TABLE 4.26

Theorem of verification of all recursion by graph_vcs.

∀p p all_ps vars vals glbs pre post calls rec c.
   $WF_{env\_syntax}$ p ∀
   $WF_{env\_pre}$ p ∀
   $WF_{env\_calls}$ p ∀
   (∀p'. (p' ∉ SL all _ps)⇓(p p' = $p_0$ p')) ∀
   p ∈ SL all_ps ∀
   p p = (vars, vals, glbs, pre, post, calls, rec, c) ∀
   all_el close (graph_vcs all_ps p p)
   ⇓
   {pre ∀ induct_pre rec} p {rec}/p

TABLE 4.27

Theorem of verification of recursion by vcgg.

∀p all_ps.
   $WF_{env\_syntax}$ p ∀
   $WF_{env\_pre}$ p ∀
   $WF_{env\_calls}$ p ∀
   (∀p'. (p' ∉ SL all _ps)⇓(p p' = $p_0$ p')) ∀
   all_el close (vcgg all_ps p)
   ⇓
   ∀p. let (vars, vals, glbs, pre, post, calls, rec, c) = p p in
   {pre ∀ induct_pre rec} p {rec}/p

TABLE 4.28

Theorem of verification of vcgg.

∀p.
   p = mkenv d $p_0$ ∀
   $WF_{env\_syntax}$ p ∀
   $WF_{env\_pre}$ p ∀
   $WF_{env\_calls}$ p ∀
   all_el close (vcgg proce_names d) p)⇓
   $WF_{env\_rec}$ p

TABLE 4.29

Theorem of verification of verification condition generator.

∀π q. $WF_p$ π ∀ all_el close (vcg π q) ⇓ π [q]

What is claimed is:

1. A computer-implemented method for verifying the total correctness of a computer program with mutually recursive procedures, the method comprising the steps of:

(a) receiving the computer program into the computer as a series of source statements, wherein the source statements include annotations indicating intended behavior of the source statements;

(b) translating the source statements into an abstract syntax tree and a call graph of the computer program in the computer, wherein the call graph includes nodes representing procedures in the computer program and directed arcs between the nodes representing procedure calls in the computer program;

(c) analyzing the abstract syntax tree and call graph for correctness by invoking a Verification Condition Generator in the computer to generate a set of verification conditions from the abstract syntax tree and call graph; and (d) outputting the set of verification conditions as conditions to be proven to complete a proof of total correctness of the computer program.

2. The method of claim 1 above, further comprising the steps of:

(e) verifying the set of verification conditions in the computer; and (f) outputting a theorem showing that the computer program is totally proven to be totally correct with respect to its specification based on the set of verification conditions.

3. The method of claim 1 above, further comprising the step adding the annotations to the source statements.

4. The method of claim 3 above, wherein the annotations comprise one or more annotations selected from a group comprising loop statement annotations regarding partial correctness, loop statement annotations regarding termination, procedure declaration annotations regarding partial correctness, and procedure declaration annotations regarding termination.

5. The method of claim 1 above, further comprising the step of adding annotations to the source program indicating the intended behavior of the source statements at various strategic points.

6. The method of claim 1 above, wherein the step of adding annotations further comprises the steps of:

determining a loop invariant expression for each loop in the program;

determining a loop progress expression for each loop, containing an expression whose value is taken from a well-founded set, with the well-founded relation of that set;

determining a precondition for each declared procedure, describing what must be true upon entrance to the procedure;

determining a post condition for each declared procedure, describing what must be true upon exit from the procedure due to the termination of its body;

determining a recursion expression for each declared procedure which is intended to recurse, containing an expression whose value is taken from a well-founded set, with the well-founded relation of that set; and determining a progress expression for each pair of procedures, where the first procedure calls the second procedure, describing the change in state from the entrance of the first procedure through any point in its body where a procedure call is issued to the second procedure, and the second procedure's entrance.

7. The method of claim 1 above, wherein the steps of generating the set of verification conditions comprises the steps of:

generating a set of syntactic verification conditions through a traversal of an abstract syntax tree of the program; and generating a set of call graph verification conditions through an analysis of the procedure call graph of the program along with the abstract syntax tree.

8. The method of claim 7 above, wherein the step of generating the set of call graph verification conditions comprises the steps of:

for each node in the procedure call graph, generating a procedure call tree;

for each procedure call tree generated, marking each node with its appropriate path expression; and for each procedure call tree generated and for each leaf of that tree, generating a call graph verification condition, where depending on the particular leaf, either a diversion verification condition or an undiverted recursion verification condition is generated.

9. The method of claim 8 above, wherein the step of generating a call graph verification condition comprises the step of, if the leaf node matches the root node of the tree, generating an undiverted recursion verification condition.

10. The method of claim 8 above, wherein the step of generating a call graph verification condition comprises the step of, if the leaf node does not match the root node of the tree, generating a diversion verification condition.

11. The method of claim 8 above, wherein the step of generating a procedure call tree comprises the steps of:

taking the starting node which is given and making that the root node of the tree to be constructed, this tree now having one node which is a leaf node;

for each leaf node of the current tree, examining the procedure call graph at the node corresponding to the same procedure for arcs of the graph terminating at that node;

for each arc identified in the examining step, tracing it backwards to the source node of the arc and adding this source node to the procedure call tree being constructed as a child node of the leaf node used in the examining step;

repeating the second and third steps for each leaf node of the developing tree, thus expanding the tree, except that this expansion stops at leaf nodes which duplicate some node in the path from the leaf node to the root of tree, where the path does not include the leaf node itself, as such leaf nodes are not expanded in the second and third steps; and when all the leaf nodes of the tree cannot be expanded, then the construction of the procedure call tree for this starting node is completed.

12. The method of claim 8 above, wherein the step of marking the procedure call tree comprises the steps of:

marking the root node with the recursion expression included as part of the annotation of the procedure that the node represents, wherein this is the path expression of the root node;

for each node in the tree which is not marked but is the child of a node which has been marked with a path expression, then according to the specifications of both procedures involved, transforming the path expression of the father node according to a formula into a path expression with which the child node is marked; and continuing the marking for all available nodes of the tree which are unmarked children of a marked node until all nodes of the tree are marked.

13. The method of claim 8 above, modified such that where the procedure call trees are generated (and the resulting verification conditions produced) from the nodes of the procedure call graph, the nodes are considered in some linear order in sequence, and for each node which has its procedure call tree created and the resulting verification conditions generated, that node is deleted from the current version of the procedure call graph, along with all arcs incident on that node, and the reduced call graph is used for the succeeding node in the sequence.

14. A computer-implemented apparatus for verifying the total correctness of a computer program with mutually recursive procedures, comprising:

(a) a computer;

(b) means, performed by the computer, for receiving the computer program into the computer as a series of source statements, wherein the source statements include annotations indicating intended behavior of the source statements;

(c) means, performed by the computer, for translating the source statements into an abstract syntax tree and a call graph of the computer program in the computer, wherein the call graph includes nodes representing procedures in the computer program and directed arcs between the nodes representing procedure calls in the computer program;

(d) means, performed by the computer, for analyzing the abstract syntax tree and call graph for correctness by invoking a Verification Condition Generator in the computer to generate a set of verification conditions from the abstract syntax tree and call graph; and (e) means, performed by the computer, for outputting the set of verification conditions as conditions to be proven to complete a proof of total correctness of the computer program.

15. An article of manufacture comprising a program storage medium readable by a computer and tangibly embodying one or more instructions executable by the computer to perform a method for verifying the total correctness of a computer program with mutually recursive procedures, the method comprising the steps of:

(a) receiving the computer program into the computer as a series of source statements, wherein the source statements include annotations indicating intended behavior of the source statements;

(b) translating the source statements into an abstract syntax tree and a call graph of the computer program in the computer, wherein the call graph includes nodes representing procedures in the computer program and directed arcs between the nodes representing procedure calls in the computer program;

(c) analyzing the abstract syntax tree and call graph for correctness by invoking a Verification Condition Generator in the computer to generate a set of verification conditions from the abstract syntax tree and call graph; and (d) outputting the set of verification conditions as conditions to be proven to complete a proof of total correctness of the computer program.

16. A method for verifying the total correctness of a computer program with mutually recursive procedures, comprising the steps of:

(a) accepting a computer program into a memory of a computer, wherein the program comprises a tree of source code and a formal specification of the intended behavior of the computer program;

(b) annotating the computer program in the memory of the computer at strategic points within the program, wherein the annotations comprise more detailed specifications of the intended behavior of the computer program consistent with the formal specification;

(c) creating a procedure call graph program in the memory of the computer from the computer program, formal specification, and annotations;

(d) creating a procedure call tree program in the memory of the computer for each node in the procedure call graph rooted at the node and annotating each node of the procedure call tree with path expressions; and (e) deriving a set of verification conditions program in the memory of the computer from the computer program, formal specification, annotations, procedure call graph, and procedure call trees, wherein the derived set of verification conditions is sufficient to prove termination and total correctness of the program.

17. The method of claim 16, wherein the annotating step comprises annotating, for each procedure declared in the computer program, a "recursion expression" yielding a value in a well-formed set, wherein the value decreases according to an ordering relation of a well-formed set between nested recursive calls of the procedure.

18. The method of claim 16, wherein the annotating step comprises annotating, for each pair of procedures declared in the computer program where a first procedure directly calls a second procedure and the second procedure may be the same as the first procedure, a "calls expression" that is a boolean expression relating two states, wherein the calls expression is expected to be true for every execution of the program where control passes from a state at an entrance of the first procedure through a single call to a state at an entrance of the second procedure, thereby describing an expected progress to be achieved between the states at these two points in the execution of the computer program.

19. The method of claim 16, wherein the verification conditions comprise undiverted recursion verification conditions, one for each instance of undiverted recursion possible in the procedure call trees.

20. The method of claim 16, wherein the verification conditions comprise diversion verification conditions, one for each instance of diversion possible in the procedure call trees.

* * * * *